United States Patent [19]
Nimura et al.

[11] Patent Number: 5,884,218
[45] Date of Patent: Mar. 16, 1999

[54] MAP INDICATION DEVICE AND NAVIGATION DEVICE

[75] Inventors: Mitsuhiro Nimura; Yasunobu Ito; Seiji Hayashi, all of Anjo, Japan

[73] Assignee: Aisin AW Co., Ltd., Anjo, Japan

[21] Appl. No.: 724,245

[22] Filed: Sep. 30, 1996

[30] Foreign Application Priority Data

Sep. 29, 1995 [JP] Japan ..................... 7-254274
Oct. 4, 1995 [JP] Japan ..................... 7-258006
Oct. 31, 1995 [JP] Japan ..................... 7-308137

[51] Int. Cl.⁶ ........................... G06F 165/00
[52] U.S. Cl. ............... 701/208; 701/201; 701/209; 340/995
[58] Field of Search ................... 701/201, 207, 701/208, 209, 213; 340/988, 990, 995

[56] References Cited

U.S. PATENT DOCUMENTS 5,506,779  4/1996  Kanki ..................... 701/207
5,513,110  4/1996  Fujita et al. ............. 701/207

*Primary Examiner*—Tan Q. Nguyen
*Attorney, Agent, or Firm*—Oliff & Berridge, PLC

[57] ABSTRACT

Upon recognizing the shapes of buildings or facilities, the buildings or facilities can be identified and destinations can be designated simply and easily. The display of a house map and a road map is changed over depending upon predetermined conditions. This makes it easy to navigate to the destination. When the destination is shown on the house map, a guide route is identified on a road adjacent to the building at the destination. This makes it easy to see where in the vicinity of the destination the car arrives.

19 Claims, 35 Drawing Sheets

FIG. 4

RAM 4

| EXTERNAL DATA | GD | PRESENT POS. | MP |
|---|---|---|---|
| ABSOLUTE DIR. | ZD | RELATIVE DIR. ANGLE | θ |
| DIS. TRAVELLED | ML | PRESENT POS. DATA | PI |
| VICS DATA | VD | ATIS DATA | AD |
| REGISTERED GOAL | TP | GUIDE ROUTE | MW |
| START POINT OF ROUTE | SP | END POINT OF ROUTE | EP |

FIG. 12

RAM4

| | | | |
|---|---|---|---|
| EXTERNAL DATA | GD | PRESENT POS. | MP |
| ABSOLUTE DIR. | ZD | RELATIVE DIR. ANGLE | θ |
| DIS. TRAVELLED | ML | PRESENT POS. DATA | PI |
| VICS DATA | VD | ATIS DATA | AD |
| REGISTERED GOAL | TP | GUIDE ROUTE | MW |
| RUNNING SPEED | MV | START POINT OF ROUTE | SP |
| END POINT OF ROUTE | EP | HOUSE MAP INDN. FLAG | JF |
| REDUCED SCALE | SD | ROAD MAP INDN. FLAG | DF |
| DIS. TO THE GOAL | MD | MANUAL INDN. FLAG | MF |
| HOUSE MAP BEING INDD. FLAG | HF | | |

| | | | |
|---|---|---|---|
| RECOMMENDED DROP-IN PLACE | DK | PLACE TO BE DROPPED IN | DP |
| RANGE OF SEARCH | SA | SEARCH CONDITION | KJ |
| DROP-IN PLACE SETTING FLAG | TF | | |

FIG. 20

RAM 4

| | | | |
|---|---|---|---|
| EXTERNAL DATA | GD | PRESENT POS. | MP |
| ABSOLUTE DIR. | ZD | RELATIVE DIR. ANGLE | θ |
| DIS. TRAVELLED | ML | PRESENT POS. DATA | PI |
| VICS DATA | VD | ATIS DATA | AD |
| REGISTERED GOAL | TP | GUIDE ROUTE | MW |
| START POINT OF ROUTE | SP | END POINT OF ROUTE | EP |
| DROP-IN PLACE | DP | CONTINUING ROAD No. | LN |
| DIR. OF GOAL | MH | | |

| | | | |
|---|---|---|---|
| DESIGNATED POS. | IZ | PAR. ADJACENT ROAD No. | SN |

| | |
|---|---|
| ADJACENT ROADS | LD |

MAP INDICATION DEVICE AND NAVIGATION DEVICE

BACKGROUND OF THE INVENTION

1. Field of the Invention

The invention relates to a map indication device and to a navigation device which produces route guidance to a destination (goal) that is set by a user.

2. Description of the Related Art

A conventional map indication device can be represented by, for example, a car navigation device mounted on a car. The car navigation device stores a plurality of items related to places, such as geographical names, telephone numbers and addresses of buildings, parks, companies. These items have been stored in the navigation device together with representative coordinates that specify the geographical location of each facility. When an item, such as the geographical name, telephone number, or address is specified by the user, the destination desired by the user is thereby input to the navigation device. According to another navigation device, a particular point can be designated on a map presented on a display using a cursor. In such a navigation device, when a point, which is the destination, is designated by the user on the map picture using the cursor, the coordinates of the designated point are set to the navigation device as a destination point.

As described above, designating the destination using the means described above makes it convenient to reliably select the destination. However, the above-mentioned navigation devices require list data in which geographical coordinates of destination points are corresponded to the items, such as geographical names, telephone numbers, and addresses, that are related to a plurality of possible destination points on a map. Such list data must be stored in a memory having a very large capacity. The navigation device equipped with the memory having such a very large capacity results in an increase in the cost of production.

Therefore, the conventional navigation devices have been provided with a memory of limited capacity to avoid an increase in the cost of production. That is, the list data stored in the navigation device consists only of that data associated with major places. In other words, the navigation device does not store list data related to all possible places.

Therefore, when geographic places, that are not included in the list data, are to be set as destinations, such destinations must be designated by a separate method such as the one in which a map picture of a region including the destination is indicated on the display of the navigation device, and the destination is designated by using a cursor on the map picture displayed. It is, however, difficult to move the cursor to an exact point on the map picture.

In the conventional navigation device, furthermore, setting the destinations and detecting the present position of the car are effected by using a road map based upon road data. Besides, searching the route up to a designated destination from the present position of the car and road guidance along the searched route are performed using the road map.

In order to offer proper route guidance while the car is running, the map on the display of the navigation device indicates only a minimum of data. This is to easily allow the driver, or user, to know the present position of the car and the principal roads along which he/she may proceed.

As described above, the conventional navigation device indicates small amounts of data and, hence, offers relatively small amounts of data from which the user must confirm the destination or a particular facility desired by the user. Accordingly, the user may often find it cumbersome to determine the exact point. With the map data consisting of conventional road data, the user may overlook the destination on the displayed map despite the fact the user is approaching the destination according to the route guidance. As a result, the user passes by the destination and must take a detour to arrive at the destination; i.e., the function of the navigation device is often not efficiently used.

In the conventional navigation device, the roads on the map indicated on the picture generally consist of straight lines coupling a plurality of coordinate points. Besides, large facilities are surrounded by lines so that the entire site of the facilities can be observed. Further, names of the facilities are often indicated on the map picture. When map coordinates are input for setting the destination, there may often be searched a road in the vicinity of the coordinates or an intersection closest to the coordinates. The point or the intersection on the searched road is set as an end point of the route guidance, and a route is searched from the present position of the car to the end point.

With the facilities being surrounded by lines as described above, however, it is not often obvious on the picture where the entrance to the facility is located. Moreover, since the end point of the route guidance is set and the guide route is searched based on the input point, the route is guided to the vicinity of the destination. When the surrounding of the facility at the destination has a complex shape, however, the user is often finally guided to the back door or to a byroad of the facility at the destination if the principal entrance is not known by the user.

SUMMARY OF THE INVENTION

The invention was accomplished in order to solve the above-mentioned problems.

A first object of the invention is to provide a navigation device which makes it possible to simply and easily search buildings and to designate destinations by recognizing the shapes of buildings.

A second object of the invention is to provide a navigation device which indicates guidance while running and makes it easy to determine a point on a map that is indicated.

A third object of the invention is to provide a navigation device which is capable of automatically changing the indication of house maps and road maps depending upon the predetermined conditions.

A fourth object of the invention is to provide a navigation device capable of calculating a suitable route to the destination.

A fifth object of the invention is to provide a navigation device which, when the destination is indicated on a house map, automatically sets a guide route to a point on a road adjacent to the building which is the destination.

According to the invention, the shape of a building is formed as data and is stored, making it possible to easily recognize the shape of the building. This makes it possible to search the building at a point that is input, and the user is able to quickly and easily execute the operation for inputting a desired building which is the destination. Moreover, the shape of the building is indicated on the picture using the data related to the shape of the building. Therefore, the present point that is indicated can be easily recognized, and the user is able to easily recognize the present point.

Further, according to the invention, the indication of the road maps and the house maps is changed over depending upon the running condition of the car, and the guide route can be watched more easily while the route is being guided. Under given running conditions of the car, the point can be easily confirmed. Moreover, since provision is made for means capable of selecting the indicated contents of map data, the user finds it-easy to recognize a point, such as the destination, on the indicated map when such a point is set.

According to the invention, moreover, the house map is automatically indicated on the display when the car has arrived at the vicinity of the destination, making it possible to properly recognize the position of the destination on the map. As a result, the user is able to arrive at the destination quickly and easily. When the car is running at a speed faster than a predetermined speed, furthermore, the road map is automatically indicated on the picture, making it possible to watch the map more easily while running. When it is desired to confirm a place of the building on the indicated map, a house map is indicated under the condition where the car is running at a speed slower than a predetermined speed, and the building can be easily recognized.

According to the invention, a point on the road adjacent to the building which is the destination is indicated as an end point of road guidance, and a guide route for arriving at this end point is searched, that is, identified. This eliminates the possibility that the end point of the guide route is erroneously set on a road remote from the destination. Besides, the road is guided up to just before the destination, and the user is able to determine his car is located in the vicinity of the destination by viewing the figure that represents the shape of the house which is the destination indicated on the house map.

Although the invention is described in the context of use in a car, it may be used in any vehicle moving on roads.

BRIEF DESCRIPTION OF THE DRAWINGS

The invention will be described with reference to the drawings in which:

FIG. 4 is a diagram illustrating some of the data stored in the RAM of a first embodiment of the invention;

FIG. 12 is a diagram showing some of the data stored in the RAM of a second embodiment of the invention;

FIG. 20 is a diagram showing some of the data stored in the RAM for the third embodiment;

DESCRIPTION OF THE PREFERRED EMBODIMENTS

Figure 1:
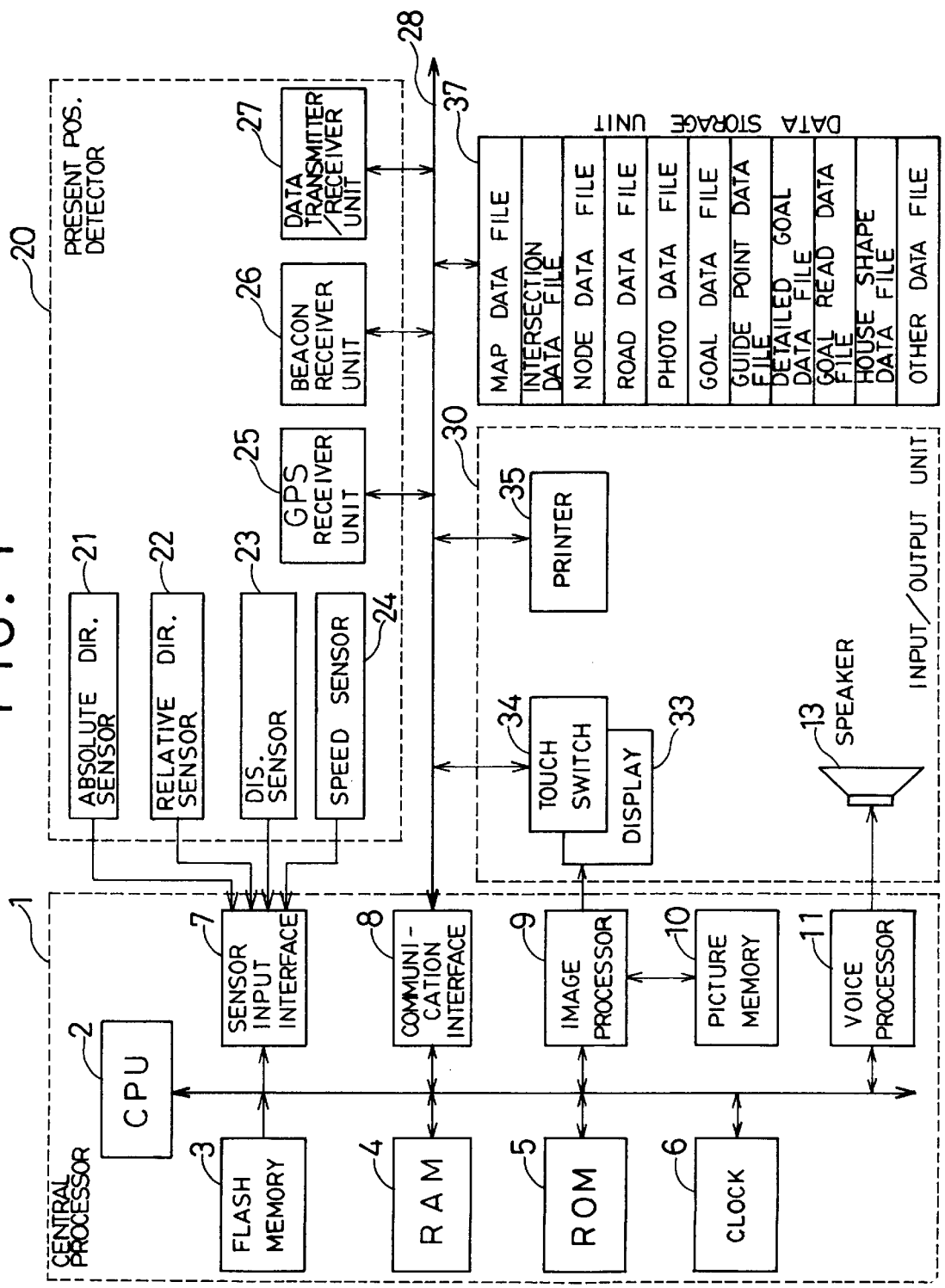
FIG. 1 is a block diagram illustrating an embodiment of the navigation device.

The data storage unit 37 stores the house shape data (FIG. 5) surrounded by a plurality of straight lines and representing the shape of a place sectionalized on a plane. A destination can be designated by using a cursor KL on a picture as indicated on a display 33. In this case, the coordinates of the center KLC of the cursor are found on the picture. The house shape data, including coordinates of the center KLC of the cursor within the section, are searched. A geographical place represented by the house shape data, including coordinates of the center KLC of the cursor, is designated as the destination. Therefore, the destination can be set more easily by using the house shape data than by bringing the center KLC of the cursor into agreement with the coordinates on the picture.

When a given item is selected from a list of a plurality of items indicated on the display 33, a destination according to the item selected is automatically selected. Then, a house map of a range including the selected destination is indicated on the display 33. When a picture range including the destination, present position and center of cursor at the center of the picture, does not lie within a coordinate range of the house map, a road map is displayed instead of showing the house map. The map picture indicated on the display 33 can be switched to either a house map or a road map through manual operation. When the present position is within a predetermined distance of the registered destination TP, a house map is automatically shown on the display 33. When the car is coming to a halt or is running at a speed slower than a predetermined speed, indication of the house map is inhibited. When the road map is changed over to the house map, a reduced scale of the road map is stored. When the house map is changed over again to the road map, the display is made on this stored scale.

The house shape data file includes data (adjacent road data) related to roads adjacent to the house shape. When the destination designated by the user consists of house shape data, the coordinate of a node included in the adjacent road data in the house shape data is regarded to be an end point. Then, a guide route arriving at the end point is searched. Thus, there is set a guide route to the end point on the road adjacent to the house shape which is the goal.

1. First Embodiment

Described below are the features of a map indication device according to a first embodiment of the invention. The map indication device of the first embodiment stores data related to a building, such as shape and name of the building. Based upon the data, a map is indicated and the shape of the indicated building is recognized. In the first embodiment, a building corresponding to a point that is input is searched and is identified.

The map indication device of this embodiment that will be described below includes a storage means for storing external data of buildings, sites, and objects, such as planar shapes or solid shapes of the buildings, sites and objects, a reading means for reading the external data of the buildings et al. (described as buildings for simplicity) stored in the above storage means, a conversion means for converting the external data of the buildings read by the above reading means into data for display or print output, and an indication means for presenting a map that shows the external data of the buildings based upon the external data of the buildings converted by the conversion means. A feature resides in that the shape of a building is recognized on the map presented by the indication means.

The map indication means of the embodiment that will be described in further detail later includes an external data storage means for storing external data of the buildings such as the shapes of the buildings, an internal data storage means for storing internal data, such as addresses, names, and telephone numbers, etc. of the buildings in relation to the external data of the buildings stored in the external data storage means, an indication means for presenting a map that shows the external data of buildings based upon the external data of the buildings stored in the external data storage means, a discrimination means for determining the shape of the building from the map showing external data of buildings presented by the indication means, a searching means for searching, from the internal storage means, the internal data related to the building identified by the discrimination means, and an informing means for informing the internal data of the building searched by the searching means.

Moreover, the map indication device of the embodiment that will be described in greater detail below includes a house shape data storage means for storing data related to the buildings, such as the shapes of the buildings, an indication means for indicating map data based upon the data stored in the house shape data storage means, a point input means for inputting a point based on the data indicated on the indication means, and a house shape searching means which recognizes the shape of a building based on the house shape data storage means and searches for a building that corresponds to the point input by the point input means, and wherein the indicator means identifies a building that corresponds to a point input by the input means.

A navigation device of the embodiment that will be described further below includes a present position detection means for detecting the present position of the car, a house shape data storage means for storing shapes of buildings in the form of a coordinate sequence, an indication means for presenting map data based on the data stored in the house shape data storage means, a point input means for inputting a point based upon the data presented on the indication means, a house shape searching means which compares the coordinates of the point input by the input means with the shape of a building formed by the coordinate sequence of the house shape data storage means, to identify a building that corresponds to the coordinates of the point that is input, a destination setting means for setting, as a destination, the building searched by the house shape searching means, and a route operation means for operating a route from the present position to the destination set by the destination setting means, wherein the indicator means identifies a building that corresponds to the coordinates of the point input by the input means and further identifies the route operated by the route operation means.

Moreover, the navigation device of the embodiment that will be described in detail below includes a house shape data storage means for storing house shape data related to the house shape and represents the shapes of places sectionalized on a plane in a predetermined region, positions of the places and data related to the places, a destination designation means for designating a destination by a point, a coordinate searching means for searching the coordinates of a point designated by the destination designation means, a house shape searching means for searching the house shape data in which are included the coordinates of the place searched by the coordinate searching means, a destination setting means which regards the place represented by the house shape data searched by the house shape searching means to be a destination, a guide route setting means for setting a guide route to the destination that is set by the destination setting means, an indication means for presenting a picture, a data indication means for indicating, on said indicator means, the house shape data related to a place included in the house shape data searched by the house shape searching means, a present position detection means for detecting the present position of a moving means, and a route indication control means for indicating, on the indicator means, the guide route set by the guide route setting means and the present position detected by the present position detection means.

2. Overall Circuitry

FIG. 1 shows the overall circuitry of the navigation device. A central processor 1 is equipped with a CPU 2 which controls the operation of the navigation device. The central processor 1 is provided with a flash memory 3, a RAM 4, a ROM 5, a clock 6, a sensor input interface 7, a communication interface 8, an image processor 9, a picture memory 10, and a voice processor 11.

The flash memory 3 stores a system program executed by the CPU 2, programs for controlling a display and for controlling voice guidance, as well as a variety of parameters. The RAM 4 stores data input from external units, a variety of parameters used for arithmetic operations, and the results.

The ROM 5 stores data necessary for guiding the routes and for indicating the maps. The clock 6 generates time data. The sensor input interface 7 receives a variety of detection data from an absolute position sensor 21, a relative position sensor 22, a distance sensor 23 and a vehicle speed sensor 24 that make up a present position detector 20. The detection data from the present position detector 20 is sent to the CPU 2 through the sensor input interface 7. The communication interface 8 controls the exchange of various data between unit connected to a data bus 28 and the central processor 1.

The image processor 9 reads picture data stored in the picture memory 10, writes picture data thereon, and controls the indication of the picture on a display 33. The display 33 may be a CRT, a liquid crystal display or a plasma display. The picture memory 10 stores the picture data to be indicated on the picture of the display 33, and exchanges the picture data relative to the image processor 9. In response to an instruction from the CPU 2, the image processor 9 converts map data into display data forming the picture data to be displayed on the display 33.

In this case, picture data are formed having a range larger than the picture size which can be indicated at one time on the display 33, and are stored in the picture memory 10. Therefore, even when the picture of the display 33 is scrolled in the longitudinal direction or in the transverse direction, the map picture is quickly indicated. The ROM 5 also stores voice waveform data by recording synthetic voice or natural voice for providing voice guidance. Controlled by the CPU 2, the voice waveform data that are required are read out from the ROM 5 and are sent to a voice processor 11 which converts the voice waveform data into voice signals of analog waveforms and outputs them to a speaker 13.

The present position detector 20 detects the present position of the car. The detection data are sent to the central processor 1 from the present position detector 20 which, as noted, includes an absolute direction sensor 21, a relative direction sensor 22, a distance sensor 23, a car speed sensor 24, as well as a Global Positioning System (GPS) receiver unit 25, a beacon receiver unit 26, and a data transmitter/receiver unit 27. The absolute direction sensor 21 is a terrestrial magnetism sensor for detecting terrestrial magnetism in the direction of the magnetic field of the earth. The absolute direction sensor 21 outputs data that represent south-and-north position which is the absolute bearing that is detected.

The relative direction sensor 22 outputs data that represent a deviation of the direction in which the car is travelling from the absolute direction detected by the absolute direction sensor 21. The relative direction sensor 22 is made up of, for example, a gyroscope, such as an optical fiber gyroscope or a piezoelectric oscillation gyroscope, or a steering angle sensor for detecting the steering angle of the wheels. The distance sensor 23 outputs data that represent the distance travelled by the car and is, for example, a digital counter interlocked to, for example, an odometer. The car speed sensor 24 outputs a voltage signal or a digital signal that varies in proportion to the running speed of the car.

The GPS receiver unit 25 receives a plurality of electromagnetic wave signals emitted from the orbiting GPS satellites and finds the present position of the car upon arithmetic operation by using the electromagnetic wave signals. The GPS receiver unit 25 outputs data indicating the present position of the car. The beacon receiver unit 26 receives correction data, for the GPS, that is sent from a ground station and from a data offering system, such as VICS (road traffic data communication system). The correction data corrects for the degraded GPS satellite signals. The received data are sent to the central processor 1 from the beacon receiver unit 26. The data transmitter/receiver unit 27 exchanges a variety of data between the car and the bidirectional present position data offering system, or the ATIS (traffic data service), etc. by use of a cellular phone, FM multiplex signals or a telephone circuit.

The input/output device 30 is used for inputting data necessary for setting the destination and other route data, such as start point and passing or transit points, and provides the user with guide data during the navigation operation. A transparent touch panel 34 is provided on the picture of the display 33. The touch panel 34 comprises transparent touch switches that are arranged in the form of a matrix on a plane. A printer 35 is used for printing a variety of data, such as a map and a guide to facilities, output through the communication interface 8. The printer 35 can be omitted depending upon the totally of a system desired.

Programs, according to the attached flow charts to be described later, for the navigation process which are executed by CPU 2 and programs which relate to the other process are stored in the data storage unit 37. The programs are read (installed/transferred/copied) from the data storage unit 37 (outside memory means/medium) and written and stored to the flash memory 3 (inside memory means/medium). This installing (transferring/copying) is executed automatically by setting the data storage unit 37 to the navigation device or turning on the navigation device or upon input of an instruction (operation) by the operator.

The data storage unit 37 can be exchanged for another data storage unit, therefore the programs and data can be exchanged for the other newer or the newest programs and data. Accordingly the newest navigation system can be provided by the exchange.

The data storage unit 37 stores various data, such as map data, intersection data, node data, road data, photographic data, destination data, guide point data, detailed destination data, destination road data, house shape data, indication guide data, voice guidance data, and picture data showing simple guide route, that are necessary for the navigation operation. The data storage unit 37 comprises a data recording medium, such as an IC memory, a CD-ROM, an IC memory card, an optical disk, or a magnetic disk, and a reader unit therefor.

The map data file stored in the data storage unit 37 includes road map data, such as a road map of the entire country and house map data from which the shapes of buildings can be recognized. The road map and the house map may consist of a plurality of maps of differing scales for the same region, or may consist of a piece of map of a required, or preset, scale. In this embodiment, the road map and the house map comprise a plurality of map data of differing scales for each of the regions. The house map has been stored as a collection of data of buildings for particular areas (e.g., cities, towns, villages only).

Figure 2:
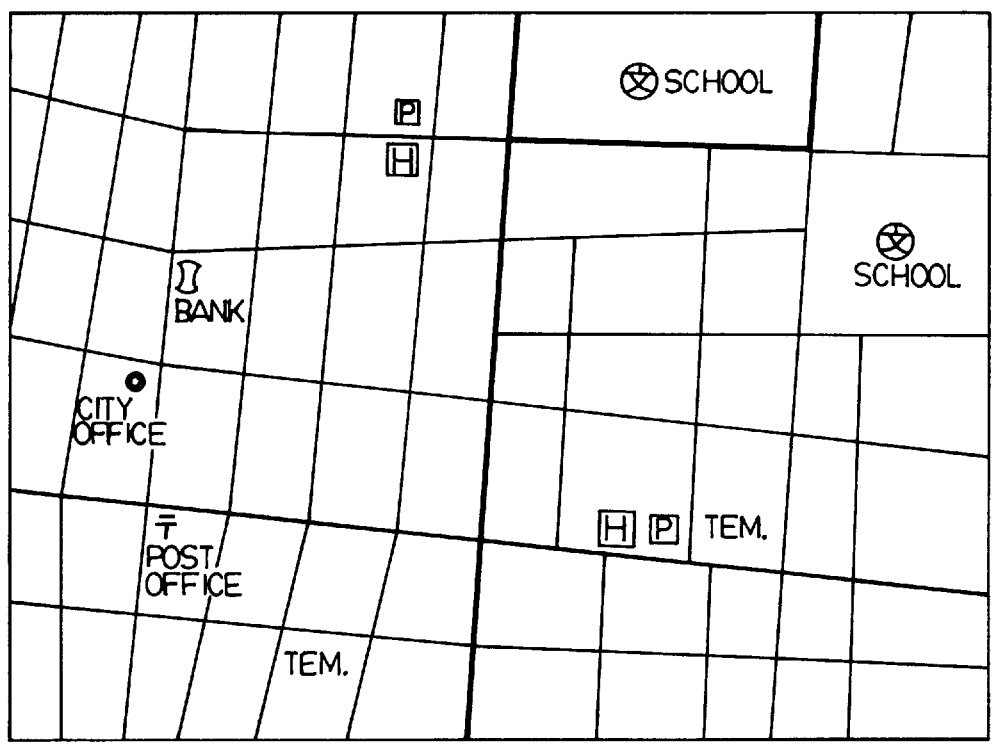
FIG. 2 is a diagram illustrating a road map.

The road map contains road networks, characters, signs or figures representing the location of principal buildings or facilities, principal map signs representing such features as railroad crossings and bridges and geographical data, such as geographical names of cities, towns, and villages. FIG. 2 illustrates a picture display based upon the road map data having the largest scale. The largest scale is defined as one showing the facilities in the greatest size on the picture on the display 33, i.e. the smallest area is shown so what is shown is large relatively speaking. In the picture of the road map, based upon the road data, the roads are distinguished by lines having different thicknesses and colors. The principal buildings and facilities have a symbol or mark at the coordinates where they exist. Other data, also presented on the picture are names of buildings or facilities, names of principal roads, names of the regions, and marks of road regulations, such as one-way, stop and yield right of way, etc. although they are not shown in FIG. 2.

Figure 3:
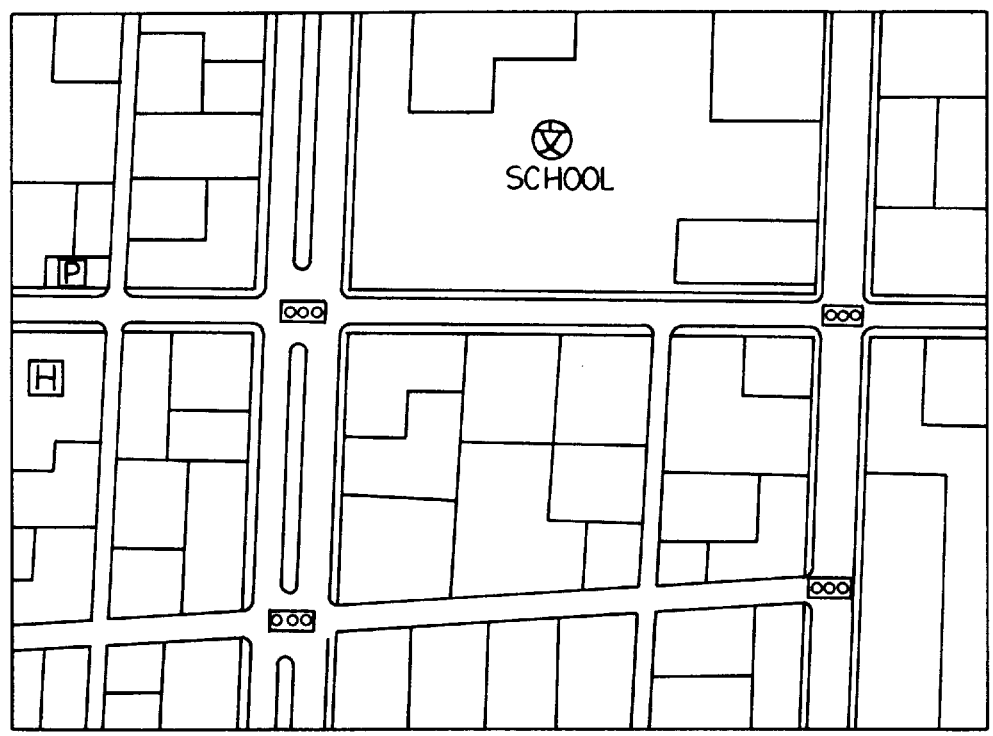
FIG. 3 is a diagram illustrating a house map.

The house map indicates the shapes of houses representations of the shapes of roads, rivers, buildings, and with facilities above ground, etc. as figures using a scaled reduction of the sizes. The house map also includes geographical data. FIG. 3 shows an exemplary house map. As shown in FIG. 3, the data for the house map is such that the scale is larger than the largest reduction scale of the road map or is the same as the largest reduction scale of the road map, that is if the road map data is 1:20,000, the house map data is 1:10,000 so features are twice as large when displayed. In the house map, therefore, the widths of the roads are correct reductions of the widths of the practical roads. The house map also shows features such as sidewalks and pedestrian bridges. The house map further indicates marks representing traffic signals at the intersections, and map signs representing areas, such as fields and pasture lands, etc. Though not diagramed, the house map further shows the names of buildings and facilities, names of principal roads, names of the areas, and road signs. The house map data recorded in the data storage unit 37 are used to create the house map on the display 33.

Here, the house shape consists of data for defining the outer shapes of buildings above the ground. That is, the "house shape" represents planar shapes of sections, buildings and sites as a plan view. Though expressed as "house shape" for the purpose of easy explanation, the house shape data includes features other than the houses, such as sites of facilities, roads, and rivers.

The intersection data file of the data storage unit 37 comprises data related to intersections, such as the locations and names of the intersections. The node data data file comprises a group of data, such as coordinates, for a plurality of nodes set on the roads. The nodes define segments of the roads on the road map that are approximated as straight lines between a pair of adjacent nodes. The road data file contains data for the positions and kinds of roads, number of lanes, and data representing connections among the roads. The photographic data file has photographic picture data of places where visual expression is required, such as of facilities, sight-seeing resorts, and principal intersections.

The destination data file contains data of places that have been set as destinations, such as principal sight-seeing resorts, buildings, enterprises listed in a telephone book, places of business, geographical positions of facilities, and data related to the destination such as the names of the facilities. The guide point data file comprises guide data related to roads. The guide data include the contents of the guide boards installed along the road, and data necessary for guiding along the roads, such as guides at branching points. The detailed destination data file contains detailed data related to destinations stored in the destination data file.

The destination read data file comprises list data for phonetically searching the destinations in the destination data file. The house shape data file contains shape data of house shapes for indicating the outer shapes in response to the house map data, and discrimination data that accompanies the house shapes. Other data files may include an address list data file for locating the destinations from the addresses, a telephone number list data file for locating the destinations from the telephone numbers, a data file related to destinations which are personally registered by the user, and other appropriate files. The destinations personally registered by the user may be places that are frequently set as destinations, such as the places of clients, customers, acquaintances and repeated visits, etc.

3. Data Groups

FIG. 4 illustrates some of the data groups stored in the RAM 4. Into the external data GD are copied whole or part of the data stored in the data storage unit 37. The present position data MP are present position data of the car detected by the present position detector 20. The absolute direction data ZD are data representing the south-north direction found based upon the data from the absolute direction sensor 21. The relative direction angle data 6 represent an angle subtended by a travelling direction of the car developed based upon the data from the relative direction sensor 22 with respect to the absolute direction.

The travelled distance data ML represent a distance travelled by the car developed based upon the data from the distance sensor 23. The present position data PI are data related to the present position input through the beacon receiver unit 26 or the data transmitter/receiver unit 27. The VICS data VD and the ATIS data AD are the data of VICS or ATIS input through the beacon receiver unit 26 or the data transmitter/receiver unit 27.

The registered destination data TP are data related to the position or name of a destination defined by the user. The guide route data MW are data representing the best route or a recommended route to the destination identified by a route searching processing that will be described later. Start-point-of-route data SP are coordinate data on a map of a point from where the navigation operation starts, the start point being determined by the route searching processing. The end-point-of-route data EP are coordinate data on a map of a point at where the navigation operation ends, the end point being determined by the route searching processing.

4. House Shape Data

As described above, house map data include wards, or subdivisions, of major cities, towns and villages, and a house map number has been attached to each of the so defined sections. The house shape data are sectionalized for each house map number of the area where the house shapes exist. As described above, the house shape data comprise data related to the outer shapes of houses and data for discriminating the places. To the discrimination data are attached related data, such as data representing the purpose for using the facility, data of adjacent roads, and detailed data specific to the house or place. In this embodiment, the shape data represent planar shapes of sections, sites and buildings at places where buildings and facilities existing in the house map are sectionalized on a plane.

Figure 5:
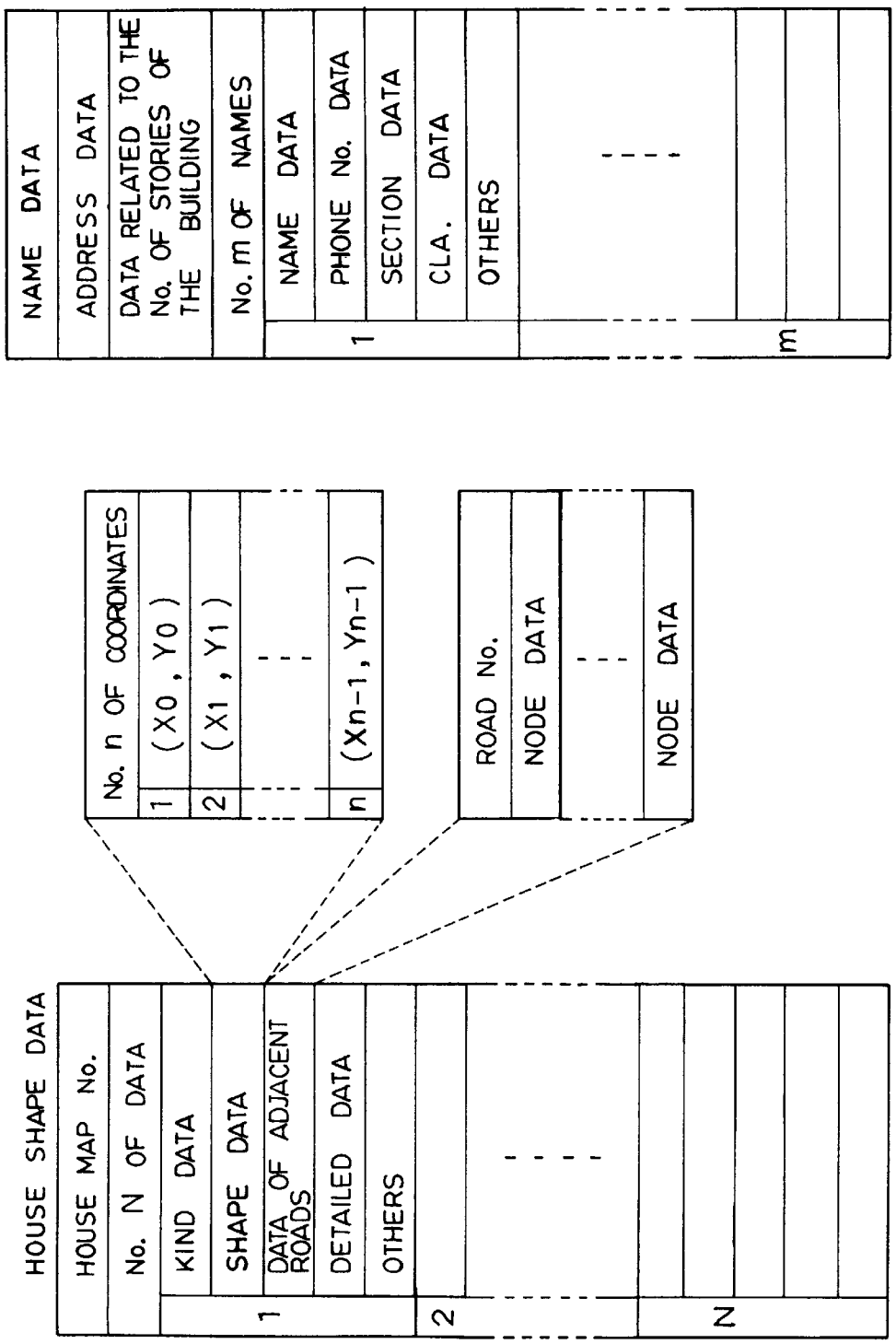
FIG. 5 is a diagram illustrating the contents of house shape data.

FIG. 5 illustrates house shape data of a section stored in the house shape data file. The house map number data are in agreement with number data of house map data stored in the map data file. The number of data represent the number N of house shapes found in the section represented by the house map number. The house shape data for each of the number N of house shapes include kind data, shape data, data of adjacent roads, detailed data and other appropriate or desired data. Among them, the shape data are external data of buildings. The data, other than the shape data, are internal data of the buildings.

Figure 6:
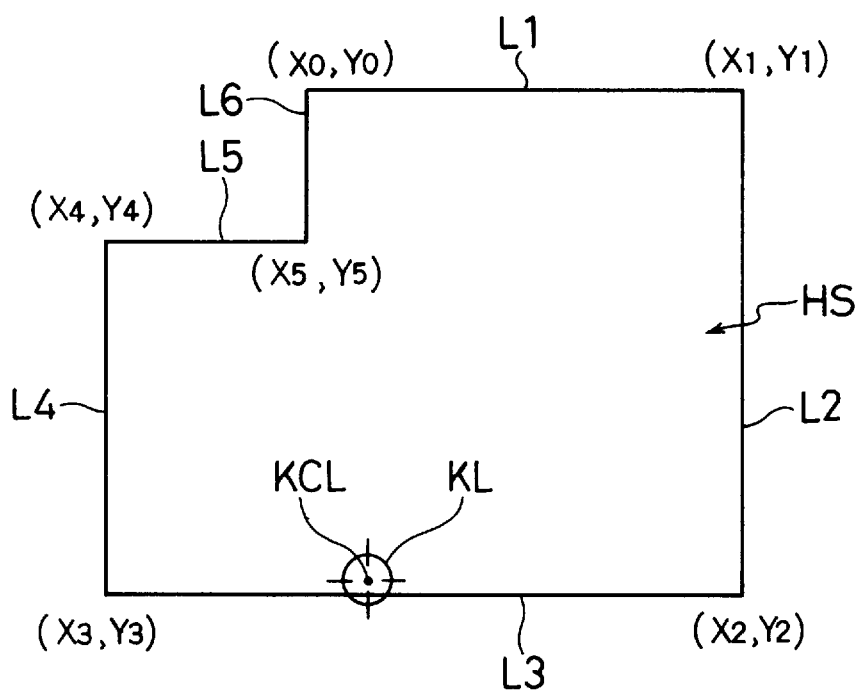
FIG. 6 is a diagram of data related to the shape of a house.

The kind data are those data for specifying public facilities, such as government offices, schools, and hospitals, and for specifying the kinds of buildings, such as individual houses, apartments, and single-family houses. The kind data further includes data representing the kinds of places sectionalized by a road, railway or boundary, such as a river. The shape data consist of the collection of data of geographical coordinate sequence for forming the house shapes. That is, a single house shape is indicated by a figure which surrounds the house shape using straight lines. Therefore, the shape data comprises a required number of coordinates and coordinate data at vertexes which are points where the straight lines are coupled together. When the house has, for example, a hexagonal shape, such as shown in FIG. 6, the coordinates (XO, YO) to (X5, Y5) at the vertexes form coordinate data for indicating the shape of the house. Curves of the house shape can be approximated by fine straight lines. Therefore, a house shape having a curved outer shape has increased number of vertexes. When the term "house shape" is used it is not limited to a house, rather is generic to all buildings, facilities and areas so defined.

The data related to adjacent roads comprise the number data of roads adjacent to the house shape and the coordinate data of nodes included in the data of the adjacent roads. A plurality of nodes adjacent to the house shape are often selected as nodes set to the data of the adjacent roads. When a plurality of roads are adjacent to the house, the data of the adjacent roads include number data of those roads and coordinate data of the nodes. The detailed data represent detailed contents related to a house shape. When the kind of the house shape is, for example, a building housing a number of independent business institutions, the detailed data include the name of the place, such as the name of the building, address data of the place, data related to the number of stories of the building, data related to the number of companies or departments in the building, and data related to the contents of the companies or departments. The address data are those representing metropolis and districts, wards, towns, villages, and street addresses. The actual structure of this data is dependent on the state in which the system is used and how that state defines addresses. For this specification and purposes of explanation, the state is Japan.

The content data include name data, such as the names of the companies and the names of the departments, telephone number data, section data, and classification data. The classification data represent the activities of the businesses. The classification method used in the classification data is determined in compliance with classification of businesses listed in a classified telephone directory. Classifications include gas stations, restaurants, convenience stores, parking lots, police boxes, drug stores, banks, post offices, stations, hospitals, schools, movie theaters, halls, theaters, live houses, art museums, libraries, data libraries, animal houses, aquariums, plant houses, recreation grounds, bowling alleys, skating rinks, disco clubs, karaoke shops, sports facilities, hotels, inns, sleeping accommodations, department stores, shopping centers, book stores, CD and video shops, sports shops, miscellaneous goods shops, gourmet shops, and companies in general, etc.

Other data include list picture data for indicating detailed data on the display 33, solid indication picture data for three-dimensionally indicating the shapes of buildings, data representing features of buildings, coordinate data at the entrances of buildings, and coordinate data at the entrances of parking lots belonging to the buildings, etc.

5. Overall Processing

Figure 7:
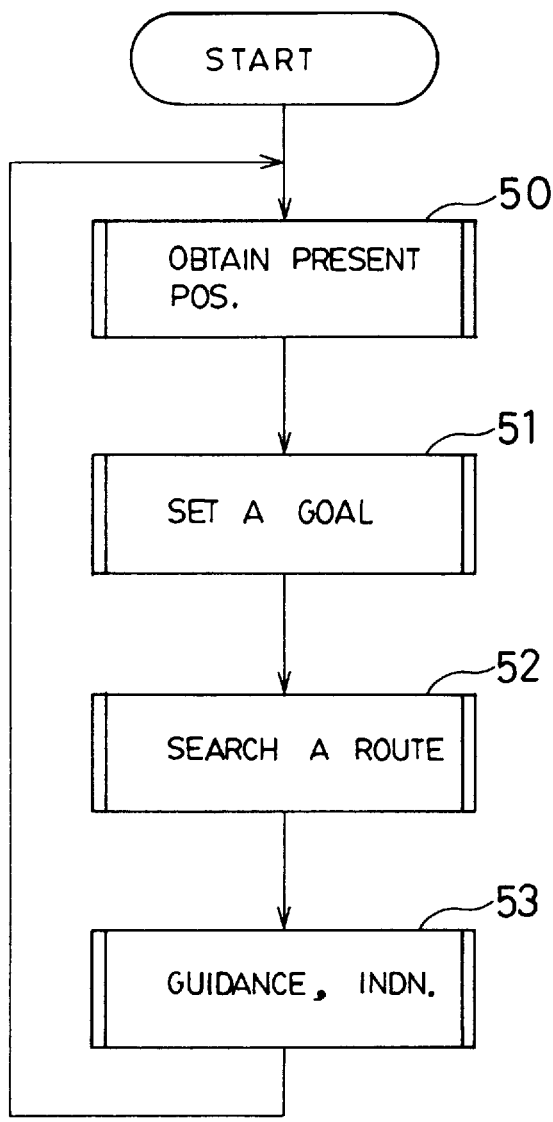
FIG. 7 is a summary flow chart of the processing executed by the navigation device.

FIG. 7 is a flow chart illustrating the overall processing executed by the CPU 2. This processing starts upon closing the power source circuit, i.e. turning the system on, and ends upon breaking the power source circuit, i.e. turning the system off. When the overall processing starts, the CPU 2 initializes the RAM 4 and the picture memory 9, etc. Then, a present position-obtaining processing (step 50), a destination setting processing (step 51), a route search processing (step 52), and a guidance indication processing (step 53) are executed repetitively.

The present position-obtaining processing (step 50) obtains the present position of the car using data sent from the present position detector 20. In the present position operation processing, the longitude and latitude representing the present position of the car are calculated by using the data input from the GPS receiver unit 25. The longitude and latitude are stored in the RAM 4 as the present position data MP. The present position data from the GPS are corrected, prior to storage in the present position data MP, by data related to the present position input from the beacon receiver unit 26 or the data transmitter/receiver unit 27.

The operation for specifying the position of the car is executed based upon the absolute direction data ZD, relative direction angle data θ, and travelled distance data ML. The position of the car found through this operation is collated with the map data in the external data GD, and is so corrected that the present position of the car is correctly indicated on the map picture. This processing makes it possible to correctly find the present position of the car even when the GPS signals cannot be received because the user is running through tunnels or due to any other reason that the basic GPS signals or the correction signals cannot be received.

In the destination setting processing (step 51), the destination is set through action of the user. The destination can be directly designated by the user on the picture indicated on the display 33, by use of a cursor, or by selecting any desired place from a separate list. After the destination is set, the user confirms the destination. Through these actions, the data related to the confirmed destination are stored, as registered destination data TP, in the RAM 4. After executed once, the destination setting processing (step 51) is not again executed unless a new destination is set by the user.

The route search processing (step 52) searches the guide route to the destination based upon the registered destination data TP, present position data MP and road data. The guide route comprised the roads on the road map linking the present position to the destination. The road number data of roads comprising the guide route are arranged in the order of roads as they will be traversed from the start point to the destination. The thus arranged road number data are stored, as guide route data MW, in the RAM 4. When the user wishes to travel from, for example, a start point to a destination, the user designates the destination in the destination setting processing (step 51). The destination that is designated is a registered destination. The registered destination, or a point on the guided road that is close to the destination, is stored, as an end point of route EP, in the RAM 4. The present position of the car becomes the start point. The present position, or a point on a guided road that is close to the present position, is the start point of route SP.

The roads most adapted to the conditions for linking the start point of route SP to the end point of route EP are successively searched. The course produced from the searched roads is a guide route. Described below are the conditions, or criteria, used for searching the roads. That is, a condition in which the distance to the end point of EP the route is shortest, a condition in which the time to arrive at the end point EP is shortest, and a condition in which the route is preferentially made up of express ways and major high ways. Other conditions or criteria may also be defined.

The roads making up the guide route are selected as described below. First, the start point SP of the route is the start point for searching the guide route. A road meeting the above-conditions is selected out of a plurality of roads linked to the start point. Next, a road meeting a selected one of the above-mentioned conditions is newly selected out of a plurality of roads linked to the end points of the above selected roads. This processing is repeated to search for a route that is connected to the end point EP of the route. The roads selected are those linking the two points. Therefore, no branching point exists on the road to which a road number is attached.

The road number data of the roads make up the searched guide route are stored, as guide route data MW, in the RAM 4. The guide route search processing is equal to the processing for operating the road numbers constituting the guide route based on a predetermined processing by using road data defined for the roads.

In the guidance indication processing (step 53) the route search processing (step 52) is automatically executed when the present position of the car has deviated from the guide route. This search identifies a new guide route. The processing for searching the new guide route may also be executed upon a predetermined switching operation or in response to a voice input. However, the route search processing (step 52) is not executed again unless the present position of the car has deviated from the guide route or an instruction is input by the user to search the route again.

In the guidance indication processing (step 53), the guide route found by the route search processing (step 52) is indicated by a thick line of a conspicuous color, such as red or blue, on the map picture on the display 33. Moreover, a present position mark representing the present position of the car and a destination direction mark representing the direction of the destination relative to the present position, are indicated on the picture on the display 33. Voice guidance information can be produced from a speaker 13, either in addition to or as an alternative to presenting the guide information on the map picture on the display. Owing to the thus produced information, the user can drive his car along the guide route.

The picture for indicating the guide route uses a road map which includes geographical data, such as roads in the vicinity of the present position, facilities, and traffic control symbols, and a house map in the vicinity of the present position. Instead of the road map, there may be used a simplified guide route picture without indicating geographical data but indicating only a minimum of data, such as guide route, direction of destination and present position, etc.

When the car approaches a guide point, a map near the guide point is indicated on an enlarged scale, and the direction is indicated in which the car should travel. Moreover, guide information by voice is produced together with the indication on the map of an enlarged scale. The guide point may be a point where the user should turn to the right, to the left, or an intersection. The present position of the car indicated on the picture is corrected as the car proceeds. Therefore, the map picture indicated on the display is automatically scrolled to accompany the movement of the present position of the car.

In this guide indication processing (step 53), furthermore, the picture that is indicated is changed over from the road map or from a simple guide route picture into a house map, or from a house map into a road map or into a simple guide route picture automatically, based on specified criteria, or manually by the user.

When the running speed of the car is faster than a predetermined speed, either a road map or a simple guide route picture is indicated. Conversely, when the running speed of the car becomes lower than the predetermined speed or the car comes to a halt, the road map or the simple guide route picture is automatically changed over to the house map. When the coordinates of the present position deviate outside of the coordinate range covered by the house map that is being indicated, the road map or the simple guide route picture in the vicinity of the present position is automatically indicated by scrolling. When the car has entered into a range within a predetermined radius from the registered destination, the map indicated on the display 33 may be automatically changed over to the house map from the road map or from the simple guide route picture.

6. Destination Setting Processing

Figure 8:
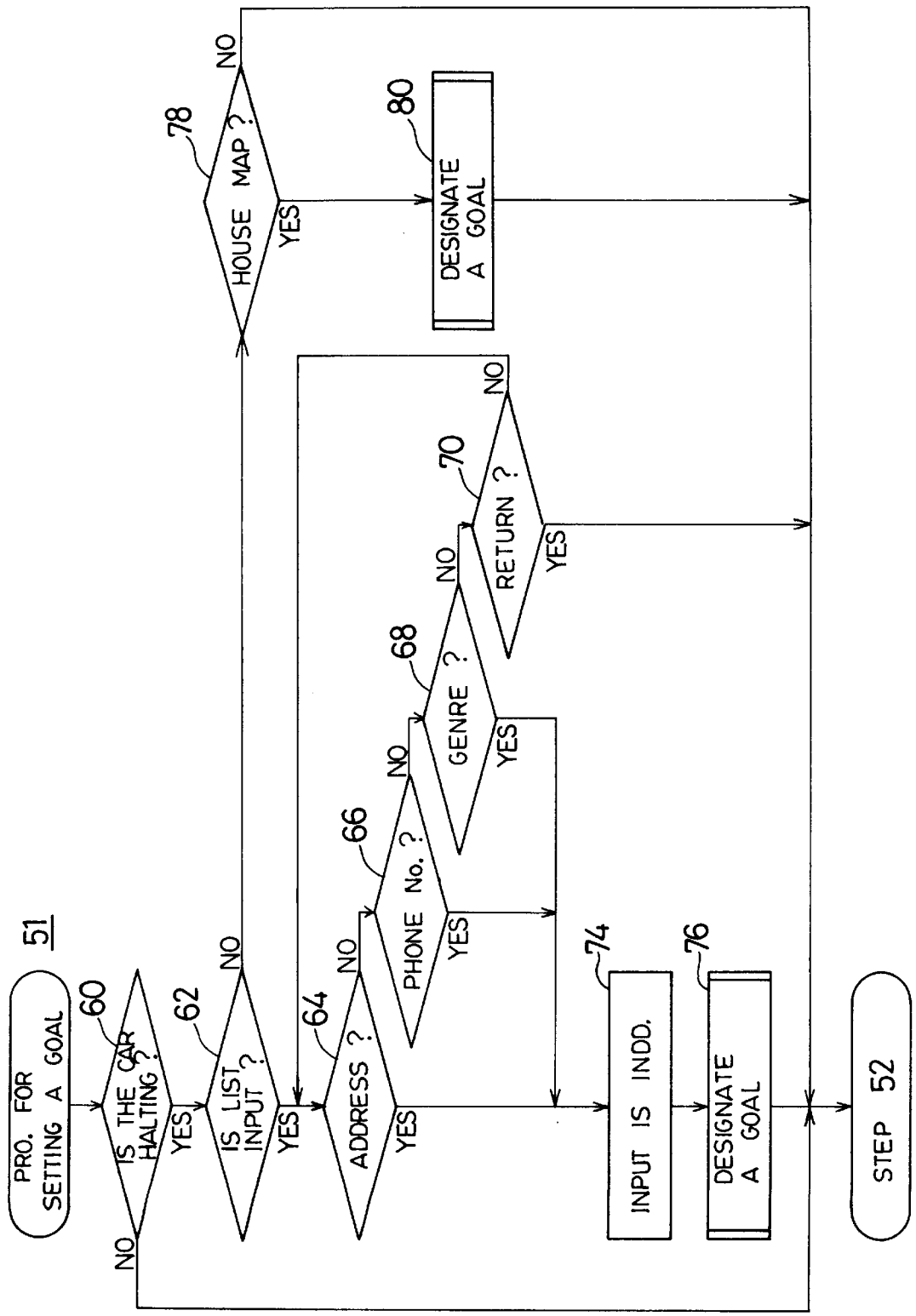
FIG. 8 is a flow chart of the process for setting a destination in a first embodiment of the invention.

FIG. 8 is a flow chart of the destination setting processing (step 51). It is first determined whether the car is coming to a halt (step 60). This is done by determining whether the running speed of the car, detected by the car speed sensor 24 is 0 kg/h or is slower than a predetermined speed. When it is determined that the car is not halting, the destination setting processing (step 51) ends, and the next route search processing (step 52) is executed (as shown in FIG. 7).

On the other hand, when it is determined at step 60 that the car is halting, it is then determined whether a list selection is input by the user (step 62). When the list selection is input, a desired item is provided using the list of items indicated on the picture display. That is, when the list selection is input, items necessary for searching the destination are designated. Then, a destination that meets the designated items is selected. When the destination-setting processing starts, the road map of the vicinity of the present position is indicated on the display 33. Moreover, characters "LIST INPUT" are shown on the road map picture. When the user touches the indicated portion with his finger, a touch signal is output from the touch switch 34. The CPU 2 detects the touch signal, and a list input flag is set.

At the step 62, it is determined whether the list input flag has been set. When the list selection is input, i.e., when the list input flag is set, the display 33 indicates a menu for searching the destination, such as "address", "telephone number", and "genre", etc. When the user touches a portion of the display 33 where there are indicated desired items, a touch signal is output from the touch switch 34. The flag of the corresponding item to that touched, is set in response to the touch signal. For example, when the item of "address" on the screen is touched, an address flag is set. When other items are so designated, a telephone number flag, a genre flag and the like flags are set depending upon the designated item. It would also be possible to use multiple selections but additional processing would be necessary for handling inconsistent or contradictary data that may be input.

At the steps 64 to 68, it is determined which flag is being set. A character "RETURN" is also indicated on the menu picture on the display 33. When the character "RETURN" is touched, the destination-setting processing (step 51) ends, and the list of items is erased from the picture on the display 33. As the indication of list is erased, the road map is indicated again. The items of list input are not limited to the ones described above but may include the "name" of a company or a facility or the "name of an individual person" or other identification data that can be associated with a physical destination. Any item may be employed provided it helps discriminate a destination over other facilities.

When an item is selected by the user from the menu picture, a picture for data input corresponding to the selected item is indicated on the display 33 (step 74). The picture for data input is indicated based upon the destination data file and the detailed destination data file. When, for example, the item of "ADDRESS" is selected, the names of metropolis and districts are first indicated on a list. When the name of the metropolis or district is selected from the list, then, a list of the names of cities, towns and villages is indicated on the picture. When the city, town or village is selected, then, a picture is indicated for inputting the name of a section, street and street number. Thus, the address is input successively. Or, the address is searched and designated successively using the first letters of the words as key words. In either way, upon touching the name or the numeral that is indicated, the indicated portion is input to the device.

When an item "PHONE NUMBER" is selected, numerals 1 to 0 are indicated on the picture. When the indicated numerals are touched by the user, the touched numerals are input to the device. By selectively inputting the numerals, a telephone number is input.

When an item "GENRE" is selected, a list of the names of genres is indicated. When the genre name is touched on the picture, the genre of the name is set as the genre desired by the user. As the genre is selected, the names of places meeting the selected genre are indicated on the display 33 arranged in alphabetical order or in the order of metropolis and districts. The user touches the picture to select a desired place. After the items are thus successively selected, the user finally selects the desired destination. The designated destination is stored in the RAM 4 (step 76). The coordinate data of each of the places in the destination data file are the data for designating coordinates of a particular point determined for each of the places, such as center coordinates of the site of the place.

When display of the house map is requested at a moment when the destination setting processing (step 51) is started, the result of determining the condition becomes "YES" at a step 78. In this case, a "destination designation processing" is executed (step 80) to designate a destination on the house map. The processing at the step 80 is the same as that of the step 76. When the house map of the area desired by the user to be shown has not been stored in the data storage unit 37, a road map is indicted at both steps 80 and 76. Then, the destination is designated using the road map. The switch for setting the destination may be other than the above-mentioned touch switch 34. For instance, there may be used a push-button switch provided adjacent the picture display or a cursor indicated on the display 33.

7. Destination Designation Processing

Figure 9:
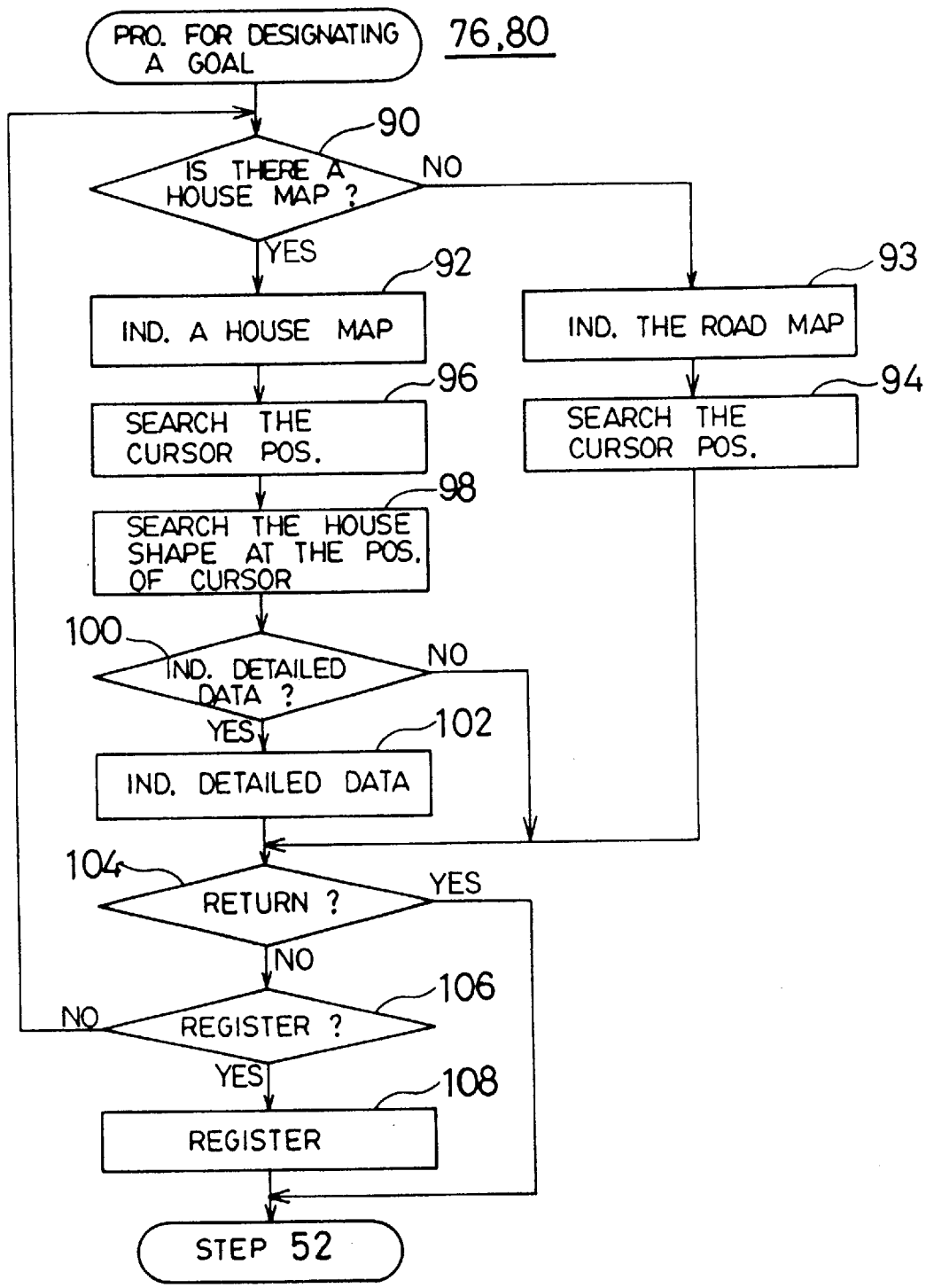
FIG. 9 is a flow chart of a process for designating a destination in a first embodiment of the invention.

FIG. 9 is a flow chart illustrating the destination designation processing at steps 76 and 80. In this processing, the house map is indicated on the display 33 when the house map of a region desired by the user has been stored in the data storage unit 37. Then, a place designated by using the cursor on the picture on the display 33 is searched using the house shape data. The place that is searched is stored, as the registered destination TP, in the RAM 4. When requested by the user, furthermore, detailed data of a place designated by using the cursor are indicated on the display 33.

The flow chart of FIG. 9 will now be described. It is, first, determined whether the house map of the region desired to be indicated has been recorded in the data storage unit 37 (step 90). In the "destination designation processing" of step 76, FIG. 8, it is determined whether the house map data of a region inclusive of coordinates of a particular place selected at the step 74 have been stored in the data storage unit 37. In the "destination designation processing" executed at the step 80, FIG. 8, it is determined whether the house map data of a region inclusive of the present position of the vehicle have been stored in the data storage unit 37. When the picture is scrolled, furthermore, it is determined whether the house map data inclusive of coordinates centered on the cursor have been stored in the data storage unit 37.

Whether the house map data have been stored in the data storage unit 37 is determined as described below. That is, when the house map of the region desired by the user is to be indicated on the picture on the display 33, it is determined whether the house map data is available for writing into the video memory for constructing the picture on the display 33. When such house map data have not been stored in the data storage unit 37, the house map cannot be shown on the picture on the display 33. This means that the house map data of the region desired by the user have not been stored in the data storage unit 37. As described above, when the house map is not properly indicated on the picture on the display 33 or, in other words, when the house map data of the region desired by the user has not been stored in the data storage unit 37, the road map is displayed as the picture on the display 33.

When the house map data of a region inclusive of coordinates of a specified point is stored in the system coordinates of the present position or coordinates of the center of the cursor, the CPU 2 reads the house map data of this region from the data storage unit 37 and indicates them on the display 33 (step 92). Colors of facilities or objects on the house map have been classified depending upon the kinds of facilities or objects. For instance, roads and vacant lots are indicated by white, buildings of individuals and companies are indicated by grey, and public facilities are indicated by orange. In the invention, however, there is no limitation on the basis for sorting by colors or on the colors that are indicated. Clearly, the only limitations are distinct colors that can be perceived, the number of desired categories, other requirements for color, and memory available.

When a particular place is designated by the selection of items from the list, the coordinate data in the destination data for the designated place are read out. Then, the house map is displayed with the point determined by the coordinate data located at the center of the picture on the display 33. In the case of the step 80, FIG. 8, the house map is displayed with the present position of the vehicle at the center of the picture on the display 33.

When the house map is indicated on the display 33 (step 92), the cursor KL is indicated at the center of the picture on the display 33. The cursor KL is moved by the user. Therefore, the coordinates on the house map pinpointed by the indication point of the cursor KL are found by calculation (step 96). The place inclusive of coordinates pinpointed by the cursor KL is searched from the house shape data file (step 98).

Figure 10:
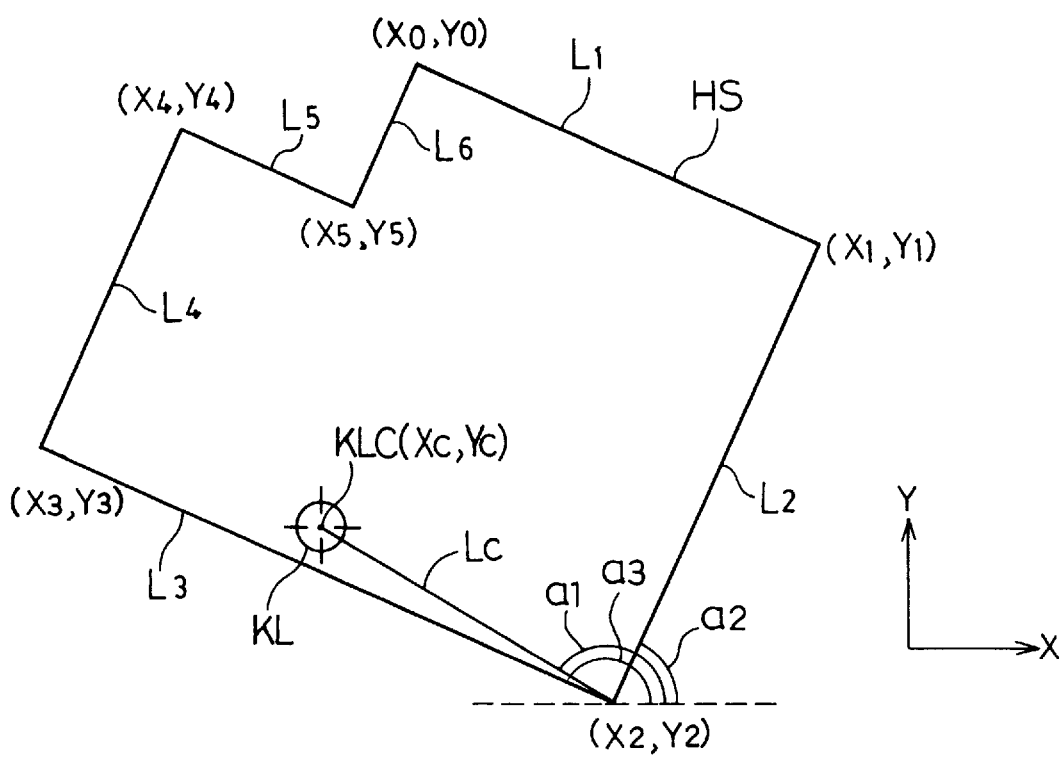
FIG. 10 is a diagram illustrating a cursor KL and the data related to the shape of a house.

FIG. 10 is a diagram illustrating that the coordinates (Xc, Yc) of the center KLC of the cursor KL lie within the house shape HS. A range of coordinates of the house map picture indicated on the display 33 is operated. The house shape data included in the house map indicated on the display 33 are successively read out from the house shape data file. Furthermore, the coordinates of the center KLC of the cursor are found from the position of the center KLC of the cursor indicated on the screen. The house shape data including the coordinates of the center KLC of the cursor are searched by using the shape data included in the house shape data that are read out.

In the case of, for example, FIG. 10, a maximum value and a minimum value of X-coordinates and a maximum value and a minimum value of Y-coordinates are found from the shape data (XO, YO) to (X5, Y5). It is then determined whether the X-coordinate (Xc) at the center KLC of the cursor is a value lying between the maximum value and the minimum value of the X-coordinate of the shape data. This determination is accomplished by the comparison of the X-coordinate (Xc) of the center KLC of the cursor with the maximum X-coordinate and minimum X-coordinate. It is similarly determined whether the Y-coordinate (Yc) at the center KLC of the cursor is a value lying between a maximum value and a minimum value of the Y-coordinate of the shape data.

Then, the following calculation is carried out when the coordinates of the center KLC of the cursor lies between the maximum X-coordinate and the minimum X-coordinate and between the maximum Y-coordinate and the minimum Y-coordinate of the house shape HS. That is, the gradient of a straight line is calculated connecting the coordinates of the center KLC of the cursor to the vertex coordinates of the house shape HS. The thus found gradient of the straight line is compared with the gradients of straight lines surrounding the circumference of the house shape HS. Depending upon the comparison of the gradient of the straight line, it is discriminated whether the center KLC of the cursor lies within a plane sectionalized by the house shape HS.

As shown in FIG. 10, for example, there are calculated a gradient al of a straight line Lc connecting the center KLC of the cursor to the coordinates (X2, Y2), a gradient a2 of a straight line L2 connecting a vertex (X1, Y1) to a vertex (X2, Y2), and a gradient a3 of a straight line L3 connecting the vertex (X2, Y2) to a vertex (X3, Y3). The gradients a1, a2 and a3 are compared with each other. In the case of FIG. 10, it will be learned that the center KLC of cursor exists between the straight lines L2 and L3. Other straight lines L1, L4, L5 and L6 are found for their gradients. Gradients of the straight lines L1, L4, L5 and L6 are compared with the gradient of the straight line LC. Comparison of the gradients of the straight lines indicate that the center KLC of the cursor lies within a range surrounded by the straight lines L1 to L6 that surround the outer perimeter of the house shape HS.

The above-mentioned calculation is executed for all house shapes indicated on the picture on the display 33. As a result of the calculations, the house data including the center KLC of cursor is determined. Next, it is determined whether the indication of detailed data is requested (step 100). For example, when the user has touched the characters "DETAILED DATA" indicated on the display 33, it is determined that the detailed data is requested. When a request to indicate the detailed data is made, the list picture data included in the house shape data searched, at the step 98, are read out from the data storage unit 37 and are sent to the image processor 9 (step 102). Then, the contents of detailed data related to a place at the center of the cursor are shown on the display 33 in the form of a list.

Figure 11:
FIG. 11 is a diagram indicating a list of detailed data related to the house shapes.

Referring to FIG. 11, for example, the center of the cursor KL exists in the planar shape of the house shape HS. When a request is made to indicate the detailed data, the detailed data related to the house shape HS, pinpointed by the cursor KL, are indicated on the display 33. When the house shape HS is, for example, a building housing a plurality of shops and companies, a list is indicated on the display 33 showing names of the shops and/or the companies in each of the rooms, the telephone numbers, and the kinds of shops and/or companies. When the user is looking for, for example, a bookstore and when the bookstore is located on the second floor of the building, he may confirm the bookstore on the list. When the user does nothing for a predetermined period of time, it is determined that a presentation of the detailed data is not requested. In this case, the processing at step 102 is not executed, and no list is presented.

Next, it is determined whether an end of the processing is requested (step 104) by determining whether, for example, the character "RETURN" shown on the display 33 is touched by the user. When the user has touched "RETURN", the end of the destination processing is requested and the destination designation processing, of FIG. 9 (steps 76, 80, of FIG. 8), ends and the next route search processing (step 52 of FIG. 7) is executed. When the end of destination processing is not requested, it is then determined whether the destination is to be registered (step 106). For example, the character "REGISTER" is shown on the picture on the display 33. Whether the user has touched this indication is determined by using a signal output from the touch switch 34. When the destination is to be registered, the house shape data searched at the step 98 are stored, as registered destination data TP, in the RAM 4 (step 108).

When the destination is not to be registered, i.e., the user has not touched "REGISTER" after a predetermined period of time, the process starts over and determines whether the user has moved the cursor KL. Whether the cursor KL is moved is determined by using an interrupt signal generated by the operation for moving the cursor KL. A picture scroll processing which is not shown is executed upon the generation of the interrupt signal. As a result, the map picture indicated on the display 33 is scrolled. The map picture indicated on the display 33 is so scrolled that the center KLC of the cursor is at the center of the picture at all times. When the scroll is discontinued, the program commences the actions of step 90, the coordinates of the center KLC of the cursor are found (step 96), and the house shape data including the center KLC of the cursor are searched (step 98).

When the user requests a presentation of the detailed data, a list of detailed data is indicated (steps 100, 102). When the house map data are not sufficient, the house map data being indicated on the display 33 as a result of scrolling the picture, i.e., when the range of coordinates indicated on the display 33 extends beyond the coordinates at the ends of the house map data, the result of discrimination becomes NO at the step 90. In this case the display 33 presents a road map with the coordinates of the center KLC of the cursor at the center of the picture instead of indicating the house map (step 93).

At the start, the destination designation processing of FIG. 9, when it is determined that the house map data contain none of the coordinates of the above-mentioned particular place, coordinates of the present position or coordinates of the center of the cursor (step 90), then, the road map data are read out and are indicated on the display 33 (step 93). The road map is presented such that the coordinates of the above-mentioned particular place, coordinates of the present position or coordinates of the center of the cursor are at the center of the picture on the display 33.

As the road map is indicated on the display 33 (step 93), the cursor KL is indicated at the center of the picture on the display 33 and the geographical coordinates of the center of the cursor KL are found by the CPU 2 (step 94).

Next, it is determined whether the ending the destination designation processing of FIG. 9 is requested (step 104) by determining whether the character "RETURN" indicated on the display 33 is touched by the user. When the character "RETURN" is touched by the user, the end of the destination processing is requested. When the end is requested, the destination designation processing (steps 76, 80) ends and route search processing (step 52, FIG. 7) is commenced. When the end is not requested, it is then determined whether the destination is to be registered (step 106) and when it is to be registered, the point that is pinpointed by the center KLC of the cursor, searched at the step 94, is registered, as registered destination data TP, in the RAM 4 (step 108).

When the destination is not to be registered and the user moves the cursor KL to change the position for designating the destination, the picture is scrolled. That is, the picture of the road map indicated on the display 33 is scrolled. The map picture indicated on the display 33 is so scrolled that the center KLC of the cursor is at the center of the picture at all times. When the scrolling is discontinued, the program returns back to the step 90 to find the coordinates of the center KLC of the cursor (step 93).

When the house map is indicated such that the center KLC of the cursor is at the center of the picture within the coordinate range indicated on the display 33 due to the scrolling of the picture, the result determined at the step 90 becomes YES. In this case, the house map with the coordinates of center KLC of the cursor at the center of the picture is indicated instead of the road map (step 92).

When the destination is selected from the list of places (points) as described above, the house map including coordinates of the selected place is automatically indicated on the display 33 (steps 76, 90, 92). Further, when the user requests the display of the house map, the house map including the coordinates of the present position is shown on the display 33 (steps 80, 90, 92). Then, the coordinates of the center KLC of the cursor are found (step 96) and the house shape data including the center KLC of the cursor within the range of the house shape are searched (step 98).

When the house map is shown on the display 33, therefore, the center KLC of the cursor that is brought within the range of the house shape makes it possible to designate the place of the house shape as the destination. Thus, the destination is easily designated. In this embodiment, in other words, the cursor is not brought to the coordinates of a point but is brought within a plane surrounded by the house shape to automatically designate the destination is the place identified by the house shape. Therefore, there is no need to move the cursor precisely to the destination on the map presented on the display. That is, if the cursor is moved to a given position within a plane figure of the house shape, the destination is designated; i.e., the destination is designated easier than any other conventional navigation devices.

The house shape data further contains detailed data together with the shape data. When a place is designated by the user, therefore, data related to the equipment in the facility at that place can be shown on the display 33. In setting the destination, therefore, it is possible to obtain details of the facility at the destination. When the car is running at a speed faster than a predetermined speed, furthermore, the operation for designating the destination is inhibited (step 60 in FIG. 8). That is, the operation for designating the destination is allowed only when the car is halting or is running at a speed slower than the predetermined speed.

When the house map cannot be shown on the display 33 despite its being requested, the appropriate road map is shown. That is, the road map is shown when house map data for showing the house map over the whole picture of the display 33 have not been stored in the data storage unit 37. Thus, the map indicated on the display 33 is changed over from the house map into the road map in the following cases: when the data storage unit 37 does not store the house map data in amounts enough for showing the house map with the present position of the car at the center of the display 33; and, when the house map is shown on the display 33, the indicated picture is scrolled accompanying the motion of the cursor KL, and the geographical range of the displayed picture moves out of the coordinate range of the house map that can be displayed.

8. Second Embodiment

A second embodiment of the invention is concerned with a navigation device which stores the road map formed based upon the road data and the house map formed based upon the data related to buildings, such as the shapes of buildings, and changes over the map as required.

The embodiment to be described in greater detail, comprises a data storage means for storing map data, a present position detection means for detecting the present position of the car, an input means for inputting data, such as a destination and other information necessary for calculating the route, a route operation means for establishing the route based upon the data input from the input means and the map data stored in the data storage means, a route guide means for guiding the route based upon the route established by the route operation means and the present position detected by the present position detection means, an indication means for showing the map data read from the data storage means and for presenting a route established by the route operation means, and a map data change-over means for changing over the map data that are to be displayed on the indication means, wherein the data storage means includes a road map data storage means for storing road map data formed based upon the road data and a house map data storage means for storing house map data formed based upon the data related to buildings, such as the shapes of the buildings, and wherein, upon the determination of predetermined conditions, the map data change-over means changes over the map data formed by reading the road map data from the road map data storage means and the map data formed by reading the house map data from the house map data storage means, and outputs them to the indicator means.

9. Overall Circuitry

The structure of the second embodiment is the same as that of the first embodiment shown in FIG. 1.

10. Data Groups

FIG. 12 illustrates some of the data groups stored in the RAM 4. Into the external data GD are copied whole or part of the data stored in the data storage unit 37. The present position data MP are the present position data of the car detected by the present position detector 20. The absolute direction data ZD are data representing the south-north direction found based upon the data from the absolute direction sensor 21. The relative direction angle data θ represent an angle subtended by a travelling direction of the vehicle found based upon the data from the relative direction sensor 22 with respect to the absolute direction. The travelled distance data ML represent a distance travelled by the vehicle found based upon the data from the distance sensor 23.

The present position data PI are data related to the present position input through the beacon receiver unit 26 or the data transmitter/receiver unit 27. The VICS data VD and the ATIS data AD are the data of VICS or ATIS input through the beacon receiver unit 26 or the data transmitter/receiver unit 27. The registered destination data TP are data related to the position or name of a destination registered by the user. The guide route data MW are the data representing the best route or a recommended route to the destination identified through a route search processing that will be described later for this second embodiment.

The running speed data MV represent the running speed of the car detected by the speed sensor 24. Start-point-of-route data SP are coordinate data on a map of a point from where the navigation operation starts, the start point being determined by the route search processing. The endpoint-of-route data EP are coordinate data on a map of a point at where the navigation operation ends, the end point being determined by the route search processing based on the destination. A house map indication flag JF represents whether a request has been made for showing the house map on the display 33. A reduced scale data SD represents a reduced scale of the road map indicated on the display 33.

A road map indication flag DF represents whether a request has been made for showing the road map on the display 33. Destination distance data MD represent a distance from the present position to a registered destination TP. A manual indication flag MF represents whether a request has been for showing the house map on the display 33 based on a manual input by the user. A house map being indicated flag HF represents whether the house map is being shown on the display 33. The RAM 4 is equipped with registers for storing recommended drop-in place data DK, drop-in place data DP, range-of-search data SA, search condition data KJ, and a drop-in place setting flag TF. The recommended drop-in place data DK are related to places designated by the user where he may drop in on along the guide route to the destination.

11. House Shape Data

The house shape data according to the second embodiment are the same as the house shape data of the first embodiment, shown in FIG. 5, and are not further described here.

12. Overall Processing

The overall processing according to the second embodiment is nearly the same as the processing of the first embodiment as shown in FIG. 7.

The present position-obtaining processing (step 50 of FIG. 7) obtains the present position of the vehicle based upon the data sent from the present position detector 20. In the present position operation processing, the longitude and latitude are calculated from the data input through the GPS receiver unit 25. The longitude and latitude are stored in the RAM 4 as the present position data MP. The present position data MP may be corrected by data related to the present position input from the beacon receiver unit 26 or the data transmitter/receiver unit 27.

The operation for specifying the position of the car is executed based upon the absolute direction data ZD, relative direction angle data θ, and travelled distance data ML. The position of the car found through this operation is collated with the positions of roads in the map data written into the external data GD. When the map is displayed as the picture on the display 33, the present position of the car is properly corrected and is indicated. This processing makes it possible to correctly find the present position of the car even when the GPS signals cannot be received because the user is running through tunnels or due to any other reason.

In the destination setting processing (step 51 of FIG. 7, and detailed in FIG. 8), the destination is specified through actions by the user. When the user selects, for example, a destination-setting mode, a road map with the present position at the center is shown on the display 33. As the road map is shown, characters "LIST INPUT" and "HOUSE MAP INPUT" are also displayed on the picture on the display 33. When the user touches the characters "LIST INPUT" on the picture, it is determined that the list input mode is selected.

When the list input mode is selected, a menu is shown on the picture on the display 33 that contains items to be searched, such as address, telephone number, genre, and name. When the user selects an item in the menu, destinations that meet, or are classified in a group corresponding to, the selected item are selected. When the required data are input after the items of the menu have been selected, a destination is finally selected. As required, detailed guidance to the destination can be indicated. Again, it would also be possible to use multiple selections but additional processing would be necessary for handling inconsistent or contradictary data that may be input.

In the house map input mode, the house map in the vicinity of the present position is shown on the display 33. Then, any point shown on the picture on the display 33 can be designated by the cursor to thereby identify the destination desired by the user. In this case, the cursor is so moved that the center of the cursor lies within a range of the house shape which is a desired destination.

In the list input mode or in the house map input mode, when the operation for designating the destination is finished, the user further executes the operation for confirming the destination. Then, the data related to the confirming the destination are stored, as registered destination data TP, in the RAM 4. The destination setting processing (step 51 of FIG. 7) is skipped over when no destination is newly set.

When the house map is presented in the destination setting processing (step 51), the presentation is changed over from the house map to the road map depending upon predetermined conditions. The change-over of the map is executed either by manual operation by the user or automatically. For example, when the car is running at a speed faster than a predetermined speed, the road map is indicated on the display 33. When the car is coming to a halt or is halted, or is running at a speed slower than the predetermined speed, the house map is displayed on the display 33. Furthermore, when the house map being displayed is scrolled so as to be beyond the range of coordinates in which the destination or the present position is contained, the indication is changed over to the road map.

The route search processing (step 52 of FIG. 7) determines the guide route to the destination by using the registered destination data TP, present position data MP and road data. The road number data of roads constituting the guide route are arranged in the order of roads from the start point to the destination. The thus arranged road number data are stored, as guide route data MW, in the RAM 4. When the user wishes to travel from, for example, a start point to a destination, the user designates the destination in the destination setting processing (step 51). The destination that is designated is a registered destination. The destination or a point on the road that is guided and is close to the destination, is regarded to be an end point of route EP.

The present position of the vehicle becomes a start point. The present position or a point on a road that is guided and is close to the present position, is a start point of route SP. The roads that are most suited or recommended for connecting the start point of route SP to the end point of route EP are searched automatically. The guide route is produced by selecting roads from the roads connecting the two intersections or branching points to successively connect the start point of route SP to the end point of route EP. The conditions for selecting the roads that make up the guide route are as follows: (1) the guide route that results is the shortest; (2) principal roads; and (3) roads on which the car is allowed to travel to the end point of route EP quickly and smoothly. The road number data of the roads making up the guide route are stored, as guide route data MW, in the RAM 4. The guide route search processing is equal to the processing for operating the road numbers making up the guide route based on a predetermined processing by using road data.

In the guidance indication processing (step 53 of FIG. 7), after the route search processing (step 52 of FIG. 7) has been executed either in response to a predetermined switch operation, based on a voice instruction, or automatically in case the present position has deviated from the guide route, and the guide route is set again. The route search processing is skipped over when there is no change in the guide route.

In the guidance indication processing, the guide route found by the route search processing is indicated by a thick line of a conspicuous color, such as red or blue, on the picture on the display 33. Moreover, a present position mark, representing the present position of the car, and a destination direction mark, representing the direction of the destination relative to the present position, are indicated. Guidance information provided by voice is produced from the speaker 13, and/or guidance information is portrayed on the map picture, so that the user is allowed drive his car along the guide route. The map for indicating the guide route uses a road map which includes geographical data, such as roads in the vicinity of the present position, facilities, and significant features, etc. and a house map in the vicinity of the present position. Instead of the road map, there may be used a simplified guide route picture that does not show geographical data but shows only a minimum of data, such as the guide route, the direction of the destination, and the present position, etc.

When the car has approached a guide point, such as an intersection that has been determined in advance, a map near the guide point is indicated on an enlarged scale. As the map of an enlarged scale is shown, the guide information is accompanied by presentation of the guide information by voice. The present position is corrected as the car proceeds, and the map picture is automatically scrolled in accompaniment with the movement of the car's present position. In the guide indication processing, the picture presented is changed over from the road map, or from a simple guide route picture, into a house map, or from a house map into a road map or into a simple guide route picture in response to either an instruction from the user or automatically when predetermined conditions are met.

When the running speed of the car is faster than a predetermined speed, either a road map or a simple guide route picture is displayed. When the running speed of the car becomes lower than the predetermined speed or the car comes to a halt, are conditions that the road map or the simple guide route picture can be changed over to the house map automatically. When the coordinates of the present position deviate out of the coordinate range covered by the house map that is being displayed, the map being displayed is changed over to the road map or to the simple guide route picture in the vicinity of the present position. When the car has approached within a predetermined distance from the registered destination, the map being displayed may be automatically changed over to the house map from the road map or from the simple guide route picture.

13. Destination Setting Processing

The destination setting processing according to the second embodiment is the same as the destination-setting processing of the first embodiment as shown in FIG. 8.

It is first determined whether the car is halting (step 60). The running speed data MV are read out from the RAM 4 and it is determined whether the running speed of the car is 0 kg/h or slower than a predetermined speed. When it is determined that the car is not halting, the destination setting processing (step 51) ends, and the next route search processing (step 52) is executed.

On the other hand, when it is determined at step 60 that the car is halting, it is determined whether a list input mode is being selected by the user (step 62). When the list input mode is selected, a destination is set from the list of items for searching the destination. When, for example, the destination setting processing (step 51) is started, the road map in the vicinity of the present position is displayed on the display 33. Moreover, characters "LIST INPUT" are indicated. When the user touches this indication, a touch signal is output from the touch switch 34. When the touch signal is detected, a list input flag is set.

At the step 62, it is determined whether the list input flag has been set. In the case of the list input mode, a menu for searching the destination, such as "address", "telephone number", "genre", etc. is indicated. When the user touches a character of a desired item, a touch signal corresponding to the indication is output from the touch switch 34. The flag of a corresponding item such as address flag, telephone number flag, genre flag or the like flag, is set in response to the touch signal.

At steps 64 to 68, it is determined which flags are being set. A character "RETURN" is also indicated on the menu picture. When the character "RETURN" is touched, the destination setting processing (step 51) ends, and the road map of before the menu picture is shown on the display 33. As the indication of list is erased, the road map is shown again. The item of list input is not limited to the one mentioned above but may be the "name of a company or a facility" or the "name of an individual person".

When any item is selected by the user out of the menu picture, a picture for input corresponding to the selected item is shown on the display 33 (step 74). The picture for data input is displayed based upon the destination data file and the detailed destination data file. When, for example, an item "ADDRESS" is selected, the names of metropolis and districts are first displayed on a list. Then, a list of the names of cities, towns and villages is shown on the picture. Thereafter, a display screen is shown for inputting the name of a street number, etc.

The address is input by selecting a first letter of the address or by selecting the name in the order of metropolis and districts. The address is input by the user upon touching the name of metropolis and districts or numerals indicated on the display. When an item "PHONE NUMBER" is selected, numerals 1 to 0 are indicated. When the indicated numerals are touched by the user, the touched numerals are input as a telephone number.

When an item "GENRE" is selected, a list of the names of a plurality of genres is indicated on the display. When a desired genre indication is touched on the list shown on the display, the genre that is touched is selected. Then, the places corresponding to the selected genre are indicated on the display 33 being arranged in the alphabetical order or in the order of metropolis and districts. The user touches a desired name in the list shown on the display. The touched name is thus selected. As a particular place which is a destination is thus designated by using a list which is displayed successively on the picture, the thus designated destination is stored in the RAM 4 (step 76). The coordinate data of each of the places that may be designated as a destination and that have been stored in the destination data file are the coordinate data of a particular point determined for each of the places. For example, the center coordinates of a site of a place are regarded as coordinate data.

When indication of the house map is requested at a moment when the destination setting processing (step 51) is started (step 78 is YES), the destination is designated by using the house map that is displayed (step 80). The processing at step 80 is the same as that of step 76. The switch for setting the destination may be an operation switch provided neighboring the picture or the cursor indicated on the display 33 in addition to the touch switch 34.

14. Destination Designation Processing

Figure 13:
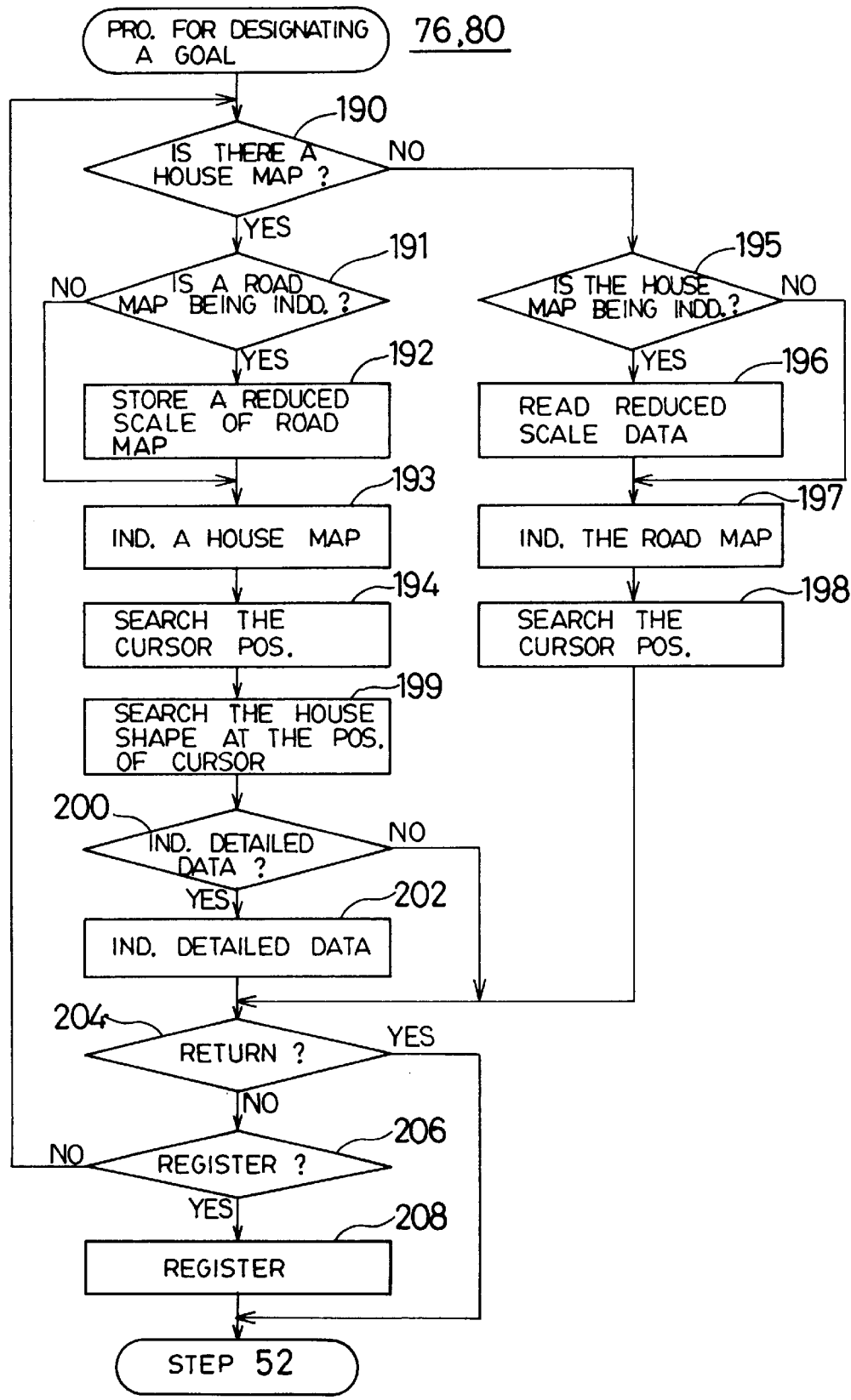
FIG. 13 is a flow chart illustrating a process for designating a destination of the second embodiment.

However, in the second embodiment, FIG. 13 is a flow chart illustrating the destination designation processing at steps 76 and 80 of FIG. 8. In this processing, the house map is indicated on the display 33 when house map data for indication have been stored in the data storage unit 37. Then, a place designated by using the cursor KL is searched based upon the house shape data. The place that is searched is stored, as the registered destination TP, in the RAM 4. When requested by the user, detailed data of the place designated by using the cursor KL are shown on the display 33.

In FIG. 13, it is determined whether the house map for designating the destination has been stored (step 190). In the case of step 76 of FIG. 8, it is determined whether there are house map data including coordinates of the particular place selected at step 74 of FIG. 8. In the case of step 80 of FIG. 8, it is determined whether there are house map data including coordinates of the present position. When the picture is scrolled, furthermore, it is determined whether there are house map data inclusive of coordinates of the center of the cursor. It is presumed that the house map data stored in the data storage unit 37 are, for example, map data defining a square range. It is then determined whether the coordinates of the above-mentioned particular place, coordinates of the present position or coordinates of the center KLC of the cursor exist within a range surrounded by the coordinates of four vertexes of the house map data. When these coordinates lie within a square range of the house map data, it means that the house map that can be displayed has been stored in the data storage unit 37.

When there are house map data that include coordinates of the above-mentioned particular place, coordinates of the present position or coordinates of the center of the cursor, it is then determined whether the road map has been indicated on the display 33 (step 191). Here, it is determined whether the house map being-indicated flag HF is off. When the road map is shown, the reduced scale of the road map that is shown is stored in the RAM 4 (step 192). When the house map is not shown on the display 33, on the other hand, the processing at the step 192 is not executed. The CPU 2 then reads the house map data in the vicinity of the present position from the house map data file. The house map data that are read out are sent to the image processor 9. Then, the display 33 displays the house map with the present position at the center of the picture (step 193). When the house map is shown on the display 33, as described above, the house map being-indicated flag HF is turned on.

The colors used on the house map are, for example, such that roads and vacant lots are indicated by white, buildings of individuals and companies are indicated by grey, and public facilities are indicated by orange. That is, colors of buildings are classified depending upon the attribute of the buildings or the places. There is, as a matter of course, no limitation on the basis for sorting by colors or on the colors that are indicated other than as previously noted. When a particular place is designated by successively selecting the items on the list indicated on the picture, the coordinate data in the destination data for this particular designated place are read out. Then, the house map displayed such that the point determined by the coordinate data is located at the center of the picture on the display 33.

When the house map is shown on the display 33 (step 193), the cursor KL is indicated at the center of the picture on the display 33. Furthermore, the coordinates of the center KLC of the cursor KL are determined by the CPU 2 (step 194). The place inclusive of coordinates of the center KLC of the cursor KL is searched from the house shape data file (step 199).

For instance, the coordinates of the center KLC of the cursor are found by operating the center of the coordinate range of the picture shown on the display 33. The house shape data included in the house map shown on the display 33 are successively read out from the house shape data file. The house shape data, including the coordinates of the center KLC of the cursor, are searched using the shape data included in the house shape data that are read out.

For example, maximum X-coordinates and Y-coordinates, as well as minimum X-coordinates and minimum Y-coordinates can be found from the shape data (X0, Y0) to (X5, Y5) of the house shape HS shown in FIG. 6. It is then determined whether the X-coordinate (Xc) at the center KLC of the cursor is a value lying between the maximum X-coordinate and the minimum X-coordinate. This determination is accomplished by the comparison of the X-coordinate (Xc) of the center KLC of the cursor with the maximum X-coordinate and minimum X-coordinate.

It is similarly determined whether the Y-coordinate (Yc) at the center KLC of the cursor is a value lying between a maximum Y-coordinate and a minimum Y-coordinate. Here, when the coordinate of the center KLC of the cursor lies between the maximum values and minimum values of X-coordinates and Y-coordinates in the house shape HS, the gradient of a straight line is calculated connecting the coordinates of the center KLC of the cursor to the coordinates of the house shape HS. The thus found gradient is compared with the gradients of straight lines surrounding the circumference of the house shape HS. Depending upon the comparison of the gradient of the straight line, it is determined whether the center KLC of the cursor lies within the range of a planar house shape SH.

For example, as shown in FIG. 10, there are calculated a gradient al of a straight line Lc connecting the center KLC of the cursor to the coordinates (X2, Y2), a gradient a2 of a straight line L2 connecting the coordinates (X1, Y1) to the coordinates (X2, Y2), and a gradient a3 of a straight line L3 connecting the coordinates (X2, Y2) to the coordinates (X3, Y3). The gradients of the straight lines LC, L2 and L3 are compared with each other to determine whether the center KLC of the cursor exists between the straight lines L2 and L3. The same operation is executed for the other straight lines L1, L4, L5 and L6. Comparison of the gradients of the straight lines indicate whether the center KLC of the cursor lies within a range surrounded by the straight lines L1 to L6 that surround the outer circumference of the house shape HS.

As the house shape data, including the coordinates of the center KLC of the cursor, are searched as described above, it is then determined whether display of detailed data is requested (step 200). This determination is executed based upon whether the characters "DETAILED DATA" indicated on the display 33 are touched by the user. When the indication of detailed data is requested, the list picture data included in the house shape data searched at the step 199 are read out and are sent to the image processor 9 (step 202). Then, the display 33 displays, in the form of a list, the contents of the detailed data related to the place at the center of the cursor.

When the house shape HS is, for example, a building housing a plurality of shops and companies, a list is displayed showing the names of the shops or companies, their telephone numbers, and kinds of shops or companies in each of the rooms. When the user is looking for, for example, a bookstore and when the bookstore is located on the second floor of the building, he will easily identify the bookstore on the list. When the display of detailed contents is not requested by the user for a predetermined period of time, on the other hand, the processing at step 202 is not executed. That is, the list of "DETAILED DATA" is not displayed.

Next, it is determined whether a command is input to end the processing (step 204). That is, it is determined whether, for example, the character "RETURN" indicated on the display 33 is touched by the user. When the end of processing is requested, the destination designation processing (steps 76, 80 of FIG. 8) ends, and the next route search processing (step 52 of FIG. 7) is executed. When the end of processing is not requested, it is then determined whether the destination is registered (step 206). For example, the word "REGISTER" is shown on the picture on the display 33. Whether the user has touched the indicated word "REGISTER" is determined by the use of a signal output from the touch switch 34. When the destination is registered, the house shape data searched at the step 199 are stored, as registered destination data TP, in the RAM 4 (step 208).

When the destination has not been registered, it is determined whether the user has moved the cursor KL. When the cursor KL is moved, it is determined that the destination is changed. As the cursor KL is moved, the picture is scrolled. The map picture shown on the display 33 is scrolled that the center KLC of the cursor remains at the center of the picture at all times. When the scrolling is discontinued, the program returns back to step 190, and the coordinates of the center KLC of the cursor are found (step 194). Then, the house shape data including the center KLC of the cursor are searched (step 199). When it is requested to show the detailed data, a list of detailed data is shown (steps 200, 202).

When the range of the house map, shown on the display 33, has run out accompanying the scrolling of the picture, the map indicated on the display 33 is changed over from the house map to the road map. That is, when the range of coordinates indicated on the display 33 deviates out of the coordinates at the edges of the house map data, the result of determination at step 190 becomes NO. When the result of determination at step 190 is NO, the map shown on the display 33 is changed over to the road map with the coordinates of the center KLC of the cursor at the center of the picture (step 197).

On the other hand, when it is determined at step 190 that the data storage unit 37 does not store the house map data that include coordinates of the above-mentioned particular place, coordinates of the present position or coordinates of the center of the cursor, the processing of step 195 is executed. At step 195, it is determined whether the house map is being indicated on the display 33. This is determined depending upon whether the house map being-indicated flag HF is on. Here, when the road map has been indicated already, there is no need to change the map indication mode, and no processing is executed at next step 196. On the other hand, when the house map is being indicated, the indication mode on the display 33 is changed over to a mode for showing the road map. In this case, the reduced scale data SD stored in the RAM 4 are read out, the reduced scale data SD having been stored at the time when the road map indication mode was changed over to the house map indication mode (step 196).

Then, in the road map in the vicinity of the present position, the road map data of a reduced scale that meet the above-mentioned reduced scale data SD are read out from the road map data file and are sent to the image processor 9. Then, the display 33 displays the road map having coordinates of the above-mentioned particular place, present position or center of the cursor at the center of the picture (step 197). Since the road map is indicated on the display 33, the house map being indicated flag HF is reset to be turned off. As the road map is shown on the display 33, the cursor KL is indicated at the center of the picture on the display 33. Then, the geographical coordinates of the center KLC of the cursor are found (step 198).

It is then determined whether a command is input to end the destination designation processing of FIG. 13 (step 204). That is, it is determined whether the character "RETURN" indicated on the display 33 is touched by the user. When the end of processing is requested, the destination designation processing of FIG. 13 ends, and the next route search processing (step 52 of FIG. 7) is executed.

When there is no request to end the processing, it is then determined whether the operation is executed to register the destination (step 206). For instance, the word "REGISTER" is shown on the picture on the display 33. Whether the indicated word "REGISTER" is touched by the user is determined using the output signal of the touch switch 34. When the operation for registration is executed, the house shape data searched at the step 199 are stored, as registered destination data TP, in the RAM 4 (step 208).

When the operation for registration is not executed, it is determined whether the user has moved the cursor KL. When the cursor KL is moved, it is determined that the destination is changed. Upon moving the cursor KL, the picture is scrolled. Then, the map picture shown on the display 33 is scrolled. The map picture indicated on the display 33 is scrolled so that the center KLC of the cursor is at the center of the picture at all times. When the scrolling is discontinued, the program returns back to step 190 where the coordinates of the center KLC of the cursor are found (step 198).

When the house map is within the coordinate range shown on the display 33 with the center KLC of the cursor at the center of the picture as a result of scrolling the picture, the result of the determination at step 190 is YES. As a result, the display 33 shows the house map with the coordinates of the center KLC of the cursor at the center of the picture (step 193).

15. Map Changeover Processing

Figure 14:
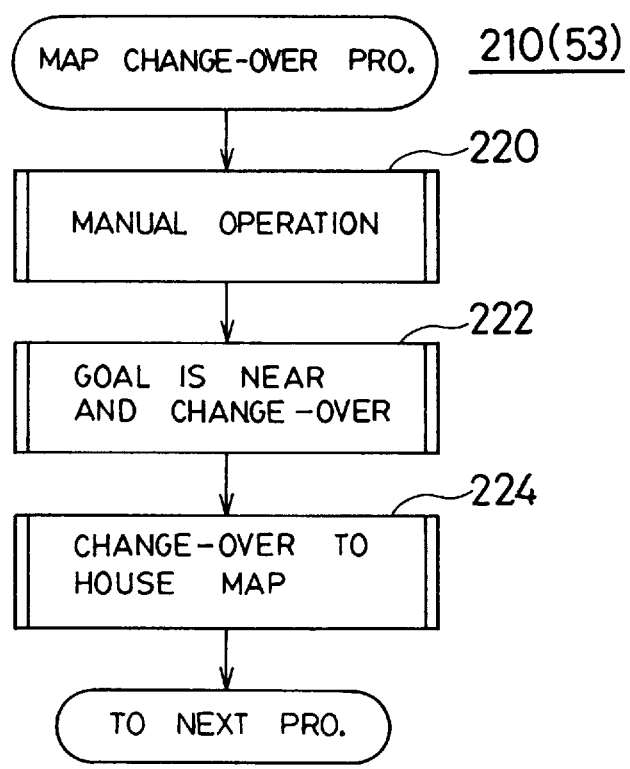
FIG. 14 is a flow chart illustrating the process for switching the map of the second embodiment.

FIG. 14 is a flow chart of a map change-over processing, a step 210 executed in the guide indication processing (step 53 of FIG. 7). The map change-over processing step 210 executes a manual operation processing (step 220), a destination approach change-over processing (step 222), a house map change-over processing (step 224), and other processings. In the manual operation processing (step 220), the mode for indicating the house map and the mode for indicating the road map are changed over depending upon a manual operation by the user.

In the destination approach change-over processing (step 222), the mode for indicating the road map is changed over to the mode for indicating the house map when a straight distance between the car that is moving and the registered destination becomes smaller than a predetermined distance. In the house map changeover processing (step 224), display of the house map is permitted when the running speed of the car becomes slower than a predetermined speed or when the car comes to a halt. Conversely, display of the house map is inhibited when the running speed of the car exceeds the predetermined speed.

The road map is displayed when the house map data in the vicinity of the present position shown on the picture on the display 33 are no longer stored in the data storage unit 37. In other processings, the mode for indicating the house map and the mode for indicating the road map are changed over depending upon other change-over conditions.

16. Processing for Manual Processing

Figure 15:
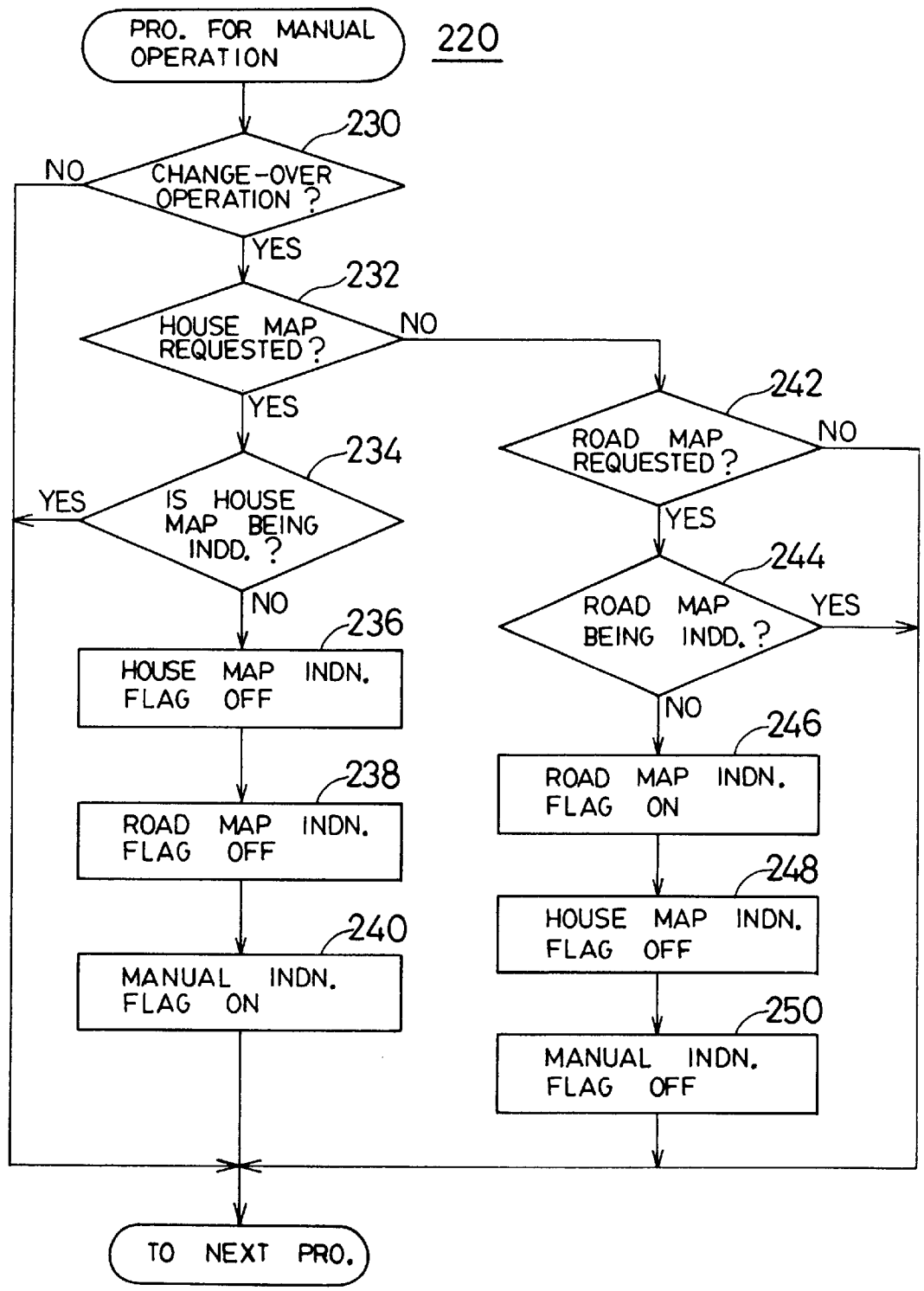
FIG. 15 is a flow chart illustrating a process for manual operation of the second embodiment.

FIG. 15 is a flow chart illustrating the manual operation processing (step 220) of FIG. 14. It is first determined whether there is an attempt to change over the indication mode on the picture (step 230). In other words, it is determined whether the user has requested to change over the indication mode. In requesting the indication mode to be changed over, it is further determined whether the display of a house map is requested or a display of a road map is requested (steps 232, 242).

When display of the house map is requested, it is then determined whether the picture shown on the display 33 is a house map (step 234). This is determined by relying upon whether the house map being-indicated flag HF is on. The house map being-indicated flag HF is set to be on when the house map is shown on the display 33 and is reset to be off when the road map is shown. The house map being-indicated flag HF is reset to be off in the initialization processing.

When the house map is being shown already, there is no need to change over the map indication mode and the manual operation processing (step 220) ends. When the road map is being shown, the house map indication flag JF is set to be on (step 236) and the road map indication flag DF is set to be off (step 238). The house map indication flag JF is set to be on when the house map is shown on the display 33 and is reset to be off when the road map is shown. The road map indication flag DF is set to be on when the road map is shown on the display 33 and is reset to be off when the house map is shown. In the initialization processing, the house map indication flag JF is reset to be off and the road map indication flag DF is set to be on.

When the house map indication flag JF is set to be on, it is determined in the house map change-over processing (step 224), that will be described later, whether the house map can be shown on the display 33. Then, a manual indication flag MF is set to be on (step 240). The manual indication flag MF is the one for storing the fact that showing of the house map has been requested by a manual operation. When it is requested to indicate the road map by a manual operation, on the other hand, the manual indication flag MF is reset to be off (step 250).

When the road map indication mode is requested (step 242) by the indication mode switching operation by the user, it is determined whether the picture indicated on the display 33 is a road map (step 244). This is determined depending upon whether the house map being-indicated flag HF is off. When the road map is being shown already, there is no need to change over the map indication mode. Then, the manual operation processing (step 220) of FIG. 15 ends. When the house map is indicated, on the other hand, the road map indication flag DF is set to be on (step 246) and the house map indication flag JF is reset to be off (step 248). When the road map indication flag DF is set to be on, the road map is shown on the display 33 depending upon a determination of conditions executed by the house map change-over processing (step 224) that will be described later. The manual indication flag MF is then reset to be off (step 250).

17. Destination Approach Changeover Processing

Figure 16:
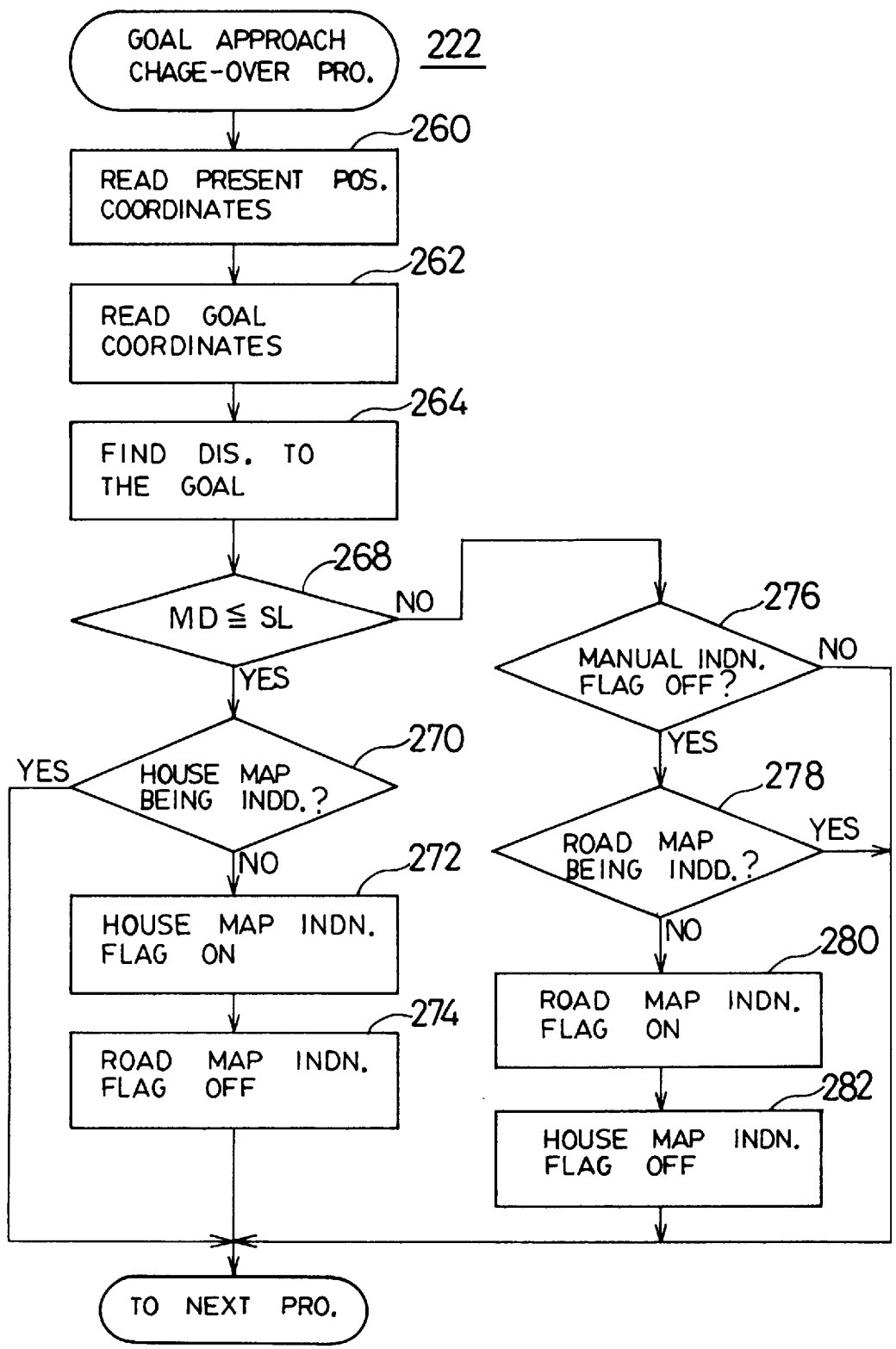
FIG. 16 is a flow chart illustrating the process for switching maps when the destination is approached of the second embodiment.

FIG. 16 is a flow chart of the destination approach changeover processing (step 222) of FIG. 14. In this processing, the house map is shown on the display 33 when the distance between the present position of the car and the registered destination comes within a predetermined distance. The route up to the registered destination is then guided using the house map. When the distance between the present position and the registered destination is larger than the predetermined distance, the road map is shown on the display 33.

First, the present position data MP and the registered destination data TP are read out from the RAM 4 (steps 260, 262). A difference is found between the coordinate value of the present position of the car and the coordinate value of the registered destination. A straight distance from the present position to the registered destination is found depending upon a difference in the coordinate values. The thus found distance is stored, as destination distance data MD, in the RAM 4 (step 264). When the car is running, therefore, the destination distance data MD is updated at all times. A remaining distance of when the car runs from the present position MP to the end point of route EP along the route MW, may be used as the destination distance data MD instead of the above-mentioned straight distance.

Next, it is determined whether the distance from the present position of the car to the registered destination is approaching the predetermined distance (step 268). For example, it is determined whether the destination distance MD is smaller than a reference distance SL. The reference distance SL is also used for judging whether the processing for guiding the route using the house map is to be started. The reference distance SL has been stored in advance in the flash memory 3.

Here, when MD≦SL, it means that the present position of the car is approaching the destination, and a processing is executed for showing the house map on the display 33. It is first determined whether the house map is being shown on the display 33 (step 270). This is determined based upon whether the house map being-indicated flag HF is on. When the house map is already being shown, there is no need to change over the map indication mode and the destination approach change-over processing (step 222) ends.

When the road map is shown, on the other hand, the house map indication flag JF is set to be on (step 272) and the road map indication flag DF is reset to be off (step 274). With the house map indication flag JF being set to be on, it is determined in the house map change-over processing (step 224), that will be described later whether the house map can be shown on the display 33. In the house map changeover processing that will be described later, therefore, the house map is shown when the conditions are satisfied.

On the other hand, when the destination distance MD is larger than the reference distance SL, a processing is carried out to show the road map on the display 33. That is, the processing after the step 276 is started. At the step 276, it is determined whether the manual indication flag MF is off. When display of the house map has been requested by the user in the above-mentioned manual operation processing (step 220), this request of the user takes precedence. When the manual indication flag MF is on, therefore, the processing after step 278 is neglected. As a result, the house map indication mode continues.

When it is determined at step 276 that the manual indication flag MF is off, it is then determined whether the picture shown on the display 33 is a road map (step 278). This is determined on the basis of whether the house map being-indicated flag HF is off. When the house map being-indicated flag HF is off, the road map is already shown and there is no need to change over the map indication mode.

Therefore, the destination approach change-over processing (step 222) ends. When the house map is shown, on the other hand, the road map indication flag DF is set to be on (step 280) and the house map indication flag JF is reset to be off (step 282). With the road map indication flag DF being set to be on, the road map is shown on the display 33 in the house map change-over processing (step 224) that will be described later only when other conditions are satisfied.

18. House Map Changeover Processing

Figure 17:
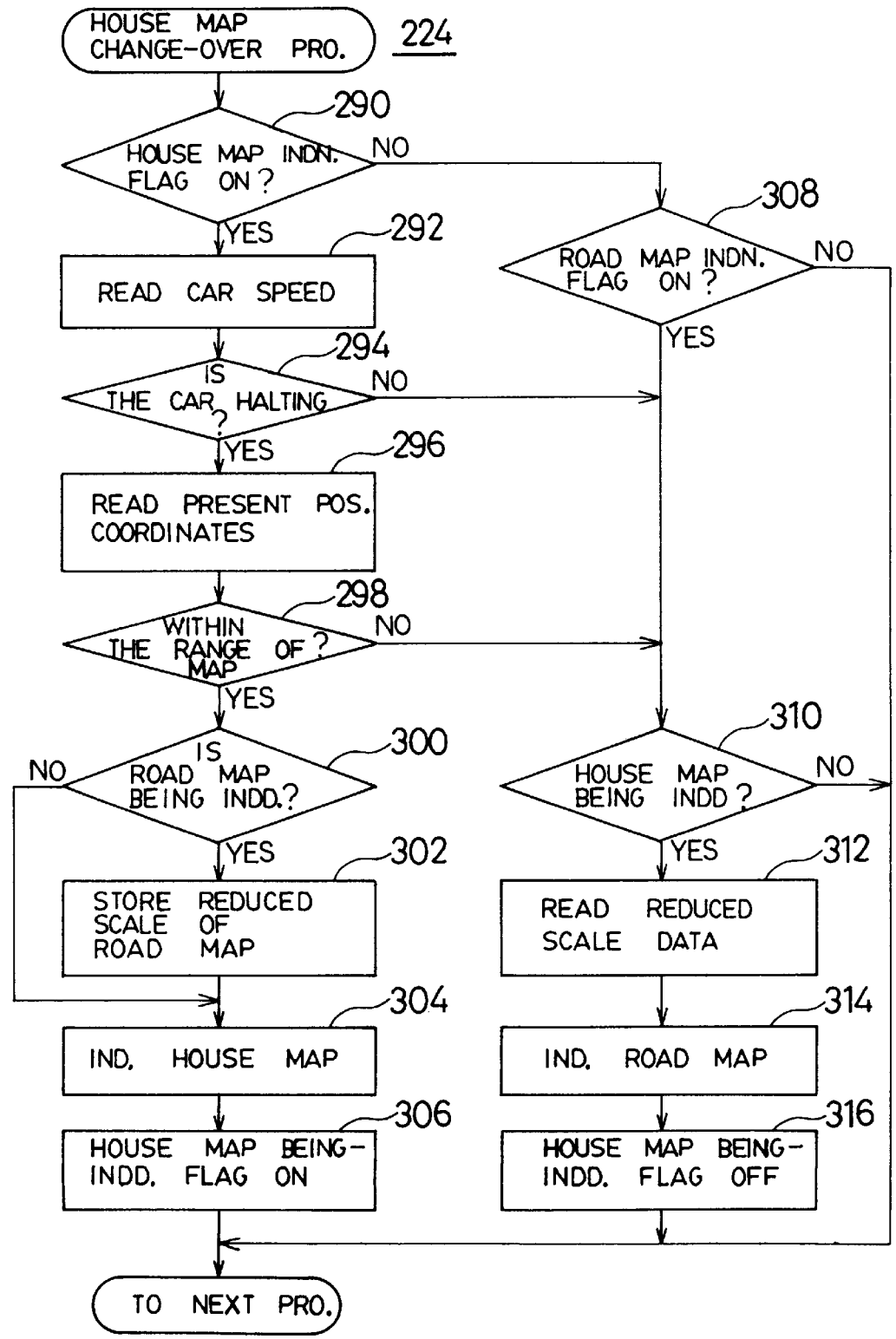
FIG. 17 is a flow chart illustrating the process for switching to a house map of the second embodiment.

FIG. 17 is a flow chart of the house map change-over processing (step 224) of FIG. 14. In this processing, the house map is shown on the display 33 when the house map indication flag JF is set to be on in the manual operation processing (step 220) and in the destination approach change-over processing (step 222). When the road map indication flag DF is set to be on, on the other hand, the road map is shown on the display 33. The house map can be shown when the running speed of the car becomes slower than a predetermined speed or when the car comes to a halt. Therefore, display of the house map is inhibited when the running speed of the car is greater than the predetermined speed. The road map is also shown when there is no house map data in the vicinity of the present position that can be displayed on the picture of the display 33. When the data of the house map that can be shown on the display 33 have not been stored in the data storage unit 37, only the road map is shown on the display 33.

In this processing, it is determined whether the house map indication flag JF is on (step 290). When the house map indication flag JF is on, it means that the house map can be shown and it is further determined whether other conditions are satisfied. First, the running speed data MV are read out from the RAM 4 (step 292). Based upon the running speed data MV, it is determined whether the car is halting (step 294). The running speed data MV are updated at all times based upon the data signals from the car speed sensor 24.

That is, it is determined whether the running speed of the car detected by the car speed sensor 24 is 0 kg/h or is slower than a predetermined speed. When it is determined that the running speed of the car is slower than the predetermined speed, the house map can be shown. Next, it is determined whether the house map in the vicinity of the present position of the car has been stored in the data storage unit 37. That is, the present position data MP are read out from the RAM 4 (step 296). It is then determined whether the data storage unit 37 stores the house map data which include coordinates of the present position data MP and are capable of indicating the house map over the entire picture on the display 33 (step 298).

When it is determined that the house map can be shown, it is then determined whether the road map is shown on the display 33 (step 300). This is determined depending upon whether the house map being indicated flag HF is off. When it is determined that the road map is being shown, the reduced scale of the road map being shown is stored, as reduced scale data SD, in the RAM 4 (step 302). When the house map is shown on the display 33, on the other hand, step 302 is not executed.

The house map data in the vicinity of the present position are read out from the house map data file and are sent to the image processor 9. Then, the display 33 shows the house map with the present position of the car at the center of the map (step 304). Since the house map is shown on the display 33, the house map being-indicated flag HF is set to be on (step 306).

On the other hand, when it is determined at step 290 that the house map indication flag JF is off, it is then determined whether the road map indication flag DF is on (step 308). Here, when the road map indication flag DF is on, the road map is shown.

Even though it is requested to show the house map, the road map is shown when the car is running at a speed faster than the predetermined speed (step 294 is NO) or when the data storage unit 37 does not store the house map data for displaying the house map in the vicinity of the present position on the display 33 (step 298 is NO).

When the result of the determination at step 308 is YES, when the result of the determination at step 294 is NO or when the result of the determination at step 298 is NO, it is then determined whether the house map is shown on the display 33 (step 310). This is determined depending upon whether the house map being-indicated flag HF is on. Here, when the road map is already shown, there is no need to change the map indication mode. Therefore, the house map change-over processing (step 224) of FIG. 17 ends. On the other hand, when it is determined at step 310 that the house map is shown, the indication mode is changed over to the road map indication mode. When the house map indication mode is changed over to the road map indication mode, the reduced scale data SD stored in the RAM 4 are read out at a step 312 (stored at step 302).

Then, the road map data in the vicinity of the present position of the vehicle are read out from the road map data file at the same reduced scale as the reduced scale data SD. The road map data that are read out are sent to the image processor 9. Then, the display 33 shows the road map with the present position at the center of the screen (step 314). Then, the house map being-indicated flag HF is reset to be off (step 316).

According to this embodiment, as described above, when the destination is selected by the list input in the destination setting processing (step 51), the house map of a range including the selected destination is automatically shown on the display 33 (step 76 of FIG. 8, step 92 of FIG. 9). Therefore, the area around the destination can be observed in greater detail. When the car is running at a speed faster than a predetermined speed, the destination is inhibited from being set (step 60 of FIG. 8). When the car is running at a speed faster than a predetermined speed, further, display of the house map is also inhibited while the destination is being set. Thus, the user finds it convenient to use the navigation device.

When the range of the picture with the destination, present position or the center of cursor at the center of the picture lies outside the coordinate range of the house map stored in the data storage unit 37, it is not possible to show the house map over the entire picture on the display 33. In this case, the house map that is desired is automatically replaced by the road map (steps 190, 197 in FIG. 13). The road map that is substituted for the house map is the map of the same region as the house map that had been desired. Thus, indication of the map on the display 33 is not interrupted.

When the manual operation is carried out (step 220 in FIG. 14), a map desired by the user is shown on the display 33. That is, the map picture shown on the display 33 is changed over to either the house map or the road map as desired by the user. When the vehicle is running, for example, the data related to the guide route can be easily obtained from the road map. In setting a point, such as destination, on the other hand, the house map can be shown, and detailed data related to the points can be easily obtained from the house map. This enables the user to easily set and register a desired destination.

When the car is running at a speed faster than a predetermined speed, display of the house map is not permitted (step 294 in FIG. 17). The map picture that is shown on the display 33 can be seen more reliably. This is because the house map has a large detailed scale thereby offering considerably detailed data of house shapes. When a guide route is shown on such a detailed house map, the map picture is quickly scrolled to accompany the movement of the car. Therefore, it becomes difficult to confirm the geographical environment in the vicinity of the running position of the car from the map shown on the display 33. When the car is running at a speed faster than the predetermined speed, therefore, display of the house map is inhibited, and the user is furnished with map data that can be seen reliably at all times.

When the present position of the car has approached within a predetermined distance from the destination, the map data that are shown are automatically changed over to the house map (step 222 in FIG. 14). This enables the user to easily recognize that he/she is near the destination. In addition, as the house map is automatically shown, the user is allowed to easily confirm the destination from detailed data of the point (that is the shape of building and surroundings). This prevents the occurrence that the user is not sure where the destination is and passes by the destination when nearby.

When the map data are changed over, the reduced scale of the map data before being changed over is stored in the memory (step 302 in FIG. 17). Therefore, even when the house map is changed over again to the road map on the display 33, the scale of the map is not changed unnecessarily. Accordingly, the user does not have to set again the reduced scale of the map every time the map is changed over.

The processings in the second embodiment can be combined in a variety of ways. For instance, map change-over processing by manual operation is combined with the map changeover processing when the car is running at a speed faster than the predetermined speed. Therefore, even when the map shown on the display 33 is changed over to the house map by manual operation, the house map is shown only when the car is running at a speed slower than a predetermined speed. That is, when the car is running at a speed faster than the predetermined speed, the operation for showing the house map executed by the user is ignored. Therefore, the user is furnished with map indication that can be reliably seen at all times. By combining the processings together as described above, it is possible to realize a navigation device having a high commercial value. When the data storage unit 37 stores house maps of different reduced scales covering the same area, the house map may be indicated even when the car is running at the predetermined speed.

19. Drop in Place Setting Routine

Figure 18:
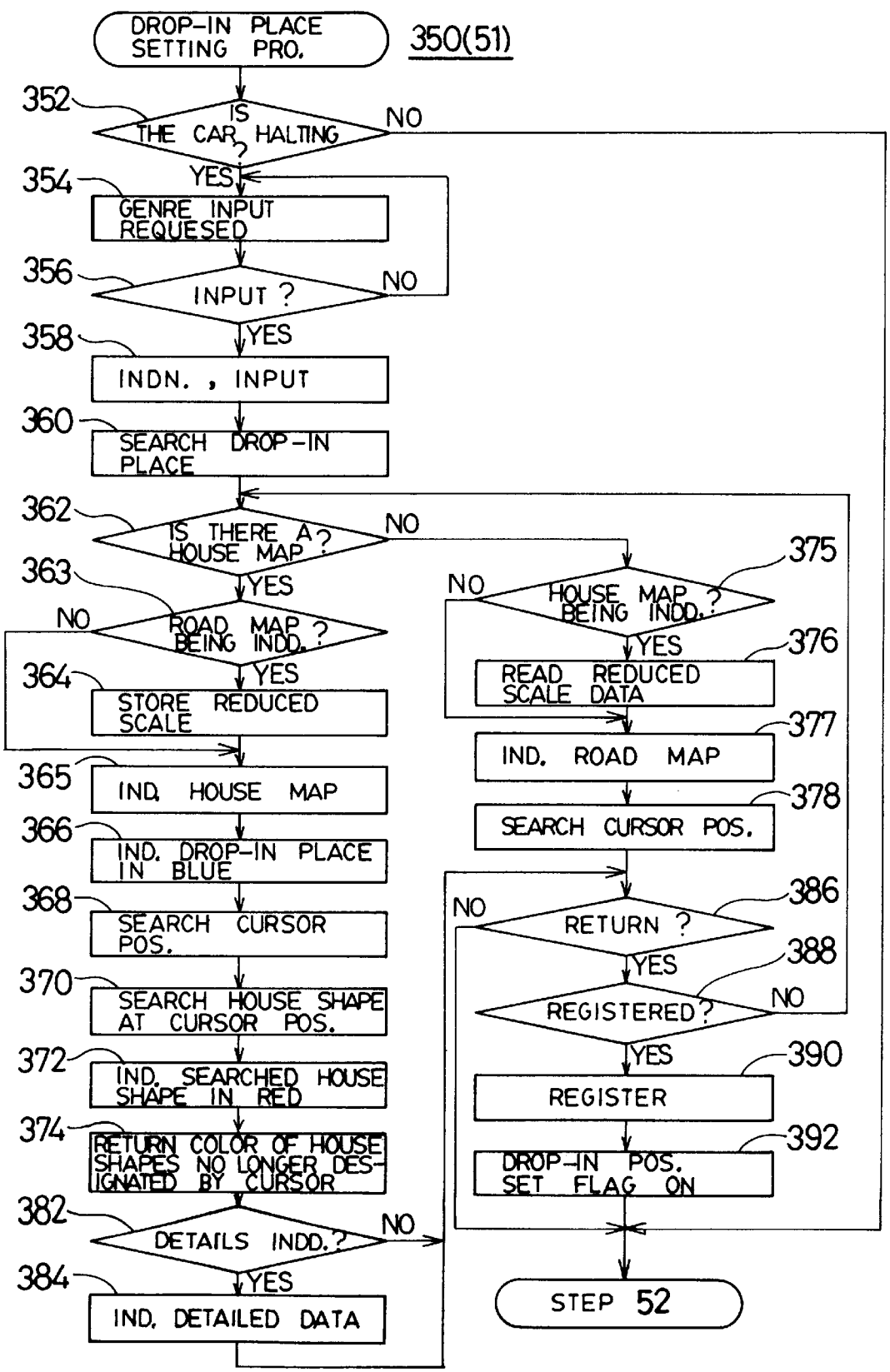
FIG. 18 is a flow chart illustrating a process for setting a place to be dropped in of the second embodiment.

When the vehicle is running along the guide route, it may often be required to process events that are necessary for living activities. The events necessary for the living activities may include meals, shopping, and filling the car with gasoline, etc. In such cases, the navigation device may be used to search if there are places near the present position of the car desired by the user. FIG. 18 is a flow chart of a processing for setting drop-in places that will be executed in the above-mentioned cases. The drop-in places stand for the places where the user may wish to drop in to process events necessary for living activities.

The drop-in setting processing (step 350) is provided as a subroutine in the destination setting processing (step 51 of FIG. 7) and is commenced in response to the switch operation for setting a drop-in place. The drop-in place setting processing (step 350) is repetitively executed like the present position-obtaining processing (step 50), route search processing (step 52) and guide indication processing (step 53). The RAM 4 has been provided with a register for storing recommended drop-in place data DK, drop-in place data DP, search range data SA, search condition data Ki and drop-in place setting flag TF (see FIG. 12).

First, it is determined whether the car is halting or is running at a speed slower than the predetermined speed (step 352). This is the same processing as that of step 60 of FIG. 8. When the car is running at a speed faster than the predetermined speed, the drop-in place setting processing (step 350) is not executed. When the car is halting, a picture for promoting the input of genre is shown on the display 33 (step 354).

For example, a list of names of a plurality of genres is shown on the display 33, similar to step 68 of FIG. 8. The user may select a genre of a place where he wishes to drop in out of the list that is shown (step 356). Then, the display 33 indicates a picture for specifying the range of search and search conditions (step 358). The range of search may be the one defined by a predetermined distance from the present position of the vehicle or the one defined by a city, a town or a village where the vehicle is now located. The search conditions may include, for example, parking lot, business time, and fees, etc. which serve as conditions for selection by the user. The data corresponding to these conditions have been stored in the detailed destination data file.

When the range of search and the search conditions are set by the user, the drop-in places are searched based upon the conditions (step 360). Therefore, the places that meet the selected genre and input conditions within a range of search selected by the user, are searched from the destination data file and the detailed destination data file. The searched places are stored as recommended drop-in place data in the RAM 4.

Next, it is determined whether the data storage unit 37 stores a house map that has the present position or the center KLC of the cursor at the center of the picture (step 362). The processing at the step 362 is the same as the processing at the step 90 of FIG. 9. Therefore, if the data storage unit 37 stores the house map data having the present position or the center KLC of the cursor at the center of the picture, then, the house map can be shown on the display 33. Next, it is determined whether the map that is now shown on the display 33 is a road map (step 363). When the road map is shown, the road map that is shown is changed over to the house map. The reduced scale of the road map that is indicated is stored in the RAM 4 (step 364). When the house map is shown on the display 33, on the other hand, the processing of the step 364 is not executed.

Next, the house map data of a range having the present position of the vehicle or the center KLC of the cursor at the center of the picture, are read out from the data storage unit 37. The house map data that are read out are sent to the image processor 9. Then, the house map is shown on the display 33 (step 365). When display of the house map is commenced, the house map being-indicated flag HF is set to be on. Due to the processing at step 360, the area of the house shape of a place which is a recommended drop-in place is displayed in blue color (step 366).

In the processing at step 366, the recommended drop-in place data stored in the RAM 4 are read out. House shape data corresponding to the recommended drop-in place data are searched from the house shape data file. The searched house shape data are stored in the RAM 4. Moreover, the shape data are read out from the house shape data stored in the RAM 4. The plane range on the house map specified by the shape data is shown in blue color on the picture on the display 33.

Figure 19:
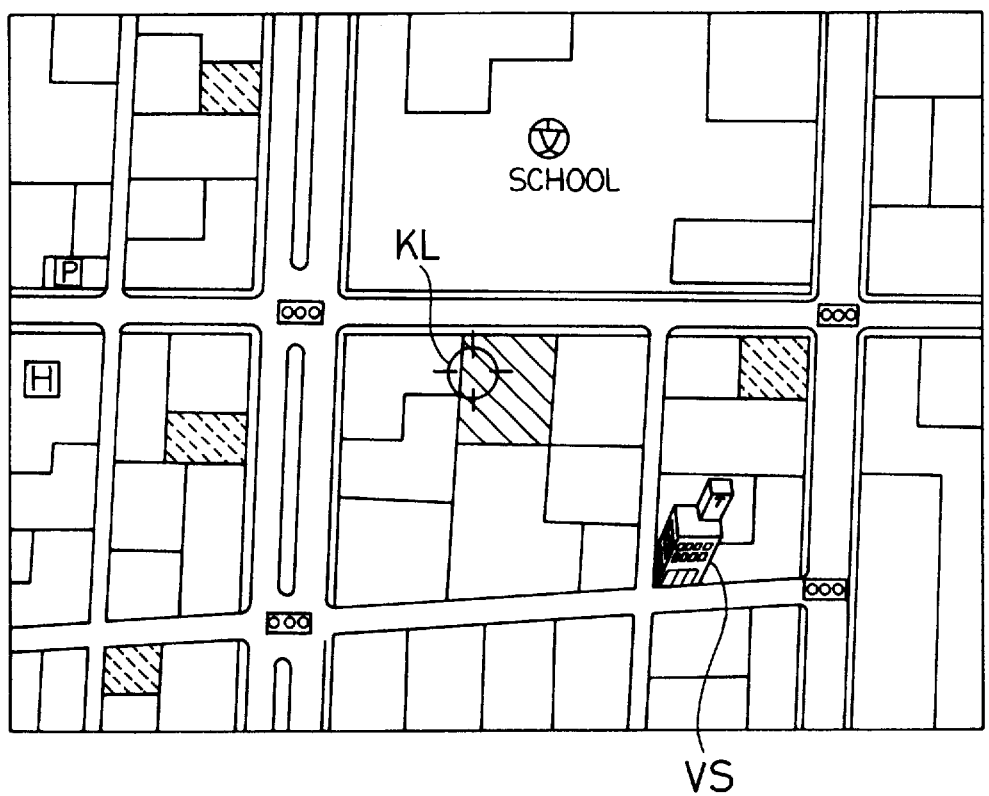
FIG. 19 is a diagram illustrating a color indication and a solid indication of a house shape of the second embodiment.

FIG. 19 illustrates a state where the house map is shown on the display 33. In the case of FIG. 19, the house shape of a place corresponding to the designated genre is indicated in blue color. In FIG. 19, such places are portions hatched with broken lines. As described above, house shapes corresponding to the conditions can be discerned on the display 33. That is, house shapes shown in a particular state can be recognized to be recommended drop-in places.

Next, coordinates of the center KLC of the cursor are searched (step 368). The house shape designated by the coordinates of the center of the cursor is searched from the house data file in the data storage unit 37 (step 370). The searched house shape data are stored in the RAM 4. Then, the shape data are read out from the searched house shape data. The coordinate range of the shape data is indicated in red color on the picture on the display 33. That is, the house shape of a place designated by the center KLC of the cursor is indicated in red color on the picture on the display 33 (step 372). In FIG. 19, this place is shown hatched with solid lines.

The house shape of a place designated by the center KLC of the cursor may be indicated as a solid picture. The solid picture is a plane figure of solid appearance. For instance, the solid picture VS shown in FIG. 19 is indicated on a portion of the picture designated by the center KLC of the cursor. The solid picture VS is a perspective figure of the appearance at a place designated by the center KLC of the cursor. In FIG. 19, the solid picture VS is shown deviating from the center KLC of the cursor. In practice, however, the solid picture VS is indicated at a position of house shape where the center KLC of the cursor exists.

When the house shapes are no longer designated by the center KLC of the cursor, as a result of the motion of the cursor KL, the house shapes that had been indicated in red color or as solid pictures are returned back to the initial state of indication (step 374). That is, when the house shape designated by the center KLC of the cursor is the one of a place corresponding to the genre selected by the user, the color indication of the house shape is returned back to blue color from red color or the like color when it is no longer designated by the cursor KLC.

Thus, the house shape data designated by the center KLC of the cursor are searched. Next, it is determined whether a display of detailed data is requested (step 382). This determination is executed by detecting, for example, whether the words "DETAILED DATA" shown on the display 33 are touched by the user. When display of the detailed data is requested, the picture data in the list included in the house shape data searched at the step 370 are read out from the data storage unit 37. The picture in the list that is read out is sent to the image processor 9 (step 384). Thus, the contents of detailed data related to a place designated by the center of the cursor is shown on the display 33 in the form of a list like the processing at the step 202 of FIG. 13.

Next, it is determined whether ending the drop-in place setting processing of FIG. 18 is requested (step 386). It is, for example, determined whether the word "RETURN" shown on the display 33 is touched by the user. When the indicated character "RETURN" is touched, it is determined that ending the drop-in place setting processing is requested. When ending this processing is requested, the next route search processing (step 52 of FIG. 7) is executed.

When the end of the processing is not requested, it is then determined whether the drop-in place registration processing is requested (step 390). For instance, the word "REGISTER" is shown in the picture on the display 33. Whether the user has touched this indicated word "REGISTER" is determined relying upon an output signal from the touch switch 34. When the word "REGISTER" is touched, therefore, it is determined that the drop-in place registration processing is requested. When the registration processing is requested, the house shape data searched at the step 370 are stored, as drop-in place data DP, in the RAM 4 (step 208).

When the registration processing is not requested, it is determined whether the user has moved the cursor KL shown on the picture on the display 33. When the cursor KL is moved, it is determined that the drop-in place is changed. When the cursor KL is moved by the user, furthermore, an interrupt signal is generated. The interrupt signal commences the picture scroll processing, not shown. Due to the picture scroll processing, the map picture indicated on the display 33 is scrolled. The map picture indicated on the display 33 is so scrolled that the center KLC of the cursor is at the center of the picture at all times.

When the scrolling is discontinued, the processing after step 362 are commenced again. That is, the coordinates of the center KLC of the cursor are found (step 368). The house shape data designated by the center KLC of the cursor are searched (step 370). When display of detailed data is requested, detailed data are displayed in the form of a list (steps 382, 384). When the house map data to be displayed on the display 33 is interrupted due to scrolling of the picture, the map shown on the display 33 is changed over from the house map to the road map. That is, in the case where the coordinate range shown on the display 33 deviates out of the coordinates at the end of house map data stored in the data storage unit 37, the house map cannot be shown over the entire picture on the display 33.

The house map recorded in the data storage unit 37 is a map of a particular region where houses are densely built up like in a major city, town or village. When the house map shown on the picture on the display 33 is scrolled, therefore, the house map data often becomes insufficient for display on the display 33. When the data storage unit 37 does not store house map data that can be shown on the picture, the result of the determination at step 362 becomes NO. When the result of the determination at step 362 is NO, it is determined whether the house map is shown on the display 33 (step 375).

This determination is based upon whether the house map being-indicated flag HF is on. Here, when the road map is being displayed already, there is no need to change over the map indication mode and the processing at the next step 376 is not executed. When the house map is shown on the display 33, on the other hand, the house map is changed over to the road map indication mode. When the display is changed over from the house map to the road map, the reduced scale data SD stored in the RAM 4 at the step 364 are read out (step 376).

Then, the road map data in the vicinity of the present position are read out from the road map data file at a reduced scale designated by the reduced scale data SD. The road map data that are read out are sent to the image processor 9. Thus, the display 33 shows the road map having the present position or the center of the cursor at the center of the picture (step 377). When the road map is indicated on the display 33, the house map being-indicated flag HF is reset to be off.

On the road map, recommended drop-in places are indicated by, for example, blue circles. This makes it possible to easily discern the recommended drop-in places on the map. When the road map is shown on the display 33, the cursor KL is indicated at the center of the picture on the display 33. Then, coordinates of the center KLC of the cursor are found on the road map (step 378).

Thus, as the map shown on the display 33 is changed over from the house map to the road map, the processings are successively executed from step 386 to step 392. The processes of these steps are the same as those of when the house map is shown on the display 33.

When the drop-in position registration processing is not requested at step 388, it is then determined whether the user has moved the cursor KL. When the cursor KL is moved, it is determined that the drop-in place is changed. Accompanying the motion of the cursor KL, the road map shown on the display 33 is scrolled.

When the scrolling is discontinued, the program returns back to step 362 to find the coordinates of the center KLC of the cursor (step 378). Accompanying the scrolling, it is determined whether the house map can be shown again over the entire picture on the display 33 (step 362). That is, when it is detected on the display 33 that the house map having the center KLC of the cursor at the center of the picture has been stored in the data storage unit 37, the result of the determination at step 362 becomes YES. In this case, there is shown the house map having the coordinates of the center KLC of the cursor at the center of the picture (step 365). When the drop-in place registration processing is executed at step 390, the drop-in place setting flag TF is set to be on. The drop-in place setting flag TF is used for determining whether the drop-in place has been set.

As the drop-in place is set as described above, a guide route from the present position to the drop-in place is searched by the route search processing (step 52 of FIG. 7) using the road data in the data storage unit 37. In the guide indication processing (step 53), the navigation processing is executed according to the guide route to the drop-in place. When the route search processing (step 52) and the guide indication processing (step 53) are started, it is determined whether the drop-in place setting flag TF is on. When the drop-in place setting flag TF is on, the guide route to the drop-in place is identified and the navigation processing is executed. When the drop-in place setting flag TF is off, the guide route to the destination is identified and the navigation processing is executed.

As described above, even when the drop-in place is set, the genre is selected and the house map of a range including the present position is automatically shown on the display 33 (step 365). This makes it possible to learn in detail the surroundings of the present position of the car. Furthermore, it is possible to set the destination or the drop-in place only when the car is halting or is running at a speed slower than the predetermined speed (step 352). The map house is shown when the car is halting or is running at a speed slower than the predetermined speed. This enhances the utility of the navigation device of the invention.

Moreover, the house map stored in the data storage unit 37 covers particular regions only. When the house map shown on the display 33 is scrolled, therefore, it may often be requested to show the map of a region for which the house map has not been stored in the data storage unit 37. In this case, the road map is shown instead of the house map (steps 362, 377).

Therefore, even when the map shown on the display 33 is scrolled, the display is not interrupted. Moreover, the house shape of a place corresponding to the genre selected by the user is shown in a characteristic color, such as blue (step 366). In addition, the house shape designated by the center KLC of the cursor is indicated in a special form, such as solid picture VS or a different color like red (step 372). This makes it easy to confirm the house shape of a position designated by the cursor. Accordingly, the time required for setting the drop-in place or the destination can be shortened.

20. Third Embodiment

A third embodiment of the invention will be described below and is directed to a navigation device comprising a data storage means (house shape data file) for storing building data for indicating the shapes of buildings; an input means for inputting points such as destinations and passing points (step 51 in FIG. 7, FIG. 36); a search means for searching, from the data storage means, a building that corresponds to a point input by said input means (step 51 in FIG. 7, FIG. 36); and a route calculation means (step 464 in FIG. 27) for searching a route regarding the building searched by the searching means as a destination, wherein the route calculation means calculates a route regarding a point on a road adjacent to the searched building as an end point of route.

21. Overall Circuitry

The overall structure of the third embodiment is nearly the same as that of the first embodiment shown in FIG. 1. The map data file stores road map data, such as a road map of the entire country and house map data of particular regions of major cities, towns and villages. The road map data comprises maps of a plurality of dissimilar scales covering the same region. The house map data may be data of a map of each of the regions or may be a plurality of map data of dissimilar scales.

22. Data Groups

FIG. 20 illustrates some of the data groups stored in the RAM 4. The external data GD, present position data MP, absolute direction data ZD, relative direction angle data θ travelled distance data ML, present position data PI, VICS data VD, ATIS data AD, registered destination data TP, guide route data MW, start point of route data SP, and end point of route data EP were described in the first embodiment. The drop-in place data DP are related to drop-in places set by the destination setting processing (step 51 of FIG. 7) and were described in the second embodiment.

23. Road Data

Figure 21:
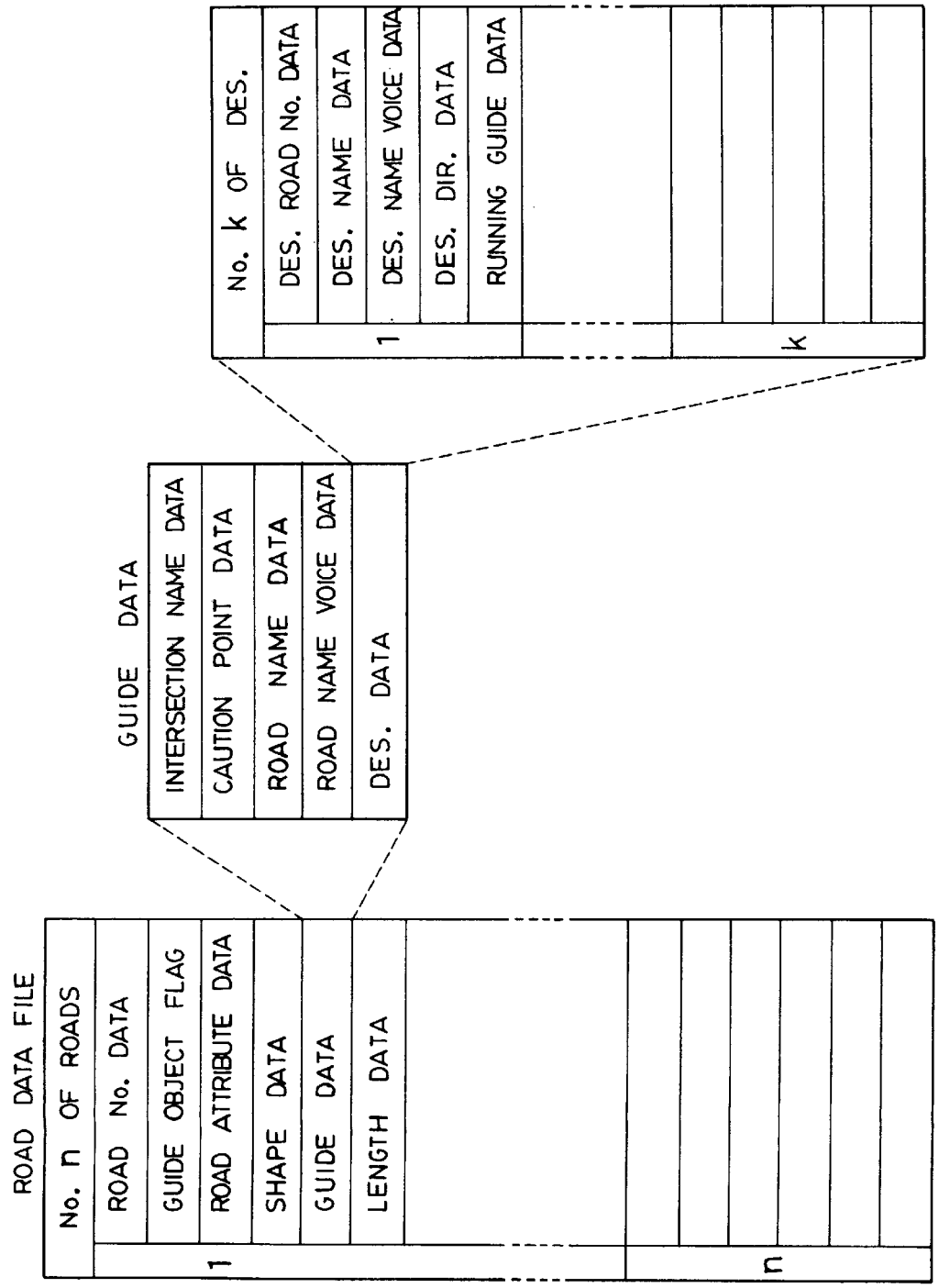
FIG. 21 is a diagram showing the contents of a road data file of the third embodiment.

FIG. 21 illustrates some of the road data in the road data file stored in the data storage unit 37. The road data file includes data related to roads wider than a predetermined width in the region of a map stored in the map data file. When the number of roads included in the road data file is n, then the road data related to roads of the number n are contained in the road data file. The road data comprise road number data, guide object flag, road attribute data, shape data, guide data and length data.

The road number data are identification numbers attached to the roads divided by the intersecting points included in the map data. Therefore, a road number designates a road included in the road data file.

The guide object flag stores "1" when the road is to be guided and stores "0" when the road is not to be guided. A road to be guided is one available for use for setting a guide route, i.e., is a road having a width larger than a predetermined value, such as a principal highway or a general road. A road that is not to be guided is one which is not available for use for setting the guide route, i.e., is a road narrower than a predetermined width such as footpath or lane, or is a private road in the site.

The road attribute data represent the attributes of roads, such as high level road, underpass, expressway or toll road. The shape data represent shapes of roads and comprise coordinate data of a start point of road, end point of road, and coordinate data of nodes from the start point to the end point.

Figure 22:
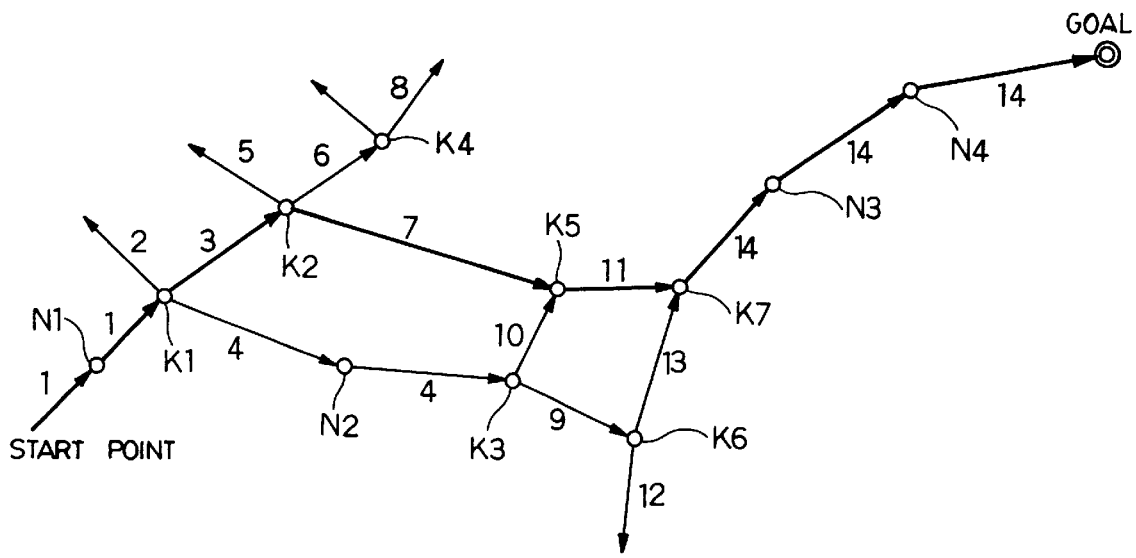
FIG. 22 is a diagram illustrating route guidance of the third embodiment.

FIG. 22 illustrates roads as represented by the road data. Road numbers 1 to 14 are attached to the roads that are divided by intersecting points K1 to K7. The roads of road numbers 1, 4 and 14 have nodes N1 to N4. The nodes of the roads are provided to maintain a straight distance along the roads. When the roads are curved, a large number of nodes are provided so that the roads can be approximated by straight lines.

Figure 23:
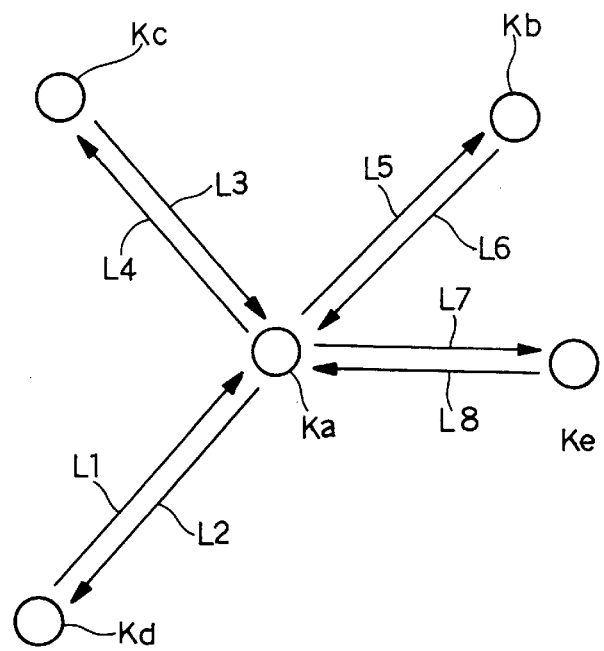
FIG. 23 is a diagram representing the structure of road number data of the third embodiment.

FIG. 23 illustrates some of the roads on an enlarged scale. Each road has lanes in which the car runs in a direction opposite to the other. Separate road numbers L1 to L8 are attached to the lanes having different directions of progress. Here, however, the coordinates of intersections and nodes of pairs of roads are in common. For example, the start point Ka and the end point Kd of road numbers L1 and L2 share common coordinate data.

The guide data (FIG. 21) of the road data file include intersection name data, caution point data, road name data, road name voice data, and destination data. The intersection name data represent the name of an intersection when the end point of the road is the intersection. The caution point data are concerned with railroad crossings, inlets of tunnels, outlets of tunnels, reductions in road width, and similar data affecting travel. That is, the data related to points at which the driver must pay attention while he is driving on the road are caution point data. The road name voice data are pronunciation data of road names used for the voice guidance. The length data are related to a distance between a start point to an end point of a road, distances from the start point to nodes, and distances between nodes.

The destination data are related to a road (referred to as a destination) connected to the end point of the road. The destination data comprises a number k of destinations and data at each of the destinations. The data related to a destination includes destination road number data, destination name data, destination name voice data, destination direction data and running guide data.

The destination road number data consist of a road number of a road connected to the end point of a road. The destination name data are character data representing the names of the connected roads. The destination name voice data are to inform, by voice, the user of the names of the connected roads. The destination direction data represents the directions of the connected roads. The running guide data are for making the user ready for entering into one of the connected roads from another road. The running guide data include data for urging the user to get into the right lane, into the left lane, or keep to the center lane.

24. House Shape Data

Figure 24:
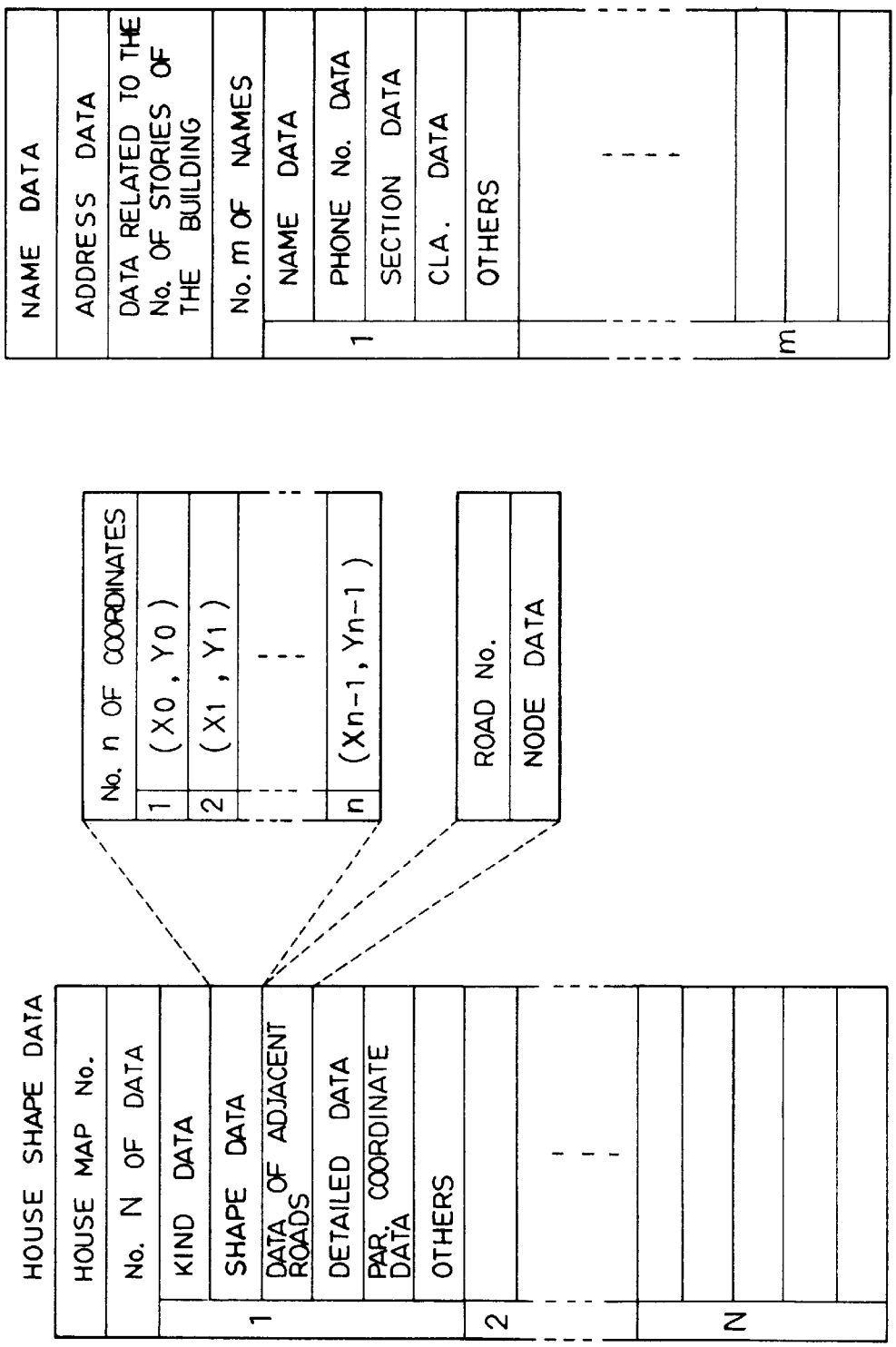
FIG. 24 is a diagram illustrating the contents of house shape data of the third embodiment.

FIG. 24 illustrates house shape data of a section in the house shape data file. The structure of the house shape data of FIG. 24 is nearly the same as that of the house shape data of FIG. 5. The adjacent road data comprise number data of roads adjacent to the house shape and coordinate data of nodes of the roads. Here, the node included in the adjacent road data is the one which is closest to the house shape among the nodes included in the adjacent roads.

Figure 25:
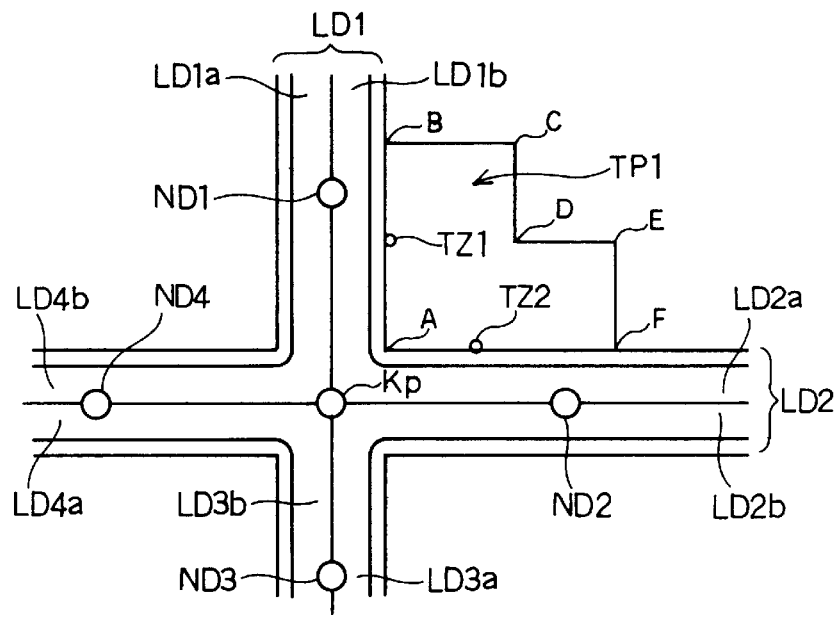
FIG. 25 is a diagram illustrating a relationship between the house shape at the destination and the adjacent roads of the third embodiment.

When there are a plurality of adjacent roads, the adjacent road data include the road number data and the coordinate data of the node which is closest to the house shape. In FIG. 25, for example, a road to be guided LD1 and a road to be guided LD2 meet at an intersection Kp. It is here presumed that the registered destination TP1 is adjacent to the road to be guided LD1 and to the road to be guided LD2.

The roads LD1 and LD2 are divided by the intersection Kp and are further divided into right and left lanes. Therefore, the road LD1 comprises a road number LD1$a$ and a road number LD1$b$. Similarly, the road LD2 comprises a road number LD2$a$ and a road number LD2$b$. There further exists a road comprising road numbers LD3$a$ and LD3$b$ and a road comprising road numbers LD4$a$ and LD4$b$.

Therefore, the adjacent road data of the house shape data at the registered destination TPa stores the road number LD1$b$ and the road number LD2$a$. The house shape is a range surrounded by vertexes A to F, and the coordinate data of nodes ND1 and ND2 closest to the coordinates A, B, F facing the roads are stored in the adjacent road data.

Figure 26:
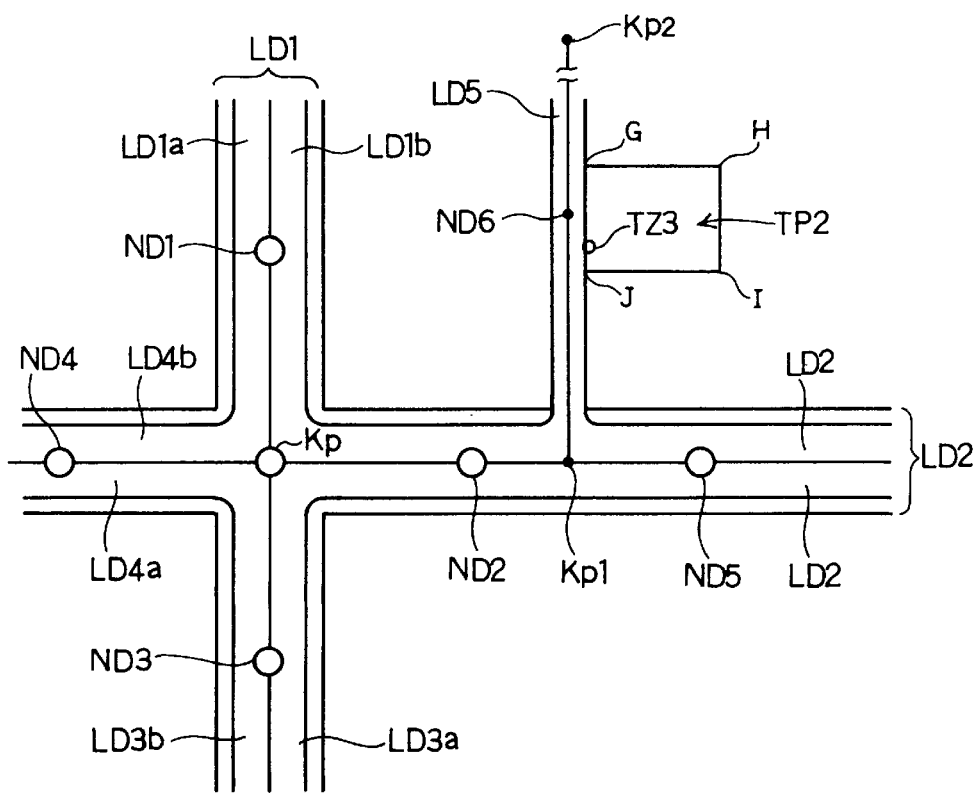
FIG. 26 is a diagram illustrating a relationship between the house shape at the destination and the roads when the adjacent roads are not part of the route guidance of the third embodiment.

In the case of FIG. 26, the registered destination TP2 is adjacent to a road LD5 that is not to be guided. In this case, the road number of the road LD5 that is not to be guided is stored in the adjacent road data. The road LD5 that is not to be guided is so narrow that it has only one lane. Depending upon the situation, however, the road that is not to be guided may have two lanes. When the road having two lanes but that is not to be guided is adjacent to the registered destination TP2, the road number of a lane closer to the registered destination TP2 is stored in the adjacent road data. In FIG. 26, furthermore, the coordinate data of the node ND6 closest to the registered destination TP2 is stored in the registered road data.

The particular coordinate data included in the house shape data are coordinate data of the entrance of a building or coordinate data of the entrance of a parking lot annexed to the building. That is, the particular coordinate data include coordinate data of a point which is most convenient for the user to enter into a place designated by the house shape data. For other data, reference should be made to the explanation of FIG. 5 of the first embodiment.

25. Overall Processing

The overall processing according to the third embodiment is nearly the same as the overall processing of the first embodiment shown in FIG. 7.

The destination setting processing (step 51 of FIG. 7) executes a processing for setting the destination in the same manner as in the aforementioned first and second embodiments. The data related to the destination designated by the user are stored in the RAM 4 as the registered destination data TP. When the destination is designated on the house map picture, the house shape data of a place that is the destination are read out from the house shape data file. The house shape data serve as registered destination data TP. When the destination is designated on the road map picture, the destination data of a place that is the destination are read out from the destination data file. The destination data serve as the registered destination data TP.

Furthermore, a drop-in place is set on the way of the guide route in the same manner as that of setting the destination. That is, the data related to the designated drop-in place are stored, as drop-in place data DP, in the RAM 4. The destination setting processing (step 51) is not executed again unless a destination is newly set or a drop-in place is newly set.

The route search processing (step 52 of FIG. 7) searches a guide route up to the destination based upon the registered destination data TP, present position data MP and road data. The guide route is stored as guide route data MW in the RAM 4. The guide route data MW comprises road number data of the roads that connect the start point to the destination. A point on the road that is to be guided is regarded to be the end point EP of the guide route, the point being close to the destination that is registered in the destination setting processing (step 51 of FIG. 7).

The start point is the present position of the car or is a point on a road that is to be guided close to the present position. The start point is regarded to be a start point of route SP. When the drop-in place is set, a guide route is searched from the present position of the car that is moving to the drop-in position. The guide indication processing (step 53) is executed to the drop-in position. When the drop-in place is reached, a guide route is automatically searched from the drop-in place to the end point of route EP. The guide indication processing (step 53) is executed along the guide route.

When the moving position of the car deviates from the guide route during the guide indication processing (step 53), the route search processing (step 52) is commenced to identify a new guide route. The route search processing for searching a new guide route is commenced upon a predetermined switch operation, upon the input of voice instructions or automatically. The new guide route is the one that connects a new position of the car to the drop-in place or to the destination. Therefore, the route search processing (step 52) is not executed again unless the car deviates from the guide route or unless a search command is input again by the user.

In the guide indication processing (step 53), voice information and visual information are provided so that the user can drive his/her car along the guide route developed by the route search processing (step 52). For instance, the guide route may be indicated by a thick line of red, blue or any other conspicuous color on the map picture displayed on the display 33. Further, the picture on the display 33 shows the present position mark showing the present position of the car and the direction mark showing the direction of the destination or the drop-in place from the present position. The map picture indicating the guide route will be a road map or a house map in the vicinity of the present position. Instead of the road map, there may be indicated a simple guide route picture indicating only a minimum of data, such as guide route, direction to the destination or to the drop-in place, and present position, etc. but omitting detailed geographical data.

In the guide indication processing (step 53 of FIG. 7), the shown map picture is changed over to the house map from the road map or from the simple guide route picture, or is changed over from the house map to the road map or to the simple guide route map. The map is changed over either manually by the user or automatically. When the running speed of the car is faster than the predetermined speed, for example, the road map or the simple guide route picture is shown. When the running speed of the car is slower than the predetermined speed or when the car is halting, on the other hand, the road map or the simple guide route picture is changed over to the house map. When the car has approached the destination or the drop-in place within a predetermined distance, the road map or the simple guide route picture may be changed over to the house map.

26. Route Search Processing

Figure 27:
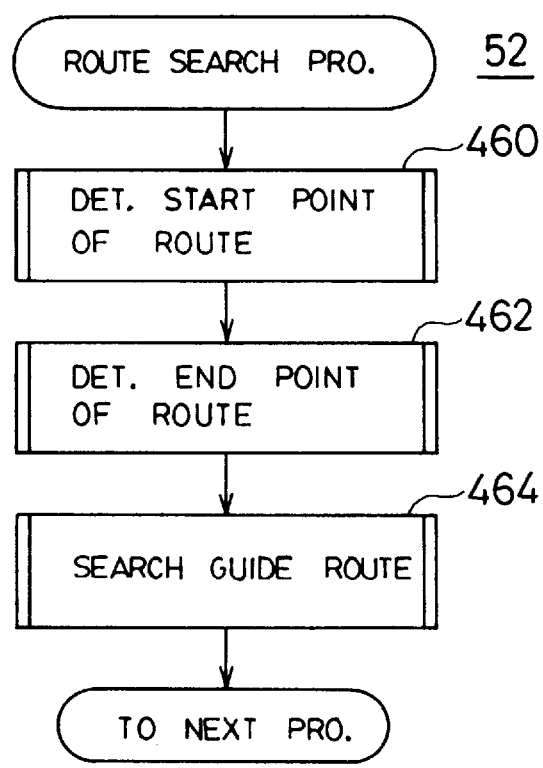
FIG. 27 is a summary flow chart illustrating the process for searching the route of the third embodiment.

FIG. 27 is a flow chart of the route search processing (step 52 of FIG. 7). In this processing, the start point and the end point of the guide route are determined by a guide start point determining processing (step 460) and by a guide end point determining processing (step 462). The guide route includes a route up to the destination or up to the drop-in place registered from the present position of the car. Therefore, the start point of the guide route is a start point and the end point of the guide route is an end point. When the start point of route and the end point of route are determined, the most suited or a recommended route is identified to arrive at the end point of route from the start point of route (step 464).

This guide route comprises roads selected using predetermined conditions from the roads that are to be guided included in the road data file. The predetermined conditions for selecting the roads that comprise the guide route are that the guide route is the shortest, that main roads are used as much as possible, and that the user is allowed to smoothly arrive at the end point of route EP. The road number data constituting the guide route are stored, as guide route data MW, in the RAM 4.

27. Processing for Determining Start Point of Route

Figure 28:
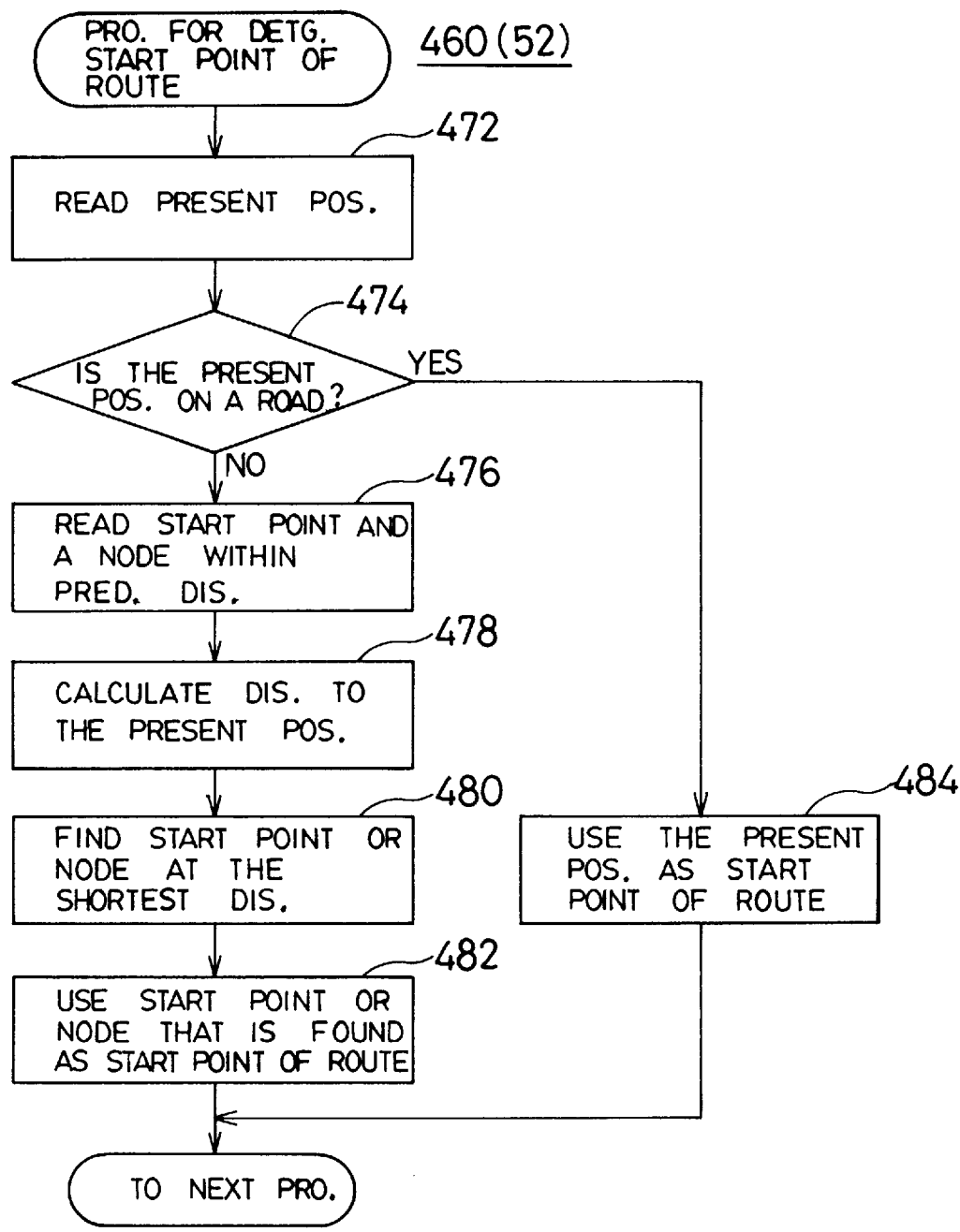
FIG. 28 is a flow chart of the process for determining the start point of the route of the third embodiment.

FIG. 28 is a flow chart of the processing for determining start point of route (step 460) executed in the route search processing (step 52). Narrow roads and private roads having a width narrower than a predetermined width are the roads that are not to be guided. The roads that are not to be guided are never used as the road for starting the guide route. When the present position of the car is on a road that is not to be guided or is in a parking lot which is not a guide road, it becomes necessary to search a point on a road that is to be guided which is closest to the present position of the car. In the processing for determining the start point of route, therefore, a point which exists on a road that is to be guided and which is closest to the present position is searched in case the present position does not exist on the road that is to be guided. The point on a road that is to be guided is regarded to be a start point of route SP.

First the present position data MP of the car are read out from the RAM 4 (step 472). It is determined whether the point represented by the present position data MP exists on a road that is to be guided (step 474). The data of roads to be guided are searched from the road data file. It is determined whether the data of roads to be guided include road data having a node in agreement with the coordinates of the present position data MP. When there are the road data that are in agreement, it is then determined that the present position exists on a road that is to be guided.

When the present position exists on a road that is to be guided, then the present position data MP are stored as the start point of route data SP in the RAM 4 (step 484). When the present position does not exist on a road that is to be guided, then the start point data and node data on a road to be guided that exist within a predetermined distance from the present position are read out (step 476). Distances are calculated from the present position to the start point data and to the node data that are read out (step 468). The distances found in the steps 468 are compared with each other to find the start point or node (which is a point at the shortest distance) of a road that is to be guided within the shortest distance from the present position (step 480). When there are a plurality of points at the shortest distance, the one closest to the registered destination TP or to the drop-in place DP is selected. The coordinates at the shortest point are stored as start point of route data SP in the RAM 4 (step 482).

A perpendicular is drawn from the coordinates of the present position onto a straight line connecting the coordinates of the point at the shortest distance found at the step 480 to a start point or a node adjacent to the point at the shortest distance. The coordinates of a point where the perpendicular meet the straight line may be used as a start point of route. In this case, the start point of route is a point closer to the present position than that of when the point at the shortest distance is used as the start point of route. When there exist a plurality of intersecting points, the one which is closest to the present position is used as the start point of route.

28. Processing for Determining End Point of Route

Figure 29:
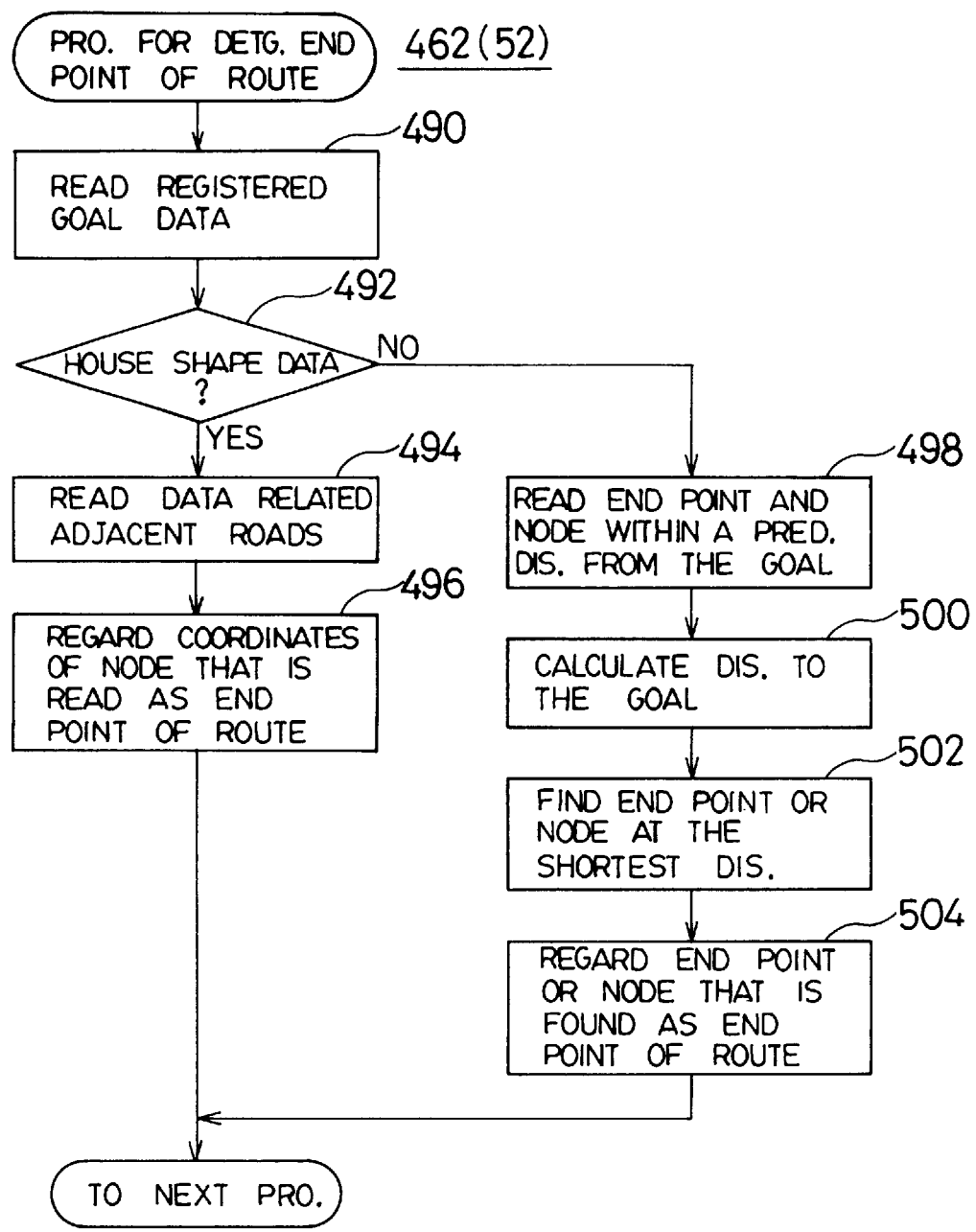
FIG. 29 is a flow chart of the process for determining the end point of route of the third embodiment.

FIG. 29 is a flow chart of the processing for determining end point of route (step 462) executed in the route search processing (step 52). First, the registered destination data TP are read out from the RAM 4 (step 490). It is determined whether the registered destination data TP are the house shape data (step 492). When the destination is designated on the house map picture in the destination setting processing (step 51 of FIG. 7), the registered destination data TP are house shape data.

On the other hand, when the destination is designated on the road map picture, the registered destination data are the destination data. A flag is added to the registered destination data TP to indicate a difference between the house shape data and the destination data. It is therefore determined on the basis of the flag whether the registered destination data TP are house shape data. Here, when the registered destination data TP are the house shape data, then, the adjacent road data in the house shape data are read out (step 494). The coordinate data of a node in the adjacent road data thus read out are stored, as end point of route data EP, in the RAM 4 (step 496).

On the other hand, when it is discriminated at the step 492 that the registered destination data TP are not the house shape data, then, a road to be guided closer to the registered destination data TP is identified from the road data file. Then, a point is found which is an end point of the road to be guided or a node on the road and which exists within a predetermined distance from the registered destination TP (step 498). For instance, a plurality of points are calculated on a circle of a predetermined radius with the coordinates of the registered destination TP as a center. The coordinates of the plurality of points are compared with the coordinates of end points and nodes included in the road data. It is then determined whether the end points or nodes of roads to be guided are within the predetermined distance from the registered destination TP.

Next, distances are calculated from the end points and nodes found at the step 498 to the registered destination TP (step 500). For instance, differences are found in the latitude and longitude between the coordinates of the end points or nodes and the coordinates of the registered destination TP. The distances are calculated based upon the differences in the latitude and in the longitude and in compliance with the Pythagorean theorem. Then, the distances found at step 500 are compared with each other. Thus, an end point or a node (which is the final point) at the shortest distance from the registered destination TP is found (step 502). The coordinates of the final point are stored as the end point of route data EP in the RAM 4 (step 504).

A perpendicular is drawn from the coordinates of the registered destination onto a straight line connecting the coordinates of the final point found at the step 502 to the coordinates of the end point or the node adjacent to the final point. The coordinates of a point where the perpendicular meets the straight line may be used as the end point of route. In this case, a point closer to the registered destination than when the final point is used as the end point of route, can be used as the end point of route. When there exist a plurality of intersecting points, the one closest to the registered destination among such intersecting points can be used as the end point of route.

29. Guide Route Search Processing

Figure 30:
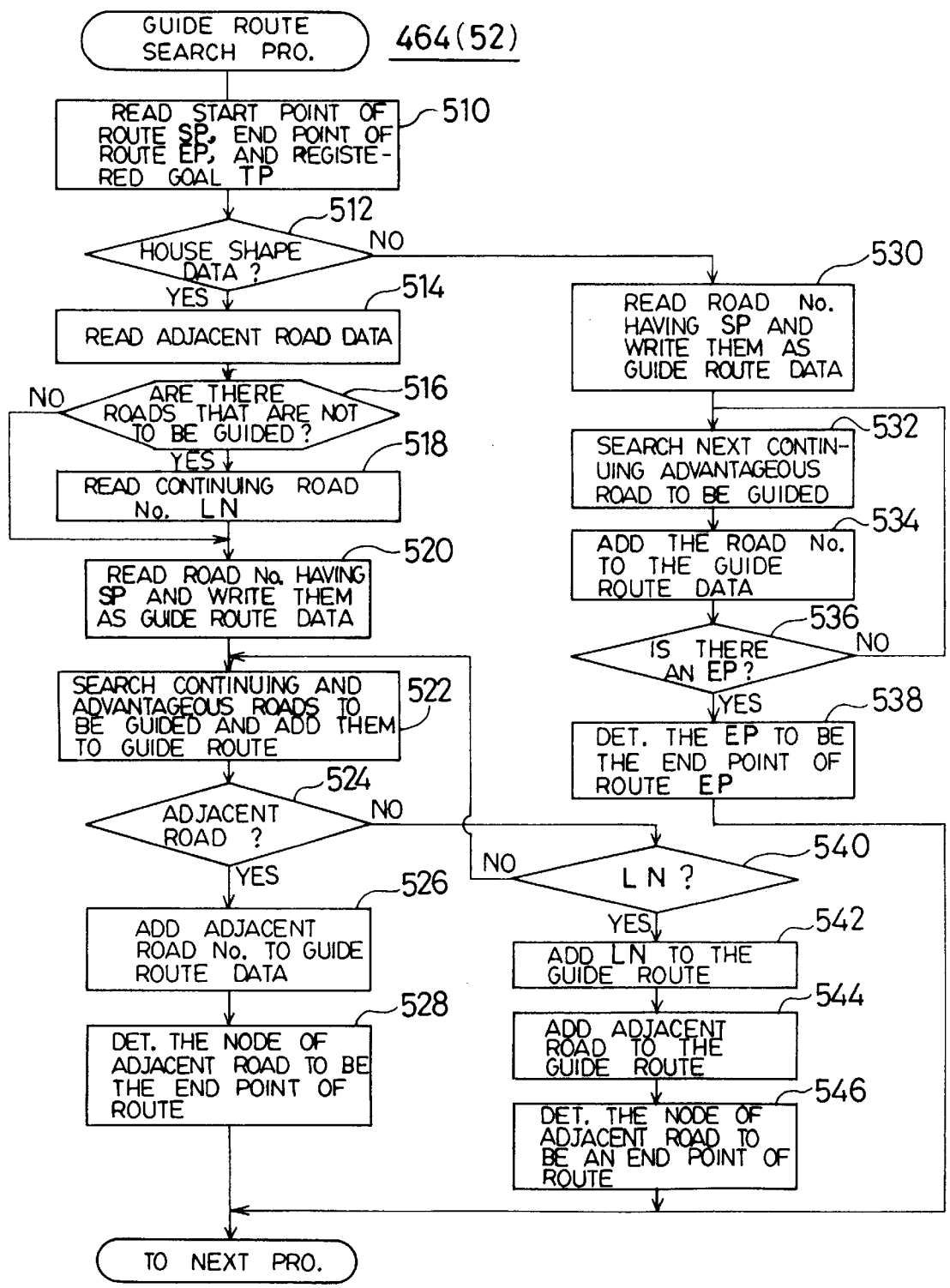
FIG. 30 is a flow chart of the process for searching a guide route of the third embodiment.

FIG. 30 is a flow chart of a guide route search processing (step 464) executed in the route search processing (step 52 of FIG. 7). First, the start point of route data SP, end point of route data EP and registered destination data TP are read out from the RAM 4 (step 510). It is then determined whether the registered destination data TP are house shape data (step 512). When a destination is designated on the house map picture in the destination setting processing (step 51), the registered destination data TP are house shape data as described earlier. When the destination is designated on the road map picture, the registered destination data TP are the destination data.

Here, when the registered destination data TP are the house shape data, then the adjacent road data in the house shape data are read out (step 514). It is then determined whether the adjacent road data that are read out include roads that are not to be guided (step 516). For example, the road data in agreement with the road number in the adjacent road data are read out from the road data file. Depending upon whether the guide object flag in the road data are off, it is determined whether the roads are the ones that are to be guided.

When the adjacent road data include roads that are not to be guided, destination road number data included in the road data related to the roads that are not to be guided are read out. By using the guide object flag, the road numbers of the roads to be guided are searched from the destination road number data. Thus, there are read out the road numbers of the roads that are to be guided and are connected to the roads which are not to be guided. The road number data that are read out are stored as continuing road number data LN in the RAM 4 (step 518). When the adjacent road data include roads that are to be guided, on the other hand, the processing of the step 518 is not executed.

Next, the road numbers having the start point of route SP are searched from the road data file. The road numbers are written onto the first data area of the guide route data register MW in the RAM 4 (step 520). The roads to be guided that are connected to the above roads and that are more suited for arriving at the registered destination TP are searched from the road data file (step 522).

The destination road number data in the road data (FIG. 21) are used for detecting the road numbers of roads connected to the road. The road attribute data and the destination direction data are used as the conditions for selecting more suitable roads to be guided. The selection conditions are that the major roads are preferentially used and that a road which is headed toward the registered destination TP is preferentially used.

The direction of the registered destination is found when the registered destination TP is set in the registered destination setting processing (step 51). The data indicating the direction of the destination are stored, as destination direction data MH, in the RAM 4. The direction of the registered destination is, for example, an angle of a straight line connecting the start point of route SP to the end point of route EP with respect to the absolute direction ZD. At step 522, a road most advantageous for satisfying the above-mentioned conditions is selected out of a plurality of roads connected to the road. When there are selected a plurality of roads under the same conditions, the road is selected under further detailed conditions. For example, a road is picked having the shortest distance from the start point of route to the end point of route. The road number of the thus picked road is added to the end of the data in the guide route data register MW (step 522).

Next, it is determined whether the road searched at step 522 is an adjacent road (step 524). In other words, it is determined whether the road number data of the road searched at step 522 are in agreement with the road number data in the adjacent road data. When the road is not the adjacent road, it is then determined whether the road searched at step 522 is the road LN read out at step 518 (step 540). When it is not the road LN, the program returns to step 522, and a next advantageous road that is to be guided and is connected is identified from the road data file.

Therefore, the roads to be guided are successively searched until the adjacent road or the above-mentioned road LN is identified at step 522. The road number data of the roads to be guided that are selected are added successively to the end of data of the guide route data register MW (steps 522, 524, 540).

When the road identified at step 522 is the adjacent road, on the other hand, it means that the guide route is identified from the start point of route SP to the registered destination TP. Accordingly, the road number data of the adjacent road are added to the end of data in the guide route data register MW (step 526). Then, the node data on the road searched at step 522 are read out from the node data in the adjacent road data. The coordinate data of this node are determined to be the end point of route data EP (step 528). Step 528 erases the end point of route data EP that are written onto the RAM 4 in the above-mentioned processing for determining the end point of route (step 462). The end point of route data EP determined at step 528 are newly written to the RAM 4. When there are a plurality of end point of route data EP, therefore, any one of them is determined to be the end point of route.

Referring, for example, to FIG. 25, when the guide route is the one running from the upper side to the lower side of the road LD1*b*, the road number of the adjacent road LD1 is written onto the final data area of the guide route data register MW. The coordinate data of the node ND1 are determined to be the end point of route data EP. When the guide route includes the road LD3*b* or LD4*b*, the adjacent road LD2*a* is determined to be the final guide road connected to the roads LD3*b* and LD4*b*. Therefore, the road number of the adjacent road LD2*a* is written onto the final data area of the guide route data register MW. Besides, the coordinate data of the node ND2 are determined to be the end point of route data EP. At step 522, the continuing roads are picked based on a prerequisite that the end point of route EP is the node of the adjacent road. Therefore, the guide route is not the one that approaches from the right side of the road LD2*b*.

When the road searched at step 522 is not the adjacent road (step 524) but is the road LN searched at step 518 (step 540), the road number data of the road LN are written to the end of the guide route data register MW (step 542). Then, the road number data of the adjacent roads connected to the road LN are read out from the adjacent road data. The road numbers of the adjacent roads connected to the road LN are added to the end of the guide route data register MW (step 544).

For example, when there are a plurality of roads adjacent to the registered destination TP, the road data in agreement with the road numbers of the adjacent roads are read out from the road data file. The road data are searched which include a road number of the road LN in the destination road number data. The road number of the thus searched road data is that of the adjacent road connected to the road LN. The coordinate data of a node of the adjacent road connected to the road LN are read out from the node data in the adjacent road data. The coordinate data that are read out are determined to be the end point of route data EP (step 546). Like the above-mentioned step 528, this step 546 erases the end point of route data EP written onto the RAM 4 in the processing for determining end point of route (step 462). Instead, the end point of route data EP determined at step 546 are newly written to the RAM 4.

In FIG. 26, for example, the road numbers of the roads LD2*a* and LD2*b* are stored in the RAM 4 as a road LN connected to an adjacent road LD5 (step 518). When the guide route is a route that approaches from the left side of the road LD2*a* or from the right side of the road LD2*b*, the road number of the road LD2*a* or of the road LD2*b* is written onto the guide route data register MW (step 542). Moreover, the road number of the adjacent road LD5 is written onto the final data area of the guide route data register MW (step 544). The coordinate data of a node ND6 on the adjacent road LD5 are determined to be the end point of route data EP (step 546).

On the other hand, when it is determined at step 512 that the registered destination data TP are not the house shape data, the road numbers of roads having the start point of route SP are searched from the road data file. The road number data that are searched are written to the first data area of the guide route data register MW (step 530). Then, the roads to be guided connected to the above road, and are advantageous for arriving at the registered destination TP, are identified from the road data file (step 532). The road number data of the thus identified roads are written onto the next data area of the guide route data register MW (step 534). The processings in these steps 532 and 534 are the same as that of step 522.

Next, it is determined whether the roads searched at step 532 include the end point of route EP (step 536). For example, the coordinate data of nodes included in the road data of roads identified at step 532 are read out. It is determined whether the coordinate data of these nodes are in agreement with the coordinate data of the end point of route EP. When there is no node that is in agreement with the end point of route EP, the program returns back to step 532 to identify the next road that is to be guided (step 532). Accordingly, the roads to be guided are successively searched until there is identified a road having the end point of route EP. The road numbers of the roads to be guided that are identified are added to the end of the guide route data register MW (steps 532, 534, 536).

When a road having the end point of route EP is identified, the result of the determination at step 536 becomes YES. The node on the thus searched road is determined to be the end point of route EP. There may, for example, exist a plurality of end points of route data EP that are written onto the RAM 4 in the step for determining an end point of route (step 462). When there are a plurality of end points of the route as searched at step 462, the end point of the route in agreement with the node on the guide road searched by the guide route search processing at step 464 is stored as the end point of route data EP in the RAM 4 (step 538).

When the drop-in place is set, a guide route for arriving at the drop-in place is searched in the same manner as that of searching a guide route to the registered destination. The processing for searching the guide route to the drop-in place is the processing for determining start point of route (step 460), the processing for determining end point of route (step 462) or the guide route search processing (step 464) in which the registered destination data TP are replaced by the drop-in place data DP.

When the destination or the drop-in place is set on the house map according to this embodiment, a guide route is searched based upon the adjacent road data included in the house shape data (step 464). When the house map is displayed in the guide indication processing (step 53), the registered destination or the drop-in place is indicated as a house shape in the house map. Besides, a guide route is shown on the house map up to a node on a road adjacent to the house shape or up to a node at a position closest to the registered destination or the drop-in place. When there are a plurality of adjacent roads, therefore, the final point that is best guided is selected out of the nodes on the plurality of adjacent roads.

When the registered destination is set on the road map, the adjacent road data are not used (steps 530 to 538 in FIG. 30) in the guide route search processing (step 52). In this case, the guide route uses only those roads that are to be guided. Therefore, the end point of route EP may not often exist on a road adjacent to the destination. It may, hence, often happen that the end point of route EP is a little separated from the destination or the drop-in place. Accordingly, it may not often be able to quickly arrive at the destination or the drop-in place from the end point of route EP.

When the registered destination is set on the house map, on the other hand, the adjacent road data are used (step 514 in FIG. 30) in the guide route search processing (step 52). The adjacent road data may often include roads that are not to be guided. Therefore, the guide route includes the roads that are not to be guided. Besides, the guide route is searched up to a road adjacent to the registered destination. That is, the guide route is searched up to just before the destination.

30. Fourth Embodiment

In the above described third embodiment, when the destination or the drop-in place is the house shape data, the node of a road adjacent to the house shape is regarded as the end point of route. Therefore, the guide route is searched up to a point from where the destination or the drop-in place can be easily and quickly reached. In the fourth embodiment described below, a guide route is searched up to a point closer to a particular point, such as entrance of a building at the destination or at the drop-in place or entrance of a parking lot based upon the particular coordinate data in the house shape data.

Figure 31:
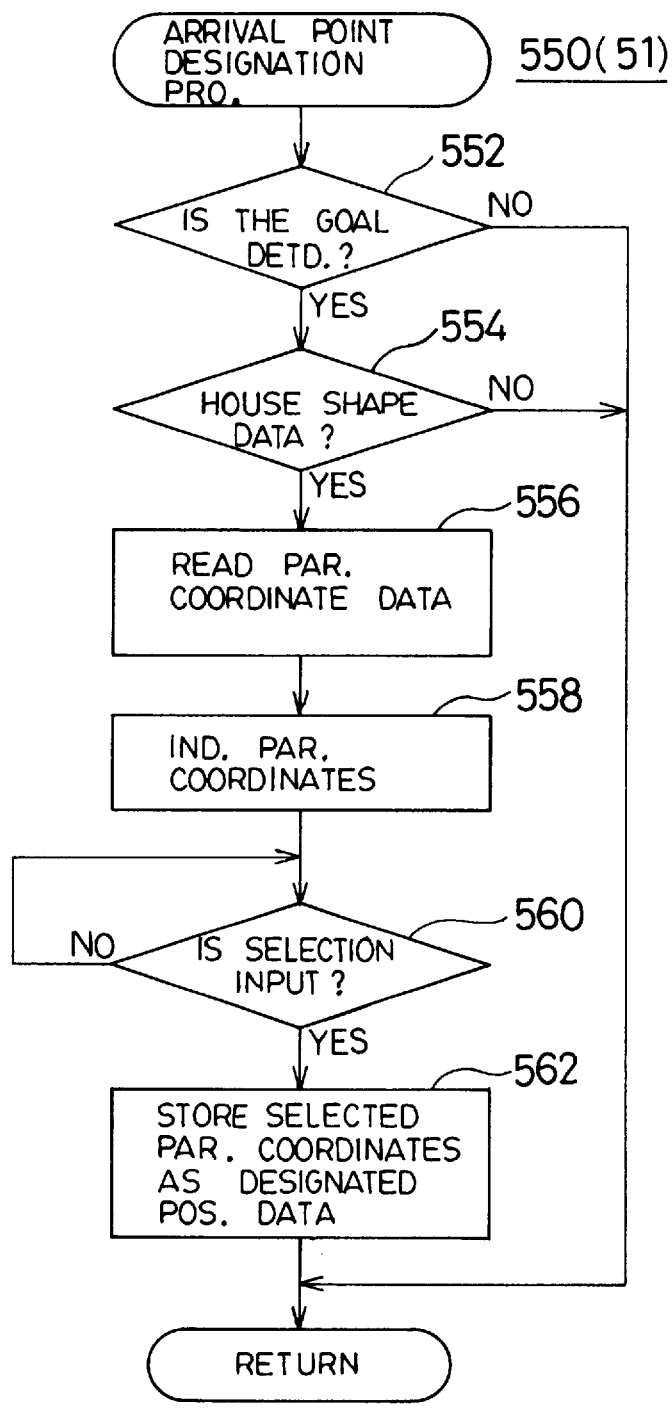
FIG. 31 is a flow chart illustrating a process for designating an arrival point according to a fourth embodiment.
Figure 32:
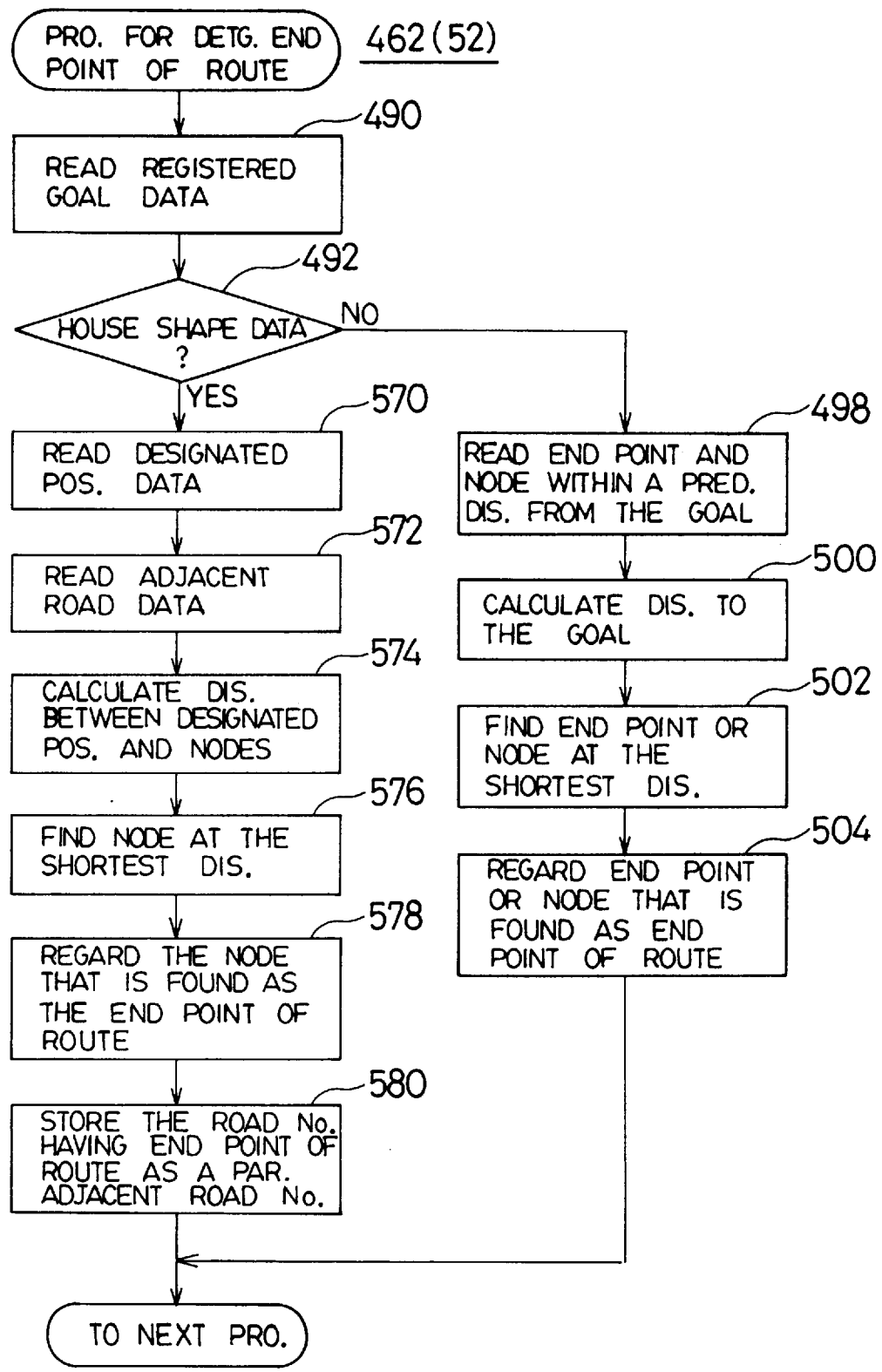
FIG. 32 is a flow chart illustrating a process for determining an end point according to the fourth embodiment.
Figure 33:
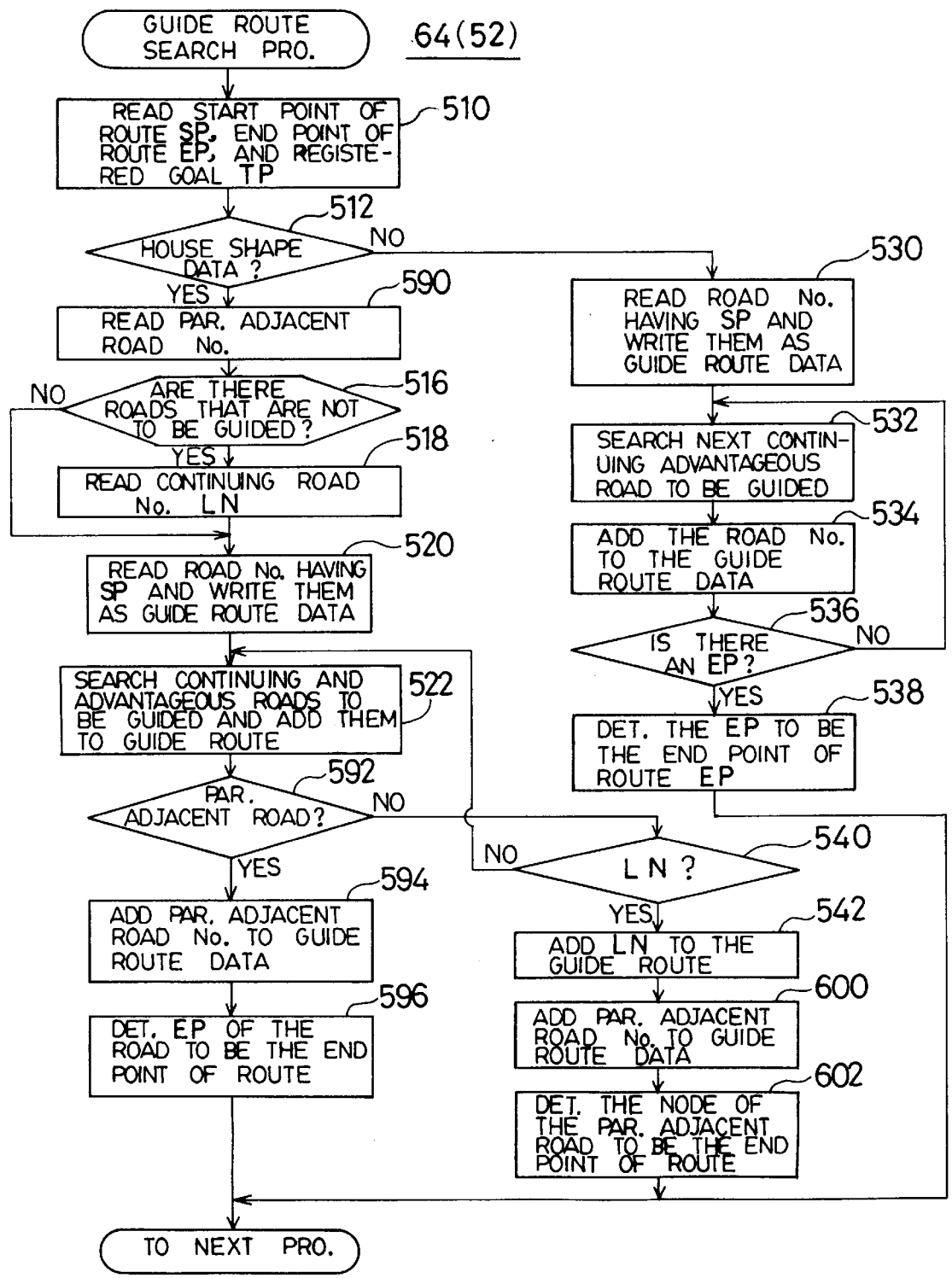
FIG. 33 is a flow chart illustrating a process for searching a guide route according to the fourth embodiment.

In this embodiment, the RAM 4 is provided with a register for storing designated position data IZ and particular adjacent road number data SN (see FIG. 20). The designated position data IZ represent a designated position selected by the user out of the particular coordinate data in the house shape data. The particular adjacent road number data SN represent road number data of the adjacent road on which the designated position exists. An arrival point designation processing (step 550), shown in FIG. 31, is executed in the destination setting processing (step 51 of FIG. 7). FIG. 32 illustrates a processing for determining an end point of route (step 462) according to the fourth embodiment. FIG. 33 illustrates a guide route search processing (step 464) according to the fourth embodiment. These processings will now be described.

31. Arrival Point Designation Processing

Before the processing of FIG. 31 (step 550) is commenced, the destination is designated by the user as mentioned earlier. The destination data or the house shape data at the designated destination are stored in the RAM 4 as the registered destination data TP. After the registered destination data TP are stored in the RAM 4, the arrival point designation processing is started.

It is first determined whether the registered destination TP is stored in the RAM 4 (step 552). When the destination has been registered, it is then determined whether the registered destination data TP are house shape data (step 554). When the destination is designated on the house map picture as described above, the registered destination data TP are the house shape data. When the destination is designated on the road map picture, on the other hand, the registered destination data TP are the destination data.

Here, when the registered destination data TP are the destination data, it is not possible to search the house shape data at the destination. Therefore, the particular position cannot be determined, and the arrival point designation processing (step 550) ends. This is because the particular position uses the data read out from the house shape data.

Therefore, when the registered destination data TP are the house shape data, particular coordinate data are read out (step 556) from the house shape data that have been stored as the registered destination data TP. The contents of the particular coordinate data are indicated on the display 33 (step 558). To the particular coordinate data have been added the picture data that are shown on the display 33 together with the coordinate data at a particular position. Based upon the picture data, a picture related to the particular coordinates is shown on the display 33. When the particular coordinate data are those of the entrance to a building and of the entrance to a parking lot, the words "ENTRANCE TO A BUILDING" and "ENTRANCE TO A PARKING LOT" are shown on the display 33.

It is then determined whether a particular position is selected by the user (step 560). Relying upon the picture shown on the display 33, the user selects any desired position. When a particular position is selected, the coordinate data at the selected particular position are stored in the RAM 4 as designated position data IZ.

32. Processing for Determining End Point of Route

In FIG. 32, the same steps as those of the processing for determining end point of route (FIG. 29) of the third embodiment are denoted by the same reference numerals. First, registered destination data TP are read out from the RAM 4 (step 490). It is then determined whether the registered destination data TP are house shape data (step 492). When the registered destination data TP are house shape data, then designated position data IZ are read out from the RAM 4 (step 570). Moreover, adjacent road data are read out from the house shape data that are the registered destination data TP (step 572).

Distances are calculated between the nodes included in the adjacent road data and the coordinates of the designated position data IZ (step 574). The node closest to the designated position is found (step 576). Coordinate data of the thus found node are stored in the RAM 4 as the end point of route data EP (step 578). The road number data of the adjacent road having the node that is the end point of route is stored, as particular adjacent road number data SN, in the RAM 4 (step 580).

On the other hand, when it is determined at step 492 that the registered destination data TP are not house shape data, the road data file is searched. Points that exist within a predetermined distance from the registered destination TP are found (step 498), the points being the end point and a node on a road to be guided included in the road data file. Distances are calculated between the registered destination and the end point and the node found at step 498 (step 500). Then, the distances found at step 500 are compared with each other. The end point or the node on the road to be guided, whichever is closest to the registered destination, is regarded an end point of the route (step 502). Coordinates of the end point are stored as end point of route data EP in the RAM 4 (step 504).

33. Guide Route Search Processing

In FIG. 33, the steps the same as the steps of the guide route search processing (FIG. 30) of the third embodiment are denoted by the same reference numerals. First, the start point of route data SP, end point of route data EP and registered destination data TP are read out from the RAM 4 (step 510). Then, it is determined whether the registered destination data TP are house shape data (step 512).

When the registered destination data TP are house shape data, particular adjacent road data SN are read out from the RAM 4 (step 590). It is then determined whether the particular adjacent road data SN that are read out include roads that are not to be guided (step 516). For instance, road data in agreement with a road number in the particular adjacent road data are read out from the road data file. It is determined whether the guide object flag of the road data that are read out is off. When the guide object flag is off, then the road is the one that is not to be guided.

Here, when the particular adjacent road data SN includes a road that is not to be guided, the road numbers of roads connected to the road that is not to be guided are read out from the destination road number data included in the road data of the road that is not to be guided. The thus read-out road numbers are stored, as continuing road number data LN, in the RAM 4 (step 518). When the particular adjacent road data SN includes no road that is not to be guided, on the other hand, the processing at step 518 is not executed.

Then, road numbers that include the start point of route SP are searched from the road data file. These road numbers are written onto the first data area of the guide route data register MW (step 520). Then, the most suitable road to be guided that is connected to the roads and that arrives at the registered destination TP is searched from the road data file (step 522). The road numbers of the roads connected to the road are found from the destination road number data in the road data shown in FIG. 21. The most suitable road to be guided is identified using the road attribute data and the destination direction data.

At step 522, therefore, the most suitable road to be guided is picked out of a plurality of roads connected to the road. The road number data of the roads that are picked are added to the end of the guide route data register MW (step 522).

Next, it is determined whether the road searched at step 522 is a particular adjacent road (step 592). When it is not the particular adjacent road, it is then determined whether the road searched at step 522 is the road LN that is read out at step 518 (step 540). When it is not the road LN, the program returns back to step 522 where the most suitable road to be guided that is to be connected next is identified. Therefore, the most suitable roads to be guided are successively identified at step 522 until the adjacent road or the road LN is identified, and are added to the end of the guide route data register MW (steps 522, 592, 540).

On the other hand, when the road searched at step 522 is the particular adjacent road, it means that the guide route has arrived at the registered destination TP. In this case, the road number of the particular adjacent road is written onto the final data area of the guide route data register MW (step 594). The end point of route data EP existing on this particular adjacent road are regarded to be the sole end point of route data EP (step 596). At step 596, a plurality of end point of route data EP written onto the RAM 4 in the end point of route-determining processing (step 462) are erased, and the end point of route data EP determined at step 596 are written. Thus, when there are a plurality of end point of route data EP, only one of them is designated.

Referring to FIG. 25, it is now presumed that the house shape data at the registered destination TP1 include two particular coordinate data TZ1 and TZ2. Here, the user may designate the particular coordinates TZ2. In this case, the designated position data IZ are regarded to be the particular coordinate data TZ2 (step 562 in FIG. 31). The end point of route EP is the node ND2 which is closest to the particular coordinate TZ2 (step 578 in FIG. 32). The particular adjacent road number SN is the road number of the adjacent road LD2a that includes the node ND2 (step 580).

When the guide route is connected from the upper direction of the road LD1b, the node ND1 may be close to the registered destination TP1 but is not closest to the particular coordinate TZ2. Therefore, the node ND1 is excluded from the end point of route EP. The node closest to the particular coordinate TZ2 is the node ND2. Therefore, the node ND2 is regarded to be the end point of route EP. The road number of the particular adjacent road LD2a is written to the final data area of the guide route data register MW (step 594).

When the road LD3b or the road LD4b is a guide route, the particular adjacent road LD2a is preferentially picked up as a road that connects to the road LD3b or LD4b. This is because the particular adjacent road LD2a includes the node that is closest to the particular coordinate TZ2. Therefore, the road number of the adjacent road LD2a is added to the end of the guide route data register MW. Besides, the coordinate data of the node ND2 are determined to be the end point of route data EP.

As for searching the guide route, the continuing roads are searched based on a prerequisite that the end point of route EP is a node on the particular adjacent road. Therefore, the guide route never approaches from the right direction of the road LD2b. When the particular coordinate TZ1 is designated by the user, therefore, the end point of route EP becomes the node ND1. The particular adjacent road is the road LD1b, and a guide route in which the node ND1 is the end point is a sole route that approaches from the upper direction of the particular adjacent road LD1b.

On the other hand, when the road identified at step 522 is not the particular adjacent road (step 592 in FIG. 33), it is determined whether the road that is identified is the road LN that is read out at step 518 (step 540). When the identified road is the road LN, the road number data of the road LN are written onto the end of the guide route data register MW (step 542).

Then, the road number data SN of the particular adjacent road connected to the road LN are read out. The road number data SN are written onto the final data area of the guide route data register MW (step 600). The coordinate data of the node on the particular adjacent road read out from the adjacent road data are determined to be the end point of route data EP (step 602). Even in this step 602 like in the above-mentioned step 596, the end point of route data EP written onto the RAM 4 in the end point of route-determining processing (step 462) are erased. The end point of route data EP determined at step 602 are newly written to the RAM 4.

Referring, for example, to FIG. 26, the registered destination TP2 has a particular coordinate TZ3 and an adjacent road LD5. Therefore, the end point of route EP is a node ND6 (step 578 in FIG. 32). The particular adjacent road is a road LD5 (step 580 in FIG. 32). Therefore, the road numbers of the roads LD2a and LD2b are stored in the RAM 4 as roads LN connected to the adjacent road LD5 (step 518). When the guide route is connected from the left side of the road LD2a or is connected from the right side of the road LD2b, the road number of the road LD2a or LD2b is added to the end of the guide route data register MW (step 542).

Moreover, the road number of the particular adjacent road LD5 is written onto the final data area of the guide route data register MW (step 600). The coordinate data of the node ND6 on the adjacent road LD5 are determined to be the end point of route data EP (step 546).

On the other hand, when it is determined at step 512 that the registered destination data TP are not the house shape data, the following processing is executed. The road numbers of roads having the start point of route SP are identified from the road data file. The thus identified road number data are written onto the initial data area of the guide route data register MW (step 530). Then, the road to be guided that is connected to the roads and that most suitably arrives at the registered destination TP is identified from the road data file (step 532). The road number data of the identified road are written onto the final data area of the guide route data register MW (step 534).

Then, it is determined whether the road identified at step 532 includes the end point of route EP (step 536). When there is no end point of route EP, the program returns back to step 532 where a next most suitable road to be guided that connects to the road is identified (step 532). The roads to be guided are successively identified until a road having the end point of route EP is identified. The road number data of the identified road are added to the end of the guide route data register MW (steps 532, 534, 536).

When a road having the end point of route EP is identified, the result of the determination at step 536 becomes YES. The end point of route EP on the identified road is regarded to be a sole end point of route EP (step 538).

When there are a plurality of particular adjacent roads, the particular adjacent road determined as a road to be guided is a road that is identified at step 522 or is a particular adjacent road that is connected to the above road (step 600). The end point of route EP is limited to the node on this road (steps 596, 602).

When a drop-in place is set, a guide route that arrives at the drop-in place is set through the same processing as the processing for setting a guide route up to the registered destination. The processing for setting the guide route up to the drop-in place is the processing for determining the start point of route (step 460), the processing for determining the end point of route (step 462), the guide route search processing (step 464) or the arrival point designation processing (step 550) in which the registered destination data TP are replaced by the drop-in place data DP.

34. Fifth Embodiment

In the third and fourth embodiments, the adjacent road data in the house shape data comprise road numbers of roads adjacent to the house shape and coordinates of a node closest to the house shape. Here, the shape data of the house comprises a plurality of coordinate data forming a plane figure. Flag data may be added to the coordinate data adjacent to the road among the coordinate data of the shape data. The flag data represent that the coordinate is adjacent to the road. Hereinafter, this flag is referred to as an adjacent flag.

Figure 34:
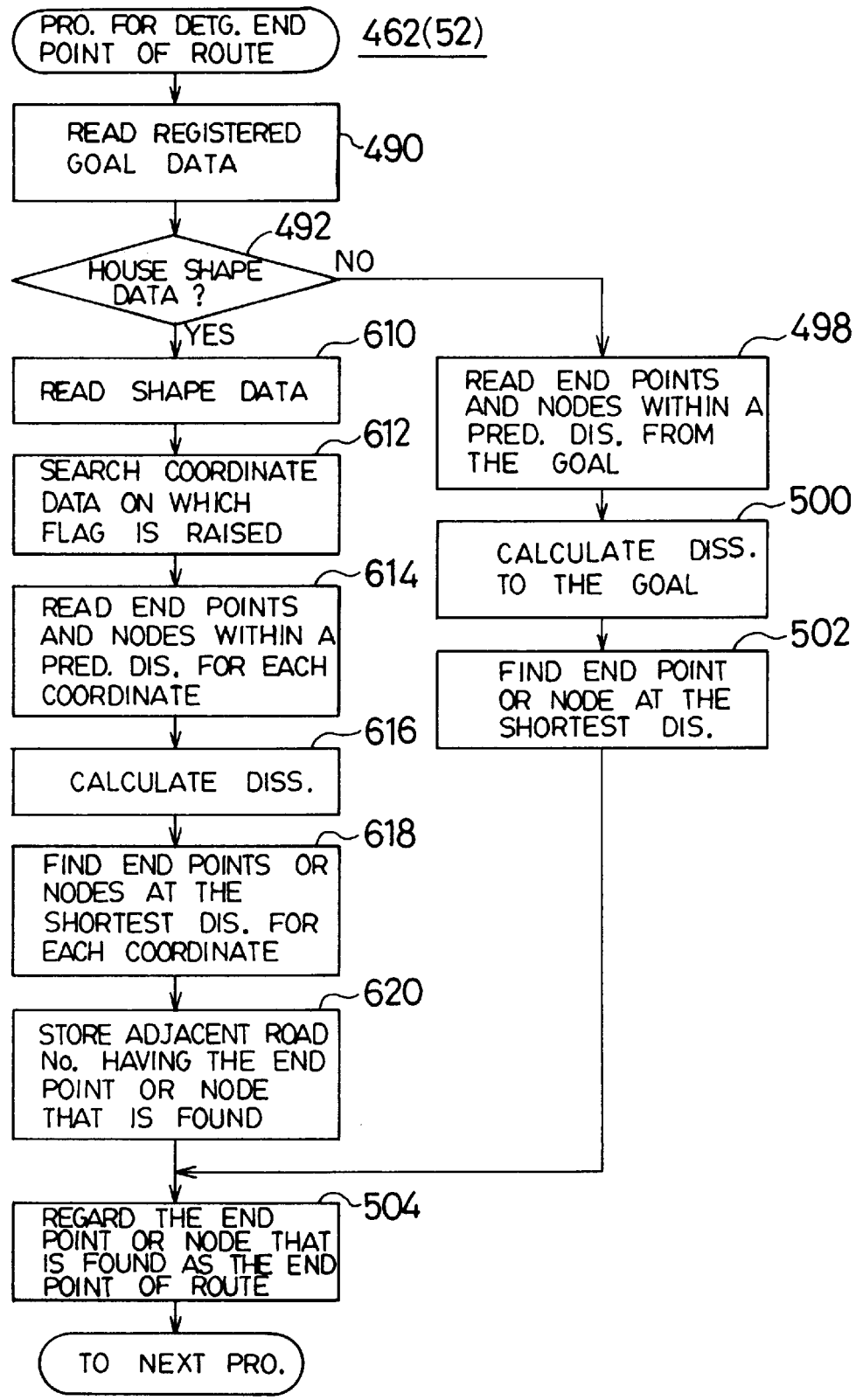
FIG. 34 is a flow chart illustrating a process for determining the end point according to a fifth embodiment.
Figure 35:
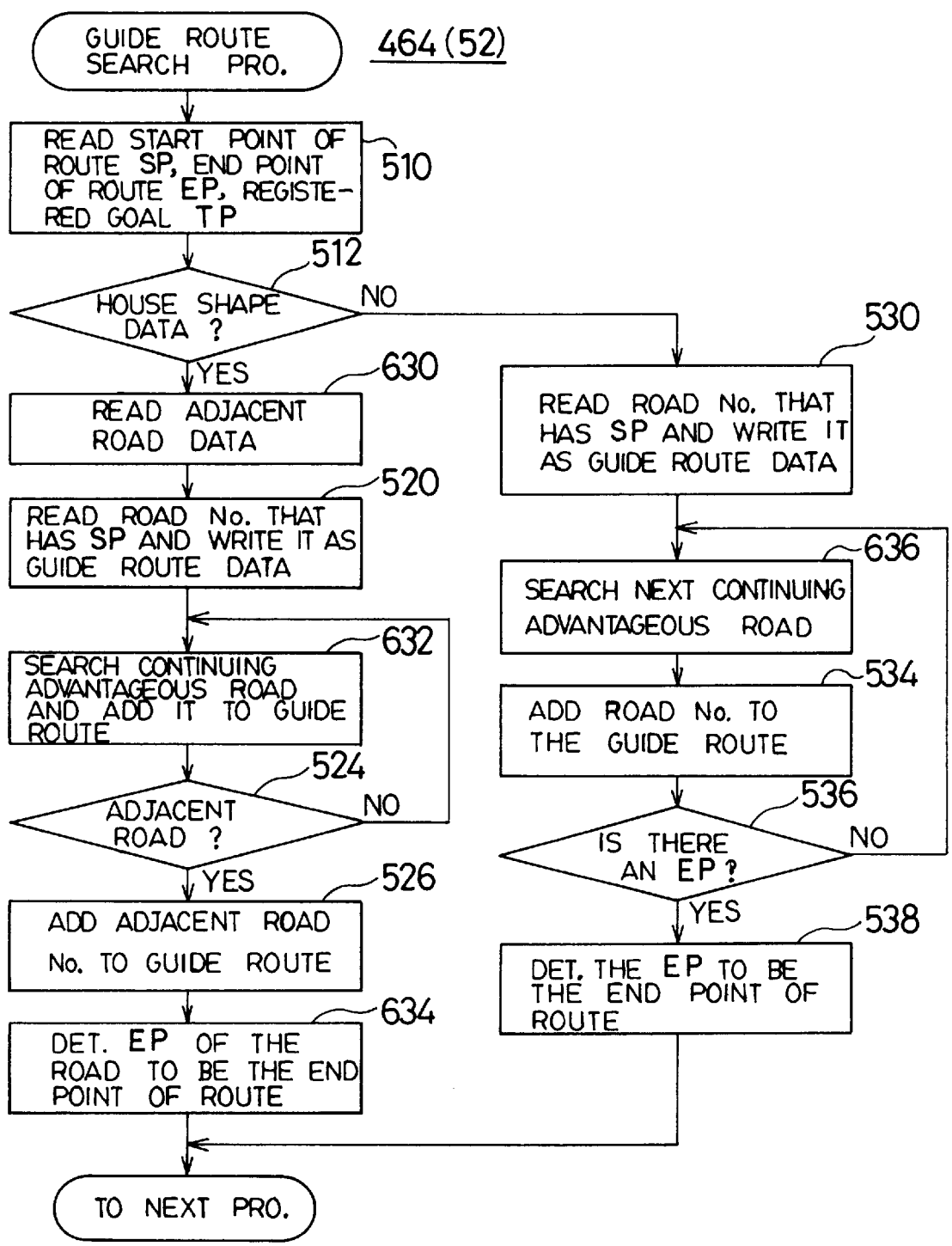
FIG. 35 is a flow chart illustrating a process for searching a guide route according to the fifth embodiment.

As represented by a broken line in FIG. 20, the RAM 4 is provided with a register for storing the adjacent road data LD. The adjacent road data LD are the road number data of roads adjacent to the house shape at the registered destination TP. Therefore, the adjacent road data in the house shape data have not been provided in the fifth embodiment. In the fifth embodiment, the road data may not distinguish the roads to be guided over the roads that are not to be guided. Therefore, the processing for determining the end point of route (step 462) according to the fifth embodiment is shown in FIG. 34. The guide route search processing (step 464) according to the fifth embodiment is shown in FIG. 35.

35. Processing for Determining End Point of Route

In FIG. 34, the same steps as the steps of the processing for determining the end point of route of FIG. 29 are denoted by the same reference numerals. First the registered destination data TP are read out from the RAM 4 (step 490). It is then determined whether the registered destination data TP are the house shape data (step 492). When the registered destination data TP are the house shape data, the shape data are read out from the house shape data (step 610). Then, the coordinate data to which the adjacent flag is attached are identified out of the shape data that are read out (step 612).

Then, end points or nodes are identified that exist within a predetermined distance from the coordinate to which the adjacent flag is attached out of the road data in the road data file (step 614). Distances are calculated between the end points or nodes identified at step 614 and the coordinates to which the adjacent flag is attached (step 616). The distances found at step 616 are compared. From the result of comparison, the end point or node at the shortest distance is found for each of the coordinates to which the adjacent flag is attached (step 618). The road number having the end point or node found at step 618 is identified from the road data file. The road of this road number is the one which is adjacent to the registered destination TP. The road number data of this adjacent road are stored, as adjacent road data LD, in the RAM 4 (step 620).

The road data are identified having shape data that meet the coordinate data of the end point or the node found at step 618. From the road data is picked a road number of a lane of the side closest to the coordinates of a vertex to which is added the adjacent flag of the house shape. In this case, the road attribute data include lane data representing whether the lane is on the right side or on the left side of the center line.

The coordinates of the end point or the node found at step 618 are regarded as a base point. It is determined in which direction (north, south, east or west) from the base point are the coordinates of the vertex to which the adjacent flag is attached. This direction is compared with the lane data to detect the adjacent road. The coordinates of the end point or the node found at step 618 are stored in the RAM 4 as the end point of route data EP (step 504).

On the other hand, when it is determined at step 492 that the registered destination data TP are not the house shape data, steps 498 to 502 are executed. The end points and nodes on the roads to be guided within a predetermined distance from the registered destination TP are found (step 498). Distances are correctly calculated between the end points or nodes and the registered destination TP (step 500). The distances found at step 500 are compared. The end point or the node having the shortest distance is regarded to be the end point (step 502). The coordinates of the end point are stored as the end point of route data EP in the RAM 4 (step 504).

36. Guide Route Search Processing

In FIG. 35, the same steps as the steps of the guide route search processing of FIG. 30 are denoted by the same reference numerals. First, the start point of route data SP, end point of route data EP and registered destination data TP are read out from the RAM 4 (step 510). Next, it is determined whether the registered destination data TP are house shape data (step 512). When a destination is designated on a house map picture in the destination setting processing (step 51 of FIG. 7), the registered destination data TP are the house shape data. When the destination is designated on the road map picture, the registered destination data TP are the destination data.

Here, when the registered destination data TP are the house shape data, then, the adjacent road data LD stored in the RAM 4 are read out (step 630).

Next, a road number having the start point of route SP is identified from the road data file. The road number is written onto the initial data area of the guide route data register MW in the RAM 4 (step 520). Then, a road connected to this road and that is most suited for arriving at the registered destination TP is identified from the road data file. The road number of the thus identified road is added to the end of the guide route data register MW (step 632).

It is then determined whether the road identified at step 632 is the adjacent road (step 524). In other words, it is determined whether the road number data of the road identified at the step 632 are in agreement with the road number data of the adjacent road data LD. When it is not the adjacent road, the program returns back to step 632 where a next continuing road is identified. At step 632, therefore, the most suitable roads are successively identified until the adjacent road is identified. The road number data of each successive identified road are added to the end of the guide route data register MW (steps 632, 524).

On the other hand, when the road identified at step 632 is the adjacent road, it means that the guide route has arrived at the registered destination TP. Therefore, the road number data of the adjacent road are written onto the final data area of the guide route data register MW (step 526). The end point of route on the adjacent road is determined to be the end point of route data EP (step 634). At step 634, the end point of route data EP written to the RAM 4 in the processing for determining the end point of route (step 642) are erased. Instead, the end point of route data EP determined at step 634 are newly written to the RAM 4. When there are a plurality of end point of route data EP, one of them is determined. At step 620 of FIG. 34, the road numbers of the adjacent roads and the end points of route located thereon are stored being related to each other in the RAM 4.

Referring, for example, to FIG. 25, the shape data in the house shape data at the registered destination TP1 comprise the coordinate data of vertexes A to F. The adjacent flag is attached to the coordinate data of vertexes A, B and F that are adjacent to the roads LD1*b* and LD2*a*. Therefore, the end point of route-determining processing (FIG. 34) determines the end points or the nodes at the shortest distances from the vertexes A, B and F (step 618 of FIG. 34). In this case, the nodes ND1 and ND2 are detected. However, it is not permissible to stop the car at the center of the intersection. Therefore, the intersection Kp is excluded from the recommended end point of route.

When the guide route is connected to the upper side of the road LD1*b*, the node ND1 is determined to be the end point of route EP (step 538 in FIG. 35). When the guide route is connected to the road LD3*b* or to the road LD4*b*, the adjacent road LD2*a* is preferentially picked as a road connected to the roads LD3*b* and LD4*b*. Accordingly, the road number of the adjacent road LD2*a* is written onto the final data area of the guide route data register MW (step 526 in FIG. 35). The node ND2 is determined to be the end point of route data EP (step 634 in FIG. 35). At step 632, a continuing road is picked based on a prerequisite that the end point of route EP is a node on the adjacent road. Therefore, the guide route is never connected to the right side of the road LD2*b*.

On the other hand, when it is determined at step 512 that the registered destination data TP are not the house shape data, the processings on and after step 530 are executed. The road number of a road having the start point of route SP is identified from the road data file. The identified road number data are written to the first data area of the guide route data register MW (step 530). Then, a road connected to this road and which is most suited for arriving at the registered destination TP is identified from the road data file (step 636). The road number data of the identified road are added to the end of the guide route data register MW (step 534).

Next, it is determined whether the road identified at step 636 has the end point of route EP (step 536). When there is no end point of route EP, the program returns back to step 532 where a next continuing road that is most suited is identified (step 636). Therefore, the continuing roads are successively identified until the road having the end point of route EP is identified. The road number data of the identified road are added to the end of the guide route data register MW (steps 636, 534, 536). When the road having the end point of route EP is identified at step 636, the result of the determination at step 536 becomes YES. In this case, the end point of route EP on the identified road is regarded to be the sole end point of route EP (step 538).

When a drop-in place is set, a guide route that arrives at the drop-in place is identified in the same manner as in the processing for searching a guide route to the registered destination. The processing for searching the guide route up to the drop-in place is the processing for determining the start point of route (step 460), the processing for determining the end point of route (step 462), or the guide route search processing (step 464) in which the registered destination data TP are replaced by the drop-in data DP.

37. Sixth Embodiment

The navigation device of the sixth embodiment is characterized by the provision of data storage means; a house shape data file for storing building data that represents the shape of a building; input means for inputting desired genres; search means for searching, from the data storage means, a building that corresponds to the genre that is input through the input means; cursor position detection means for detecting the position of the cursor; building search means for searching a building corresponding to the detected cursor position; indication means, a display, for showing buildings corresponding to genres input through the input means in a first indication form and for showing buildings identified by the building search means in a second indication form.

38. Point Setting Processing

Figure 36:
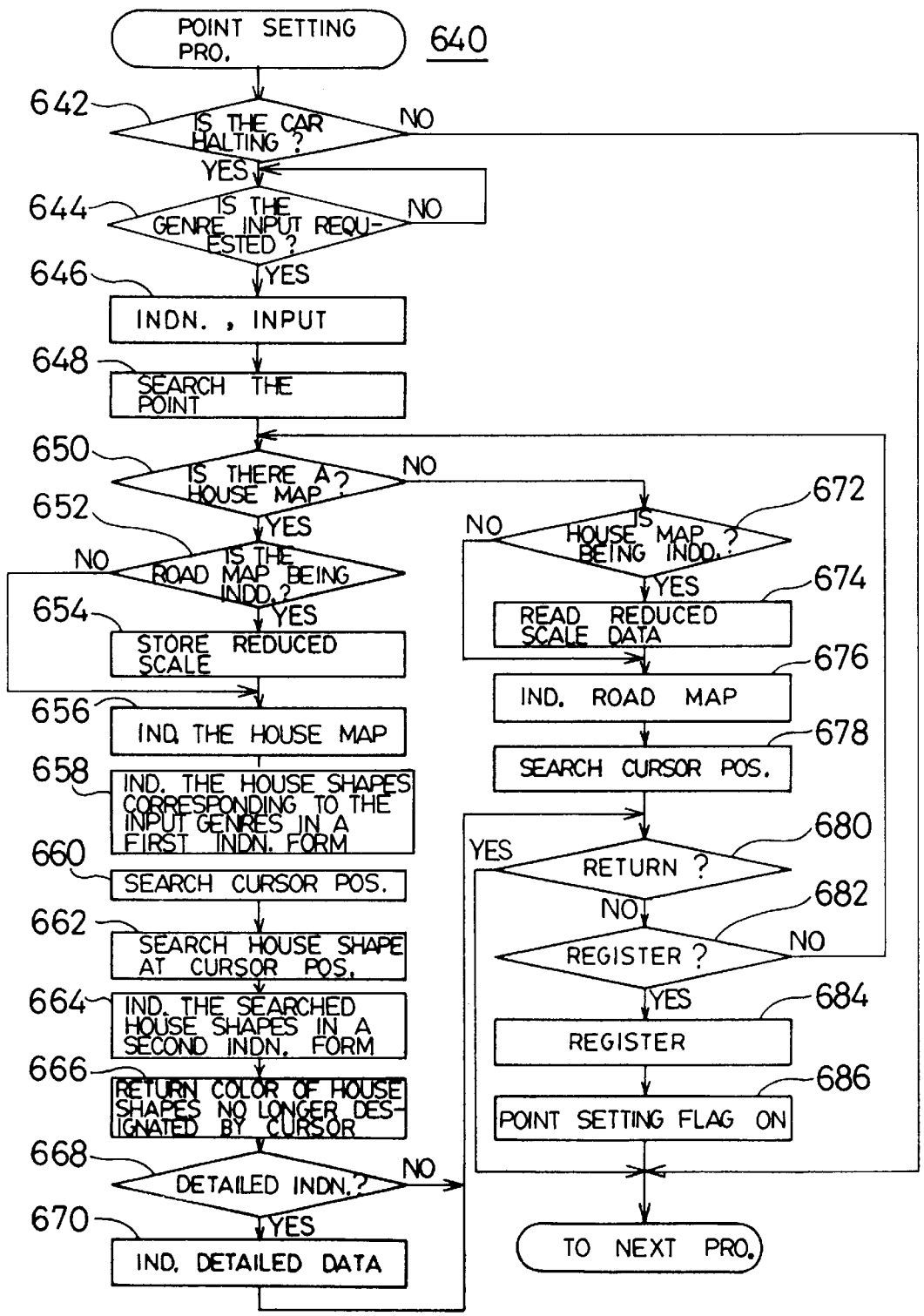
FIG. 36 is a flow chart illustrating the process for setting a point according to a sixth embodiment.

FIG. 36 is a flow chart of the point setting processing (step 640) according to the sixth embodiment. It is first determined whether the car is running (step 642). When it is determined that the car is running, the point setting processing is not executed. That is, the point setting processing can be executed only when the car is halting or is running at a very slow speed.

When it is determined that the car is halting, it is then determined whether an instruction for setting a point by using a genre is input (step 644). When the point is set using the genre, a genre list is shown on the display 33. The genre selected by the user is determined (step 646). A plurality of points that meet the selected genre are shown on the display 33 and/or are output by voice through the speakers 13. The point selected by the user is determined by using a touch switch provided on the display 33.

The selected facility or point (building is used as a generic term for a defined integrated unit that may be a building, a park, a collection of buildings, an installation or any other similar entity) is identified from the data storage means (step 648). It is determined whether a house map capable of indicating the identified point is stored in the data storage unit 37 (step 650). The house map that is stored is shown with the above-mentioned point at the center (step 656). Here, it is determined whether the map that is now being shown on the display 33 is a road map (step 652). When the road map is being shown, preparation is carried out for showing the house map. That is, the reduced scale of the road map that is now being shown is stored in the RAM 4 (step 654).

Buildings corresponding to the input genre are identified from the house shape data. The buildings are shown in the first indication form (step 658). In the first indication form, color, brightness or brilliancy is changed from the steady state. Thus, the buildings corresponding to the selected genre can be easily distinguished over other buildings.

Next, the cursor is used for designating a particular point on the map picture that is shown. Therefore, the position of the cursor indicated on the map is detected (step 660). Next, a building corresponding to the position of the cursor is identified from the house shape data (step 662). The building that is identified is shown in the second indication form (step 664). In the second indication form, the first indication form is further changed. For instance, the indicated building has a further increased brightness. This makes it possible to more easily distinguish the point designated by the, cursor. The second indication form may be in any form provided it gives a distinction over the points indicated in the first indication form.

The object indicated in the second indication form is always a point that is designated by the cursor. For instance, when the cursor is moved to a building indicated in the first indication form the indication form of the building designated by the cursor is changed into the second indication form. As the cursor is further moved from this building to designate another building, the building that had been designated before is returned back to the first indication form (step 666).

It is further determined whether indication of detailed data related to buildings is requested (step 668). When the indication is requested, detailed data of a building designated by the cursor is provided by display or voice (step 670). The word "RETURN" is shown on the picture on the display 33. It is determined whether the user has touched the displayed word "RETURN" (step 680). When it is touched, the point setting processing of FIG. 36 ends.

When the word "RETURN" is not touched, it is determined whether the processing for registering the point is requested (step 682). When the processing for registering the point is requested, the point designated by the cursor is registered (step 684). The point setting flag is then turned on (step 686). When the point is registered, the point setting processing ends.

On the other hand, when it is determined that the data storage unit 37 does not store the house map that includes the selected point (step 650 is NO), the processings on and after step 672 are executed. At step 672, it is determined whether the map shown on the display 33 is a road map (step 672). When a house map is shown, the reduced scale data of the map stored in the RAM 4 are read out (step 674). Then, the road map is shown according to the reduced scale data that are read out (step 676).

Next, the position of the cursor on the road map is detected (step 678). The point designated by the cursor can now be registered (steps 682, 684, 686). When the desired point is not found during the processing, the word "RETURN" on the display 33 is touched to end the processing (step 680).

39. Route Search Processing

Figure 37:
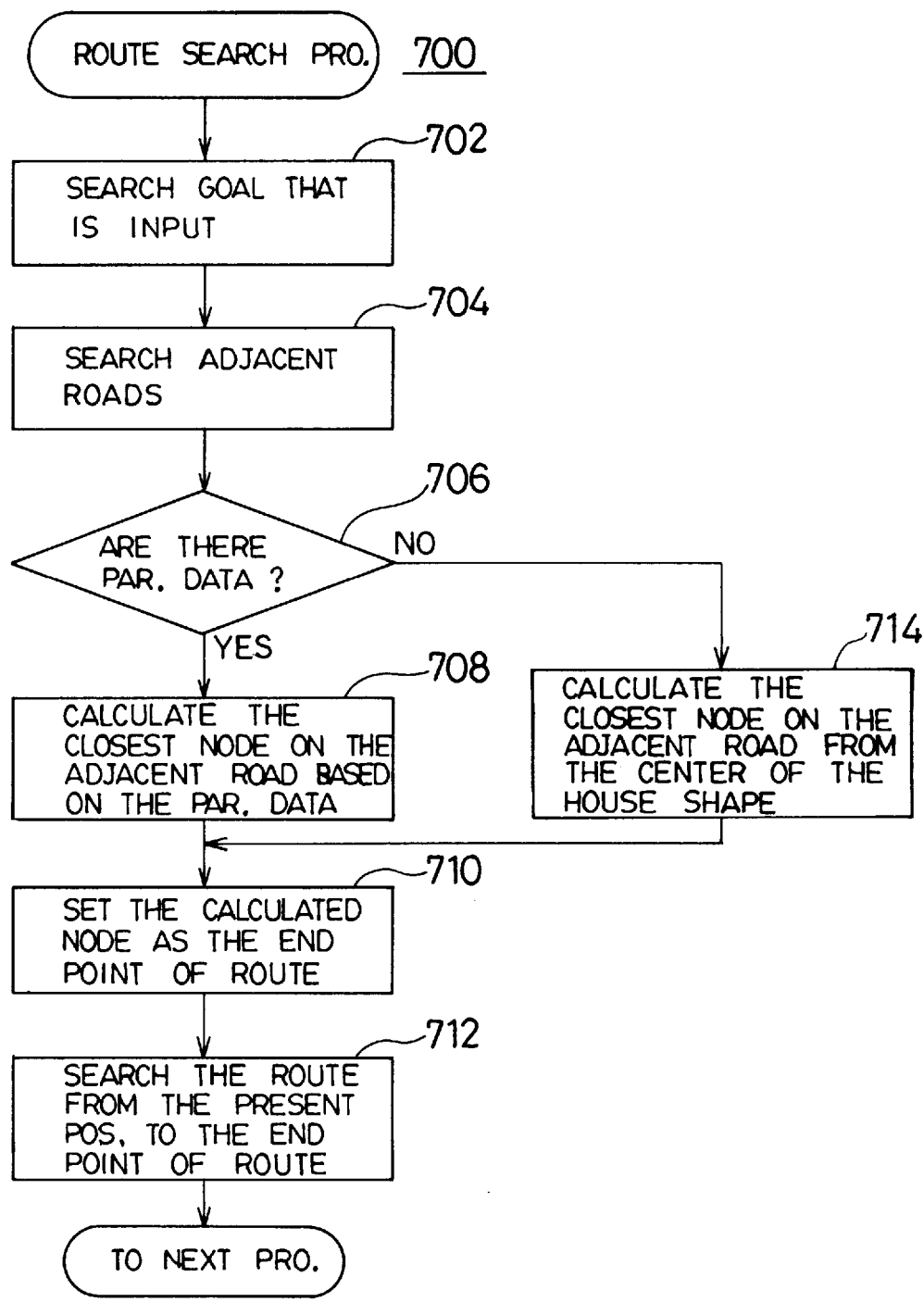
FIG. 37 is a flow chart of a process for searching a route according to the sixth embodiment.

FIG. 37 is a flow chart of a route search processing (step 700). First, a destination input by the user is identified from the data storage means (step 702). When the destination that is identified exists in the house map data, roads adjacent to the destination are identified from the house map data (step 704). The adjacent roads can be stored in advance in the house shape data. From the house shape, furthermore, the roads having coordinates in common with the coordinates of the destination can be set as adjacent roads. Next, it is determined whether particular data, such as point data for an entrance, an exit, and a parking lot, are stored in the house shape data at the destination that is input (step 706). When there are particular data, a node on the closest road is identified based on the particular data. The node on the road is set as an end point of the route (steps 708, 710). That is, it is presumed that the entrance data have been stored as particular data in the house shape data at the destination that is input. The node on the road closest to the entrance can be regarded to be the end point of the route based upon the particular data. Even when there are a plurality of adjacent roads, therefore, a guide route can be reliably set to a point desired by the user.

The user may request, for example, "GUIDE ME TO A PARKING LOT", "GUIDE ME TO THE FRONT GATE", and "GUIDE ME TO THE EXIT TO MEET A GUEST". Therefore, a plurality of particular data may be stored in the house shape data. In this case, the particular data at the destination are structured so it can be selected by the user. This enables the user to cope with a variety of requests.

Next, a route is identified from the present position, detected by the present position detection means, to the end point of the route that is calculated above (step 712). When the particular data are not contained in the house shape data, a node closest to the point at the center of the house shape is identified. Thus, the end point of the route is set (step 714), and the route is identified to the destination (steps 710, 712).

40. Other Modified Embodiments

The invention is in no way limited to the above-mentioned embodiments, but can be changed in a variety of ways without departing from the gist of the invention. In the aforementioned embodiments, for example, a list of detailed data related to the destination is indicated in response to the switching operation by the user (steps 100, 102 in FIG. 9). However, detailed data related to the house shape designated by the center KLC of the cursor may be automatically indicated on the display 33 instead. Furthermore, the house shape designated by the center KLC of the cursor may be indicated in a red color or other color that can be easily distinguished from other house shapes. A solid picture representing the appearance of the place may be shown at the position of the house shape or at a position where an associated object is shown, such as a lead line or the like.

In the aforementioned embodiments, the house shape is a unit of a building or of a facility. However, the house shape may be such that a plurality of buildings in a facility constitute a unit. The house shape may further be such that a section of the town constitutes a unit or a plurality of neighboring buildings may constitute a unit. The house shape data in the above-mentioned embodiments comprise coordinate data of the vertexes of the plane house shape. The house shape data, however, may comprise coordinate data of the sides that define the outer perimeter of the plane house shape or the house shape data may comprise coordinate data maintaining a predetermined interval included in the plane house shape. Moreover, the house shape data may comprise coordinate data of vertexes of a plane figure that expresses on a plane the solid appearance of the place. Similarly, the house shape data may be constituted by the coordinate data on the sides of a plane figure of a solid appearance or by the coordinate data maintaining a predetermined interval included in the plane shape. In the case when the solid appearance of the house shape is expressed on a plane, the house shape data having the center KLC of the cursor on the plane shape may be identified at the step 98 in the destination designation processing (FIG. 9). It is further permissible to search the house shape data having the center KLC of cursor on the plane section, such as of a site, etc.

When the house shape is such that a section of the town constitutes a unit, the external data representing the shape of the section of the town and the internal data of the buildings are stored in the data storage unit 37 as related to one another. In this case, there may also be stored the internal data of the buildings and the external data such as shapes of the buildings as related to one another.

The house map may not be shown on the display 33 but particular coordinates may be designated on the road map by the cursor. The house shape data that have the designated coordinates may be identified. In this case, the identified house shape data are stored in the RAM 4 as registered destination data TP. The house map may not include the house shape. For instance, places, such as roads and rivers, excluding buildings, are indicated, but the buildings are not indicated. When a destination is to be set, coordinates designated on the map by the cursor KL, or other input device, are identified. The house shape data having the thus identified coordinates may be identified. Even in this case, the identified house shape data are stored in the RAM 4 as the registered destination data TP.

The house map may be the one from which the whole shape or part of the shape of a building, facility or bridge can be recognized relying upon coordinates. As for showing the shape of buildings, the entire building included in the data may be shown or may be shown only when it is required. Moreover, the house shape data may be those for showing the shape of a building or detailed data related to the building. The shape of a building is formed as data. Upon identifying the shape of a building, it becomes possible to identify the building at a point that is input, and the user finds it simple and easy to input a desired building. When the shape of a building is displayed on the picture using the shape data of the building, the point that is now being displayed can be perceived more reliably. In other words, the point can be recognized more reliably.

The foregoing described the touch switch input as the input means. It is, however, also allowable to use a joy stick input, a remote control input, and a voice input, or any other input device, as a matter of course.

In the above-mentioned embodiments, the present position, destination or center of the cursor is brought to the center of the picture when the house map or the road map is shown on the display 33. It is, however, also allowable to show on the display 33 a map having other coordinates at the center of the picture. For instance, when it is desired to widely indicate the forward direction of progress, a point in front of the present position by a predetermined distance may be brought to the center of the picture.

In the foregoing were described embodiments in which the house shape at a recommended drop-in place was shown in blue (step 366 in FIG. 18) and the house shape having the center KLC of cursor was shown in red or in a solid picture VS (step 372 in FIG. 18). However, there is no limitation on the color to be used. For example, the brightness, brilliancy or pattern over the range of the house shape may be changed, or the house shape may be flashed, or a mark, such as an arrow, may be used to designate the house shape.

In addition to the position of the house shape at a drop-in place, the solid picture may be shown at a position where an associated object is shown, such as a lead line or the like.

The house map and the road map may be changed over as selected by the user. The map to be shown may further be selected depending upon the genre of drop-in place designated by the user. The map may be further selected depending upon whether the present position of the car is inside or outside the range of the house map data. The map may be selected depending upon whether a predetermined period of time has passed from the start of running of the car, the rotational speed of the engine, the time, the remaining amount of the fuel in the car, the temperature of the engine, the battery voltage, the brightness around the car, the atmospheric temperature around the car, the direction of progress of the car, the angle of the car with respect to the absolute direction or the altitude of the car as some conditions that determine map selection.

At step 60 of FIG. 8, at step 294 of FIG. 17 and at step 352 of FIG. 18, it was determined whether the car is halting depending upon whether the running speed of the car is 0 km/hr or is slower than a predetermined speed. The predetermined speed may be a very slow speed. It may also be a low speed or an intermediate speed.

The third and fourth embodiments are directed to cases where the road data contain roads that are to be guided and roads that are not to be guided. It is also allowable to use road data without having a distinction between the roads to be guided and the roads not to be guided. That is, the guide route is identified using all of the road data stored in the data storage unit 37. In this case, none of the processings of steps 516, 518, 540 to 546, 600 and 602 of FIGS. 30 and 33 are required.

In the fourth embodiment, the particular coordinates designated by the user may be determined to be the end point of route and a guide route may be set to the particular coordinates. It is further allowable to find by calculation the adjacent roads based upon the shape data in the house shape data relying upon neither the adjacent road data nor the adjacent flag. In such a case, by searching, for example, common coordinates between the road data and the house shape data, it is possible to search the adjacent roads.

The invention may be a map indication device having the following features, that is, the device stores data related to buildings, such as shapes and names of buildings. In addition, the map is indicated based upon the data and the shapes of the indicated buildings can be recognized. Moreover, the building at a point that is input may be searched and identified.

The data storage unit 37 can be applied to an indoor computer or the other computer, accordingly the above navigation process can be executed at a place other than the vehicle. For example the navigation process is displayed on the map with simulated movement from the present position to the destination or calculation distance along roads from any points on the map.

The programs and/or data can be sent (transmitted) from the outside system to the flash memory 3 via data transmitter/receiver unit 27. The outside system is the supplying system for the present position information or Information process center of ATIS (Auto Traffic Information Service). This outside system is provided at a great distance from the navigation device. The sent programs are also installed (transferred/copied) automatically to the flash memory 3 when the programs are sent to the navigation device or when an operator so instructs (operates).

The described route search processing (step 52) in the process for determining the start point of guide route (step 460), the process for determining the end point of the guide route (step 462), the guide route search processing (step 464), and/or the point setting processing (step 640), etc. can be executed by the outside system. The process results and map information are then sent (transmitted) from the outside system to the navigation device. The display of the road information and guiding route are executed at the navigation device based upon the received process results and map information. In this case, road information, map information, establishment information and traffic jam information are processed and controlled collectively in the outside system, therefore better guiding route and setting point are executed.

The programs can be installed to the RAM 4 from the data storage unit 37 automatically by setting the data storage unit 37 to the navigation device, by turning on the navigation device or instruction (operation) of operator. This installation is executed whenever any of the above occur because the programs and data cannot be stored non-volatilly in RAM. If the reading speed of information from the data storage unit 37 is high, the CPU 2 can read and execute directly the programs stored in the data storage unit 37. The flash memory 3 can be RAM backed up by battery, IC memory card or EEPROM.

What is claimed is:

1. A map indication device for a vehicle, comprising:
    data storage storing descriptive data related to buildings and facilities to include shapes and names;
    a display to display a map based upon the descriptive data; and
    a recognition means for recognizing the shapes of displayed buildings and facilities.

2. The map indication device according to claim 1, further comprising search means for searching for a building or facility corresponding to a point that is input and to identify the building or facility.

3. The map indication device according to claim 1, wherein the descriptive data includes external data of a plurality of buildings and facilities to include plane shapes or solid shapes and further comprises:
    means for reading the external data of the buildings and facilities that are stored;
    means for converting the external data of the buildings and facilities that are read out into display data, the display displaying a map that presents external data of the buildings and facilities, based upon the converted external data of the buildings and facilities, so that shapes of the buildings and facilities can be recognized on the map that is displayed.

4. The map indication device according to claim 3, wherein the descriptive data further includes internal data including addresses, names and telephone numbers of the buildings and facilities in association with the external data of buildings and facilities on the displayed map that displays the external data of buildings, the map indication device further comprising means for selecting a one of the plurality of buildings and facilities using the map, and means for searching the internal data corresponding to the selected one of the plurality of buildings and facilities and then displays the internal data of the selected one.

5. The map indication device according to claim 1, wherein the data storage stores data for at least one road map formed based upon road data and at least one house map formed based upon data related to the buildings and facilities and the map indication device further comprises means for changing between the at least one map and the at least one house map.

6. The map indication device according to claim 5, wherein the stored road data representing roads is displayed as a road map, the stored external data of buildings and facilities is displayed as a house map, the map indication device further comprising:
    means for selecting the road data or the external data of the buildings and facilities;
    means for reading either the road data or the external data of the buildings and facilities depending upon the selection; and
    means for converting either the road data or the external data of the buildings and facilities for display as a map, then displaying the converted road data or the external data of the buildings and facilities as the map on the display.

7. A navigation device for a vehicle, comprising:
    storage means for storing house shape data related to defined integrated units include shape data;
    a display to display map data based upon the house shape data;
    an input device for inputting a point based on the map data that are displayed;
    recognition means for recognizing the shape of an integrated unit based upon the house shape data to identify the integrated unit that corresponds to the point that is input; and
    selection means for selecting the integrated unit that corresponds to the point that is input.

8. The navigation device according to claim 7, further comprising:
    means for detecting a present position of a car, wherein the house shape data in which the shapes of the integrated units are comprised of sequences of coordinates;
    means for comparing coordinates of the point that is input with the shapes of the integrated units comprised of the sequences of coordinates of said house shape data to search for an integrated unit that corresponds to the coordinates of the point that is input;
    means for setting an identified integrated unit as a destination;
    means for calculating a route from the present position to the destination that is set; and
    means for displaying on the display the integrated unit that corresponds to the coordinates of the point that is input and the route that is calculated.

9. The navigation device according to claim 7, wherein the stored house shape data represents shapes of integrated units that are included in a predetermined region and are sectionalized on a plane, locations of the integrated units, and data related to the integrated units, the navigation device further comprising:
    means for designating, as a point, the integrated unit that becomes a destination;
    means for searching coordinates of the point that is designated;
    means for searching house shape data in which the coordinates of the integrated unit that is searched are included in a range of the house shape data;
    means for setting the integrated unit represented by identified house shape data as the destination;
    means for setting a guide route to the destination that is set; and
    means for detecting the present position of a moving vehicle, the display displaying data related to the integrated unit included in the searched house shape data, the guide route that is set, and the detected present position of the moving means.

10. A navigation device, comprising:
- data storage for storing road map data formed based upon road data as well as house map data, the house map data including shapes of integrated units;
- means for detecting a present position of a vehicle;
- means for calculating a route based upon data that are input and the road data that are stored when data necessary for calculating the route to a destination are input;
- means for providing guidance along the route based upon the calculated route and the detected present position of the vehicle;
- a display for displaying the map data that are read out and the calculated route; and
- means for changing the display between the map data formed by reading the road map data and the map data formed by reading the house map data based upon predetermined conditions.

11. The navigation device according to claim 10, further comprising judging means for judging the predetermined conditions, wherein the map to be displayed as changed over to the road map from the house map when it is judged that a speed of the vehicle is higher than a predetermined speed.

12. The navigation device according to claim 10, further comprising manual selection means for manually selecting the map to be displayed, wherein the map data to be displayed are selected manually or automatically, and the map data to be displayed are changed over depending upon the selection of the map data.

13. The navigation device according to claim 10, further comprising means for calculating a distance from the detected present position of the vehicle to the destination that is input and, based upon the distance that is calculated, the map data to be displayed is changed over to the house map from the road map upon a judgment that the vehicle is within a predetermined distance from the destination.

14. A navigation device for a vehicle, comprising:
- a storage device storing house shape data that are related to house shapes representing shapes of places that are included in a predetermined region and are sectionalized on a plane, positions of the places, and data related to the places;
- a display for displaying a picture;
- means for generating house map data to display a house map by using the house shapes of the places that are included in the predetermined region and are sectionalized on the plane, the display displaying the house map as the picture based upon the house map data that are generated;
- means for generating road map data to display a road map by using a road network and geographical data included in the predetermined region, the display displaying the road map as the picture based upon the road map data that are generated;
- means for designating a point that becomes a destination;
- means for searching coordinates of the point that is designated;
- means for searching the house shape data in which the coordinates of the identified point are included in a range of the house shape data;
- means for generating for display as the picture data related to the place identified as the searched house shape data for the destination, the storage device also storing place data related to places that may be selected as drop-in places;
- means for searching from the place data places that correspond to a selected genre and that meet conditions that are input as drop-in places, displaying on the display the house shape of the identified place on the house map in a form distinguishable from house shapes of other places;
- means for designating a drop-in place out of recommended drop-in places that are displayed, then displaying the house shape of the designated drop-in place in a form distinguishable from the other recommended drop-in places;
- means for searching coordinates of the point designated as the drop-in place;
- means for identifying the house shape data in which the coordinates of the point of the designated drop-in place is included in the range of the house shape data for the drop-in place;
- means for setting a guide route to the destination and a guide route to the designated drop-in place;
- means for detecting a present position of a moving means, the display displaying the guide route together with the detected present position;
- means for determining whether the present position is within a predetermined distance from the destination when the guide route is being displayed;
- means for determining whether the house map or the road map should be displayed depending upon predetermined conditions, the house map displayed around the destination when the destination is set and the present position of the moving means is determined to be within a predetermined distance of the destination;
- means for determining whether a range of the house map for display lies outside a coordinate range of data of the house map that can be displayed;
- means for changing over the display of the house map to the road map when the range of the house map for display lies outside the coordinate range of data of the house map that can be displayed;
- means for storing in the storage device reduced scale data of the road map when the road map displayed is changed over to the house map;
- means for returning the display to the road map again on the reduced scale in effect when a road map display was previously changed over to the house map;
- means for determining whether the house map or the road map be displayed depending upon a manual operation by a user;
- means for determining whether the vehicle is moving; and
- means for inhibiting the display of the house map when it is determined that the vehicle is moving.

15. A navigation device for a vehicle, comprising:
- means for calculating a route to a destination that is input;
- means for providing guidance to a user according to the calculated route;
- a storage device for storing data related to the calculated route, the storage device storing building data for indicating the shapes of integrated units;
- means for inputting a point to include the destination or a passing point;
- means for searching from the building data an integrated unit corresponding to the point that is input, wherein when the integrated unit is the destination, the means for calculating calculates the route to a point on a road adjacent to the identified integrated unit as an end point of the route.

16. The navigation device according to claim 15, wherein the building data further includes data of a particular point, when the integrated unit is the destination, the route is calculated to the particular point.

17. The navigation device according to claim 16, wherein the data of the particular point are data related to an entrance to a building.

18. The navigation device according to claim 16, wherein the data of the particular point are data related to a parking lot.

19. A navigation device for a vehicle, comprising:
an input device;
calculation means for calculating a route to a destination that is input using the input device; and
means for presenting guidance along the calculated route, the navigation device storing building data indicating the shapes of integrated units and searches, from the building data, integrated units that correspond to a genre of the destination that is input, detects a position designated by the input device, searches for an integrated unit that corresponds to the designated position, and portrays a building corresponding to the genre that is input in a first indication form and portrays a building identified from the building data in a second indication form with the means for presenting.

* * * * *